US00RE37799E

(19) United States
(12) Reissued Patent
Watanabe et al.

(10) Patent Number: US RE37,799 E
(45) Date of Reissued Patent: Jul. 23, 2002

(54) AUTOMATIC ASSEMBLING SYSTEM OF GALVANIZED STEEL SHEET BY SPOT WELDING

(75) Inventors: Toichi Watanabe, 4-10-1, Aoyamadai, Suita-shi, Osaka-fu; Tadashi Sofue, Kariya, both of (JP)

(73) Assignees: Toichi Watanabe, Suita; Kabushiki Kaisha Toyoda Jidoshokki Seisakusho, Kariya; Research Development Corporation of Japan, Kawaguchi, all of (JP)

(21) Appl. No.: 09/638,514

(22) Filed: Aug. 11, 2000

Related U.S. Patent Documents

Reissue of:
(64) Patent No.: 5,793,011
Issued: Aug. 11, 1998
Appl. No.: 08/554,548
Filed: Nov. 7, 1995

(30) Foreign Application Priority Data

Nov. 8, 1994 (JP) ..... 6-273446

(51) Int. Cl.[7] ..... B23K 11/25
(52) U.S. Cl. ..... 219/109; 219/92; 219/94; 219/117.1
(58) Field of Search ..... 219/92, 94, 108, 219/109, 110, 117.1, 118

(56) References Cited

U.S. PATENT DOCUMENTS 4,456,810 A * 6/1984 Schumacher et al. ..... 219/110
4,694,135 A * 9/1987 Nagel et al. ..... 219/109
4,792,656 A * 12/1988 Namiki et al. ..... 219/110
4,922,075 A * 5/1990 Sofue et al. ..... 219/92
5,075,531 A * 12/1991 Sofue et al. ..... 219/118
5,083,003 A * 1/1992 Clark, Jr. et al. ..... 219/110
5,343,011 A * 8/1994 Fujii et al. ..... 219/109

FOREIGN PATENT DOCUMENTS

| | | | |
|---|---|---|---|
| DE | 4317557 | * | 9/1994 |
| EP | 0127299 | * | 12/1984 |
| JP | 64-62284 | * | 3/1989 |
| JP | 64-62286 | * | 3/1989 |
| JP | 5-85269 | * | 12/1993 |
| JP | 7-16758 | * | 1/1995 |
| JP | 7-16759 | * | 1/1995 |

* cited by examiner

*Primary Examiner*—Clifford C. Shaw
(74) *Attorney, Agent, or Firm*—Morgan & Finnegan, LLP

(57) ABSTRACT

A method and apparatus for continuously spot-welding galvanized steel sheets overlapped to be bonded by way of a spot welding machine having a pair of electrodes. The galvanized steel sheets clamp a resistance increasing material including a spacer to ensure a gap between the sheets. Bonding surfaces of the galvanized steel sheets partly contact each other when the pair of electrodes pressurize the galvanized steel sheets such that a part of the gap is retained around the spacer between the bonding surfaces. The retained gap has a size in which zinc melted or vapored when a weld current flows between the electrodes can escape through a weld section of the galvanized steel sheets to outside. The method comprises the step of recording an inter-electrode resistance for each spot when the continuous spot welding is executed by the pair of electrodes. The method estimates an electrode lifetime defined by one of the number of spots and a duration of the spot welding until a sufficient nugget will not be formed by way of the electrodes according to the record of the inter-electrode resistance. The method automatically changes weld conditions to enable the continuous spot welding when the electrode lifetime reaches a predetermined electrode lifetime.

63 Claims, 35 Drawing Sheets

AUTOMATIC ASSEMBLING SYSTEM OF GALVANIZED STEEL SHEET BY SPOT WELDING

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an automatic assembling system of a galvanized steel sheet by spot welding where, in the field of automobiles and household electric appliances, spot welding is performed between the bonding or faying surfaces of members comprising at least two molded steel sheets through a galvanized layer to assemble these members as a structure.

2. Background Information

Galvanized steel sheets are being increasingly used in the field of automobiles and household electric appliances. However, problems of deterioration of the welding electrode of a welding machine have been occurring. Spot welding of a galvanized steel sheet requires a high weld current value and a long welding time (current conducting time), as compared to spot welding of a bare (non-coated) steel sheet, and consequently, deterioration of the welding electrode, that is, deformation of the welding electrode or formation of an alloy with zinc is promoted. If the welding electrode is deteriorated, the resulting weld will be unstable and, finally, a nugget will not be obtained. Accordingly, the welding electrode must be frequently replaced and the operating efficiency of the production line is reduced.

A small electric resistance value between bonding surfaces is considered to be a main cause for an early deterioration of the welding electrode. Noting this point, the inventors have recently proposed to interpose a resistance increasing material between the bonding surfaces of galvanized steel sheets which are to be jointed. Thus, the electric resistance between the bonding surfaces is increased to effect spot welding (See Japanese Unexamined Patent Publication Nos. 64-62284 and 64-62286. Japanese Patent Publication No. 5-85269 and U.S. Pat. Nos. 4,922,075 and 5,075,531). The result obtained by this attempt was an improved weld performance. That is, this welding method has the advantages that (1) the cost of electric power, (2) the chance of explosion, and (3) the welding stain are reduced, (4) marking is small, and (5) no burr occurs due to less consumption of energy in bonding. Also, with this method, melting of each welding electrode is significantly reduced, and thus smaller-sized spot welding machines can be used.

On the one hand, one problem with the spot welding of a galvanized steel sheet is that quality control is difficult. At present, an apparatus for monitoring a weld current and a voltage or resistance between electrodes is employed in quality control. Also, some nondestructive test methods have been proposed for welded portions. Furthermore, a peel test using a chisel has been widely carried out.

On the other hand, weld-bonding using bonding and welding together has recently attracted attention for the assembling of automobiles, and the range of its application is expanding gradually. While conventional spot welding results in point bonding, weld-bonding results in surface bonding. For this reason, weld-bonding can enhance bonding strength and rigidity and is effective in the weight reduction of the body of an automobile. Furthermore, the weld bonding method has advantages in that it results in an excellent vibration-impact characteristic, noise is reduced, and sealing performance is assured.

However, in the spot welding method where a resistance increasing material is interposed between bonding surfaces, apart from an experimental implementation or a case where the number of strike points or spots of welding is relatively small, when various kinds of galvanized steel sheets are used and parts with a complicated shape are welded many times for a short period of time, as in the case of automobiles, the method may be inefficient and unproductive.

More particularly, it is necessary in the aforementioned welding method that a resistance increasing material be accurately arranged at a fixed position on each bonding surface and also, just adjacent to the resistance increasing material, steel sheets electrically conduct current across the electrodes. In this case, however, the placement of the resistance increasing material cannot be confirmed from the outside. Furthermore, it is difficult in this welding method to maintain a good contact state between bonding surfaces because of the existence of the resistance increasing material. Particularly when the welding electrode is deteriorated, the current of the electrode tends to be unstable. There is the possibility that any of these disadvantages will lead to a reduction in productivity, and in spite of the remarkable improvement in welding performance, it was difficult to put this welding method to practical use in a mass production system.

Incidentally, with respect to quality control, spot welding is widely used in the assembly of automobile bodies, and it may be said that the quality of the automobile body is determined by whether the spot welding is good or bad. For example, the automobile body is constituted by 600 to 800 parts and most of them are assembled by spot welding. The number of welding strike points or spots reaches 3000 to 5000 per automobile. And, for various reasons, it is difficult to avoid occurrence of a welding defect in the manufacturing process. While the shape, marking, spatter, cracks, pit, and the like of a nugget are prescribed in judging the quality of the welded section of a galvanized steel sheet, in practice, it is considered most important to assure a proper nugget diameter. If the nugget diameter is insufficient, it will cause deterioration of an electrode or cable, reduction in the electric current value due to a fluctuation of the welding power supply voltage, and a misalignment between bonding surfaces. The fluctuation of the power supply voltage results from the simultaneous use of a plurality of spot welding machines, power use of other factories, and a difference between available day time and night time power supplies. And, in a galvanized steel sheet, the range of suitable electric current for spot welding is narrow, and a nugget may not be properly formed depending upon whether there is a variance in the electric current value. Therefore, there are good reasons why quality control is considered particularly important in the spot welding of galvanized steel sheets.

In the conventional monitoring apparatus described above, reliability is poor with respect to galvanized steel sheets, unlike the case of bare steel sheets, and consequently, there are many cases where welding lines are stopped due to problems. For this reason, the conventional monitoring apparatus is insufficient as far as improving the length of time a production line be continuously operated unmanned. In addition, in the aforementioned peel test method using a chisel, a sampling test is conducted, and if a defect is found, measures will be taken to check all previous products and carry out the spot welding again. Consequently, the labor costs of the test and the costs of abandoning the defective products have been excessive.

Under such circumstances, it is desirable that quality be guaranteed within a process, and the development of a monitor which checks all welded sections while they are welded is in demand. Furthermore, even in the case of the conventional weld bonding method, the aforementioned troubles resulting from deterioration of an electrode remain as they are.

Accordingly, it is a first objective of the present invention to improve the spot welding of a galvanized steel sheet using a resistance increasing material and to maintain excellent welding performance and high productivity under a mass production system.

It is a second objective of the present invention to solve problems in the quality control of welded sections and to overcome troubles associated with the quality of welding in advance under a mass production system. An in-process quality test is performed by checking all welded sections at the same time they are welded and also the troubles associated with the quality of welding are monitored in advance.

It is a third objective of the present invention, under a mass production system to apply a sealing function or an adhesive function to a welded section and to form the welded section such that assurance of sealing performance and enhancement in rigidity are high without increasing costs while achieving the first and second objectives.

In this research, the development of a resistance increasing material suitable for the present system was first attempted. Spot welding where the resistance increasing material is interposed between bonding surfaces has excellent welding performance, but has not yet been put to practical use, particularly under a mass production system. The main reason is that the resistance increasing material has been considered difficult to efficiently interpose between bonding surfaces. Therefore, in the present research, the development of a resistance increasing material which is easy to be interposed between bonding surfaces was considered. Particularly, a spacer, for example, alumina powder is incorporated into an adhesive material, and a necessary amount of the mixture is properly fed and arranged on a fixed layer on the bonding surface by means of an automatic coating machine. Also, a perforated tape, coated on both sides with an adhesive, can be used.

It should be noted that the resistance increasing material used in the present system should have excellent welding performance, a stable strike point over a long period of time, and a large resistance increasing effect in order to achieve the second objective of the invention, i.e., an in-process quality guarantee and adaptive successive automatic operation. A large resistance increasing effect causes an amount of reduction in an inter-electrode resistance value resulting from formation of a nugget to be increased, and consequently, it is conceivable that whether a nugget is a success or a failure can be accurately determined.

Furthermore, the resistance increasing material used in the present system must be one where a reduction in an adhesive force and in a sealing function does not occur by incorporation of the resistance increasing material in order to induce an adhesive effect to a welded section, which is the aforementioned third object. A suitable adhesive which achieves the aforementioned first and second objectives must be selected.

Taking these various points into consideration, the present inventors have conducted research and experiments seeking a resistance increasing material suitable for the present system.

An adaptive control system should be additionally discussed. The adaptive control system comprises a detection step, a calculation step, a step for judging whether a nugget is a success or a failure, a second recording step, an estimation step, and a control step, which are incorporated in the system of the present invention. This adaptive control system is aimed at the variation in the electrical characteristic between weld electrodes which occurs during successive stride points under a mass production system. The variation in the electrical characteristic includes, for example, an electric resistance value, i.e., a variation in an inter-electrode resistance value.

More specifically, the electrical characteristic between weld electrodes in the current conducting time of a weld current is detected in the detection step. Then, in the calculation step, the inter-electrode resistance value is calculated from the detected electrical characteristic, also a resistance value variation characteristic is calculated from the inter-electrode resistance value, and from this calculation result, an in-process quality guarantee is assured in the first and second judgment steps. Furthermore, in the second recording step, at least one kind of variation of the electrical characteristic, the inter-electrode resistance value, and the resistance value variation is recorded in detail during successive strike points. In the estimation step, the recorded data is analyzed and it is predicted from this result that a nugget is not formed as the welding electrode is deteriorated. Then, the weld conditions are altered in the control step. For the alteration of the weld conditions in the adaptive control step, there are, for example, several possibilities including grinding of the weld electrode, increasing welding pressure, extending current conducting time, and/or increasing the set electric current value. By automatically performing these controls, high productivity can be maintained and sound nuggets can be assured.

The aforementioned inter-electrode resistance value consists of a contact resistance between a welding electrode and a base member to be bonded, an inter-sheet resistance between the bonding surfaces of the base members, and an intrinsic resistance of the base members. The inter-electrode resistance value can be measured at a production line during welding. In the case of galvanized steel sheets, however, there is an established theory that the values give no information as to formation of nuggets. That is, the inter-sheet resistance disappears as a nugget is formed, but the current conducting time is long in the case of a normal welding method. For example, in a case where two galvanized steel sheets having a thickness of 0.8 mm are bonded together, a current conducting time of about 10 cycles is required. For this reason, the temperature of the base member rises during this welding, and consequently, the intrinsic resistance of the base member increases. The change in the inter-electrode resistance value where the inter-sheet resistance and the intrinsic resistance are summed does not always indicate the success or the failure of a nugget.

On the other hand, in the system of the present invention where a resistance increasing material is applied on each bonding surface the inter-sheet resistance value itself is high and also the current conducting time is short (about 3 cycles). Therefore, in the system of the present invention, there is the possibility that the disappearance of the inter-sheet resistance value resulting from formation of a nugget can be effectively detected. If such detection can be realized, the change in the inter-sheet resistance value can be examined in detail. Accordingly, not only the success or the failure of a nugget but also misformation of a nugget resulting from the deterioration of the welding electrode during successive strike points can be predicted, and the development of an adaptive control meeting the demand becomes possible.

Incidentally, there are a large number of influencing factors for the change in the inter-electrode resistance value of a galvanized steel sheet. In the galvanized steel sheet, if a weld current is conducted, zinc between the welding electrode and the galvanized steel sheet or between the bonding surfaces of the galvanized steel sheets will be first melted because its melting point is low. For the bonding surfaces, the melted zinc is evaporated and expanded and is discharged outside of an area where a nugget is formed. Then, the temperature of the bonding surface becomes higher than those of other sections, part of the steel sheet is melted and mixed, and a nugget is formed. When the nugget is formed, the inter-sheet resistance value will disappear.

Between the welding electrode and the galvanized steel sheet, a portion of zinc is melted and alloyed with the material of the welding electrode comprising copper or a copper alloy, and consequently, the electrode is gradually deteriorated. On the one hand, the temperature of the galvanized steel sheet continues to increase during the current conducting time due to its intrinsic resistance.

These phenomena are different in rate of progression depending upon the weld conditions, and consequently, the inter-electrode resistance value also varies in a complicated manner. The following are specific main factors which are considered to be related to the variation characteristic of the inter-electrode resistance value while the weld current is flowing.

1. Deterioration of Welding Electrode

If the welding electrode is deteriorated, problems will occur in the contact between the welding electrode and the galvanized steel sheet and the resistance value between the welding electrode and the base member will vary. As a result, the state of generation of heat will vary and therefore the melting and evaporation state of zinc will also vary. If zinc is melted, the resistance value will be greatly reduced. These phenomena influence each other and the inter-electrode resistance value varies in a complicated manner. On the other hand, between the bonding surfaces, the current density of the weld current is reduced due to the deterioration of the welding electrode, and the temperature rise in the bonding surfaces is delayed.

2. State of Galvanized Steel Sheets Which are Going to be Bonded Together

For workpieces of pressed members (members being fed on a production line), a problem of fit up occurs between the bonding surfaces. If fit up is insufficient, the contact area will become smaller. In this situation, the inter-sheet resistance value is high and insufficient bonding causes misconducting and irregular conducting of the weld current to occur. Also, since the welding current flows locally, the diameter of the nugget is insufficient.

3. Material and thickness of a Base Member or a Coated Layer

If a base member or a coated layer is thick, the temperature rise will be delayed and the inter-electrode resistance value will vary depending on the thickness of the base member or the coated layer.

4. The Number of Overlapped Steel Sheets

In a case where three or more galvanized steel sheets are overlapped and welded, the times when nuggets are formed are different at two or more bonding surfaces and the inter-electrode resistance value also changes.

5. Weld Current

The inter-electrode resistance values during current conducting are different between a case where the set value of a weld current is low and a case where the set value is high.

As described above, there are a large number of factors for affecting the variation in the inter-electrode resistance value of the galvanized steel sheet. Therefore, when manufacturing industrial products comprising a wide variety of members, particularly when manufacturing products by means of a mass production system, the nugget diameter and the variation in the inter-electrode resistance value need to be more accurately correlated for respective cases.

SUMMARY OF THE INVENTION

According to a first aspect of the invention, there is provided a spot welding system for assembling at least two initial members formed from a galvanized steel sheet into a structural member by spot welding bonding surfaces of the initial members through galvanized layers on the bonding surfaces by way of a spot welding machine having a pair of weld electrodes.

The system comprises the steps of:

placing a resistance increasing material at a predetermined position on the bonding surface of one of the initial members;

overlapping the other of the initial members on the one of the initial members while clamping the resistance increasing material between the initial members;

positioning a center axis passing through the pair of weld electrodes over substantially the center of the resistance increasing material clamped between the bonding surfaces to apply a predetermined pressure by the weld electrodes to the resistance increasing material and the initial members;

flowing a weld current having a predetermined value between the weld electrodes in a predetermined time;

detecting electric characteristics with respect to the weld electrodes in the predetermined time;

calculating an inter-electrode resistance based on the detected electric characteristics and calculating characteristics of resistance change based on the inter-electrode resistance;

determining success or failure in forming a nugget between the bonding surfaces by comparing the characteristics of resistance change with a predetermined standard;

automatically changing weld conditions upon the determination of failure in the determining step and primarily compensating the forming of the nugget;

comparing the predetermined standard with characteristics of resistance change additionally calculated after the compensating step and secondarily determining success or failure in forming the nugget;

recording the determination of failure in forming the nugget in the secondarily determining step;

continuously recording at least one of the electric characteristics, the inter-electrode resistance and the characteristics of resistance change during continuous spot welding by using the identical weld electrodes;

estimating the number of spots or the duration of spot welding until the successful nugget will not be formed according to the record in the continuously recording step;

automatically controlling to change subsequent weld conditions when the estimated number or duration reaches a predetermined standard;

secondarily compensating the forming of nugget by activating an additional back-up system when it is determined that the nugget is not formed according to the record in the continuously recording step or due to an unexpected accident occurred in the series of the steps; and conveying the initial members between the steps, the steps being adapted to constitute a production line totally controlled by a host computer.

According to a second aspect of the invention, there is provided a spot welding system effecting the steps of:

placing a resistance increasing material at a predetermined position on the bonding surface of one of the initial members;

overlapping the other of the initial members on the one of the initial members while clamping the resistance increasing material between the initial members;

positioning a center axis passing through the pair of weld electrodes over substantially the center of the resistance increasing material clamped between the bonding surfaces to apply a predetermined pressure by the weld electrodes to the resistance increasing material and the initial members;

flowing a weld current having a predetermined value between the weld electrodes in a predetermined time;

detecting electric characteristics with respect to the weld electrodes in the predetermined time;

calculating an inter-electrode resistance based on the detected electric characteristics and calculating characteristics of resistance change based on the inter-electrode resistance;

determining success or failure in forming a nugget between the bonding surfaces by comparing the characteristics of resistance change with a predetermined standard;

automatically changing weld conditions upon the determination of failure in the determining step and primarily compensating the forming of the nugget;

comparing the predetermined standard with characteristics of resistance change additionally calculated after the compensating step and secondarily determining success or failure in forming the nugget; and recording the determination of failure in forming the nugget in the secondarily determining step.

According to a third aspect of the invention, there is provided a spot welding system effecting the steps of:

placing a resistance increasing material at a predetermined position on the bonding surface of one of the initial members;

overlapping the other of the initial members on the one of the initial members while clamping the resistance increasing material between the initial members;

positioning a center axis passing through the pair of weld electrodes over substantially the center of the resistance increasing material clamped between the bonding surfaces to apply a predetermined pressure by the weld electrodes to the resistance increasing material and the initial members;

flowing a weld current having a predetermined value between the weld electrodes in a predetermined time;

detecting electric characteristics with respect to the weld electrodes in the predetermined time;

calculating an inter-electrode resistance based on the detected electric characteristics and calculating characteristics of resistance change based on the inter-electrode resistance;

determining success or failure in forming a nugget between the bonding surfaces by comparing the characteristics of resistance change with a predetermined standard;

automatically changing weld conditions upon the determination of failure in the determining step and primarily compensating the forming of the nugget;

comparing the predetermined standard with characteristics of resistance change additionally calculated after the compensating step and secondarily determining success or failure in forming the nugget;

recording the determination of failure in forming the nugget in the secondarily determining step;

continuously recording at least one of the electric characteristics, the inter-electrode resistance and the characteristics of resistance change during continuously spot welding;

estimating the number of spots or the duration of spot welding until the successful nugget will not be formed according to the record in the continuously recording step; and automatically controlling to change subsequent weld conditions when the estimated number or duration reaches a predetermined standard.

It is desirable that the changing the weld conditions for the primarily compensating step includes prolonging the duration for flowing the weld current.

When the successful nugget is not formed according to the record in the continuously recording step or due to an unexpected accident, it is preferred to secondarily compensate for the failure by activating an additional back-up system.

It is desirable that the estimating step estimate the number of spots or duration until a sufficient nugget will not be obtained by comparing a predetermined standard with a resistance value variation characteristic during the successive spot welding. It is also desirable that the alteration of the weld conditions in the controlling step be an automatic grinding of the weld electrodes.

It is also possible in the estimation step to estimate the number of spots or duration until a sufficient nugget will not be obtained by comparing a predetermined reference with a frequency of irregular current conducting during successive spot welding. The alteration of the weld conditions in the controlling step may also be an increase in the electrode pressure (weld force).

The alteration of the weld conditions in the controlling step may also be the extension of the predetermined current conducting time of the weld current.

The alteration of the weld conditions in the controlling step may also be an increase in a predetermined electric current value.

It is possible in the overlapping step to use a spacer to ensure a gap between the bonding surfaces of steel sheets to be bonded.

It is desirable that the resistance increasing material be one which, in the pressurizing step, leaves a part of the gap around the spacer between the bonding surfaces such that the bonding surfaces may partially contact each other.

It is desirable that the resistance increasing material leave, in the pressurizing step, a part of the gap around the spacer between the bonding surfaces such that the bonding surfaces may partially contact each other, and it is desirable that the retained gap have such a size as to let the melted or evaporated zinc escape.

The resistance increasing material is a mixture of poorly electrically conductive particles and an adhesive material. It is preferred that the particles function as a spacer, and the adhesive material foam or the adhesive force be increased, when heated or aged.

The resistance increasing material may also be a perforated tape having an adhesive coated on its opposing faces.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

Figure 11A:
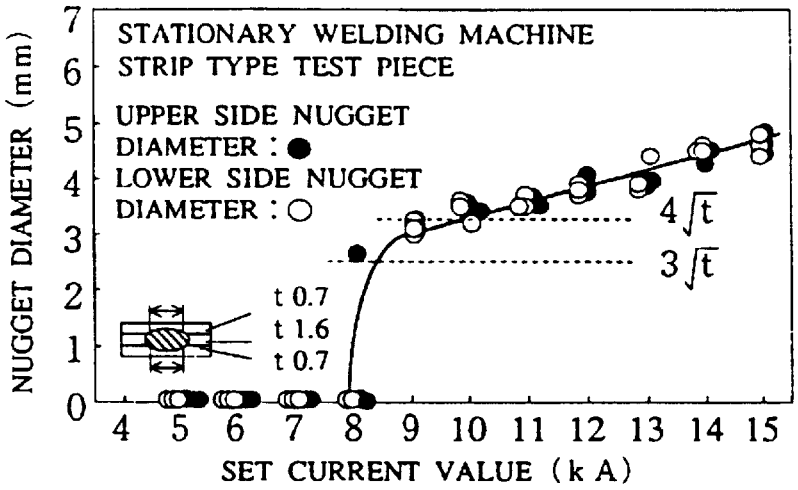
Figure 11B:
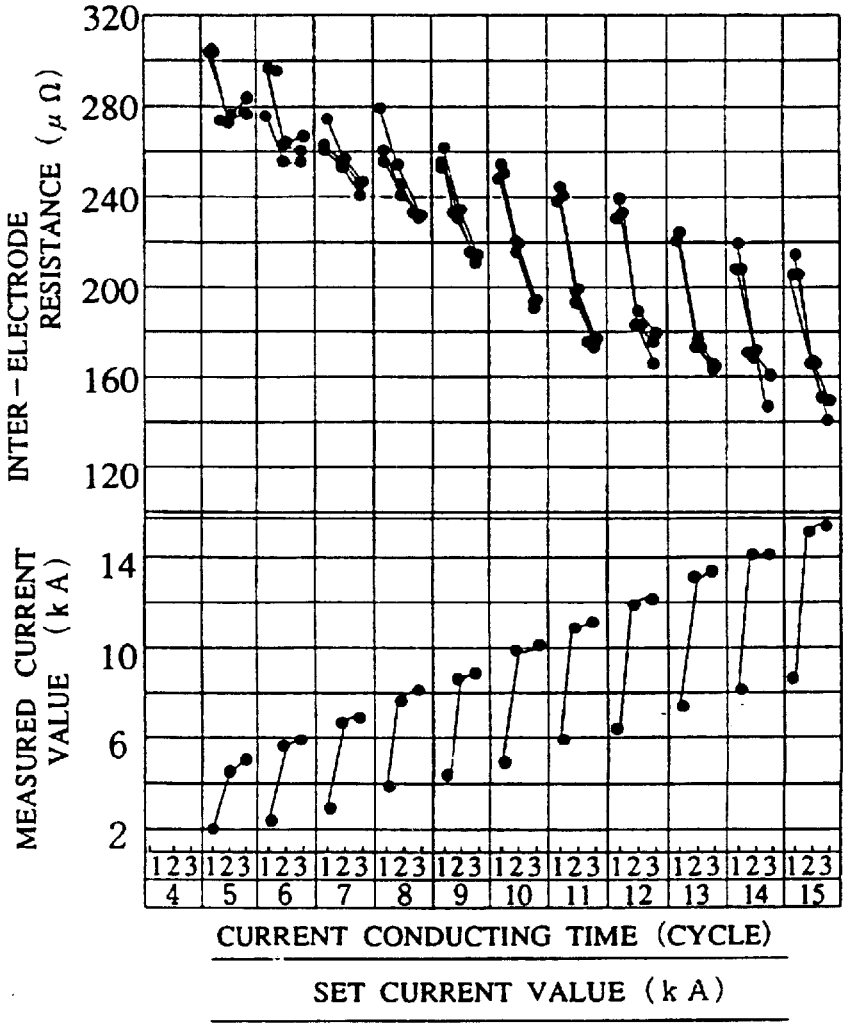
Figure 12A:
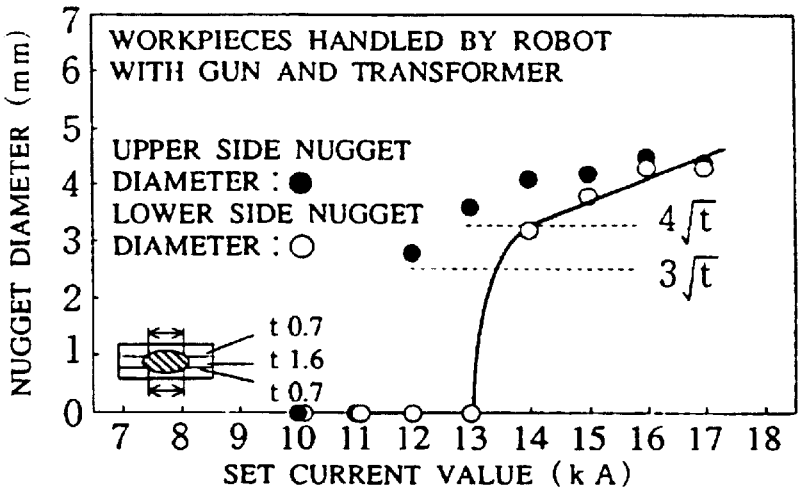
Figure 12B:
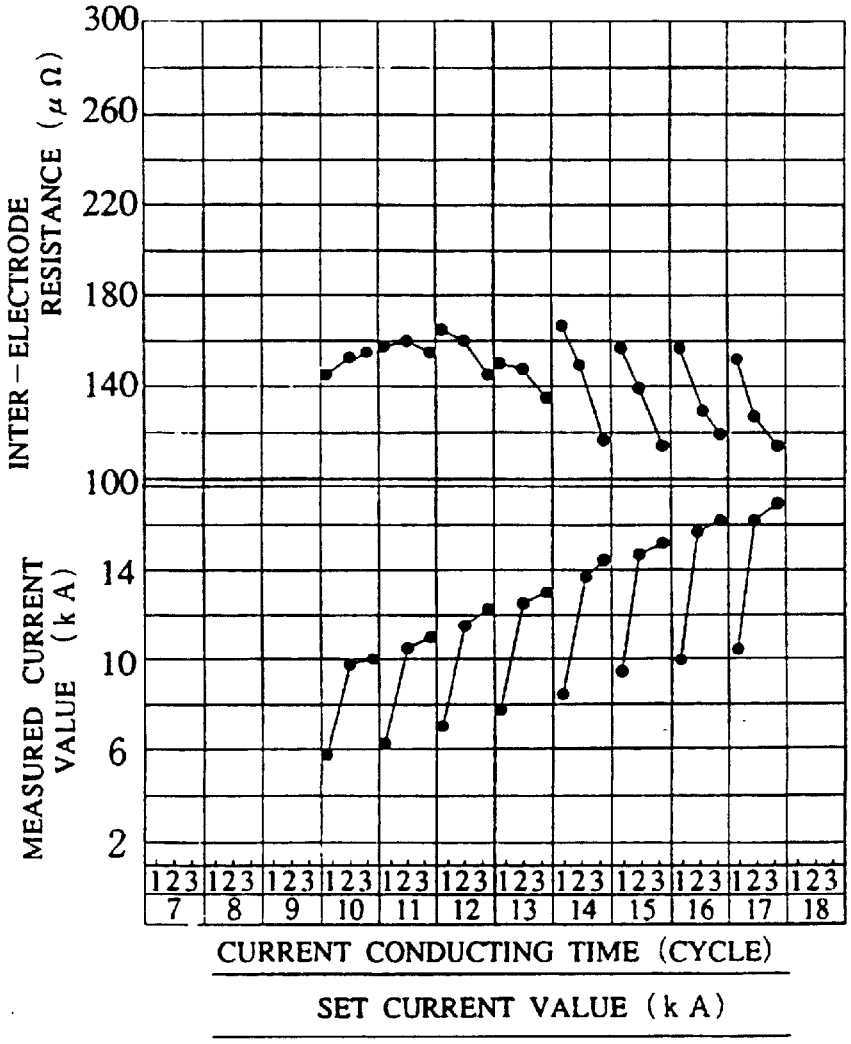
Figure 13A:
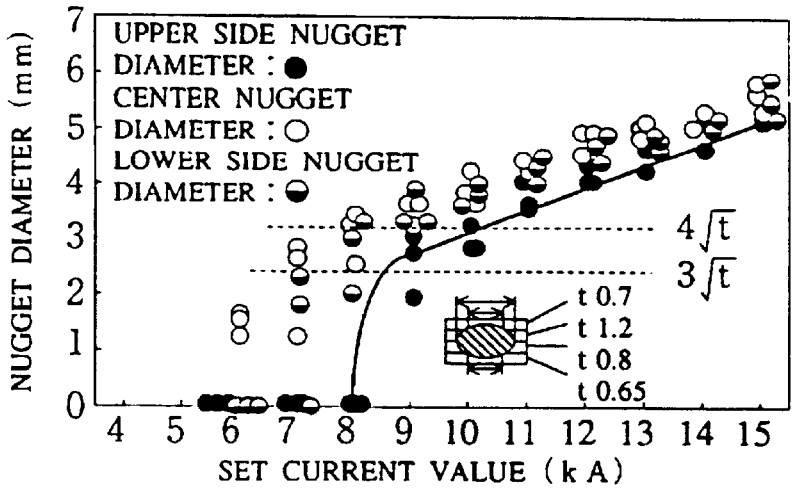
Figure 13B:
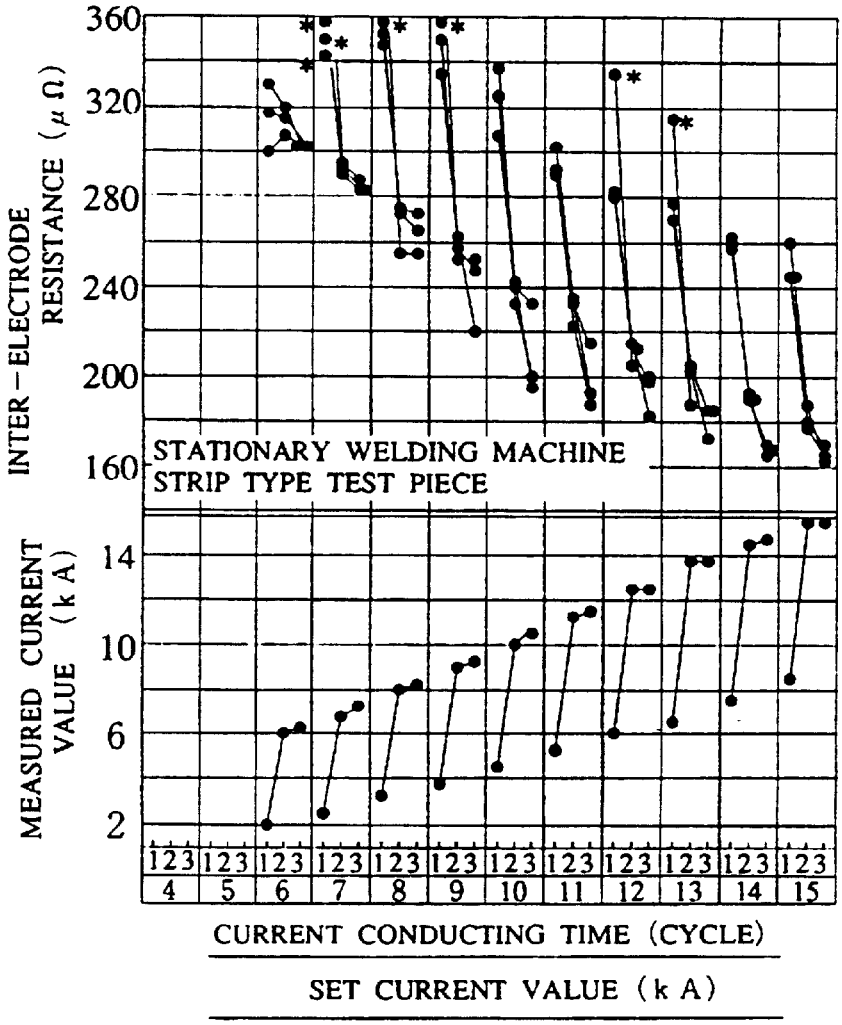
Figure 14A:
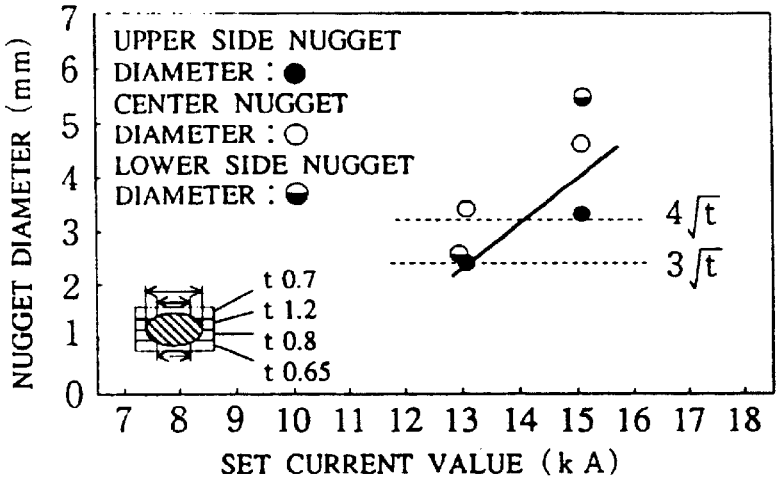
Figure 14B:
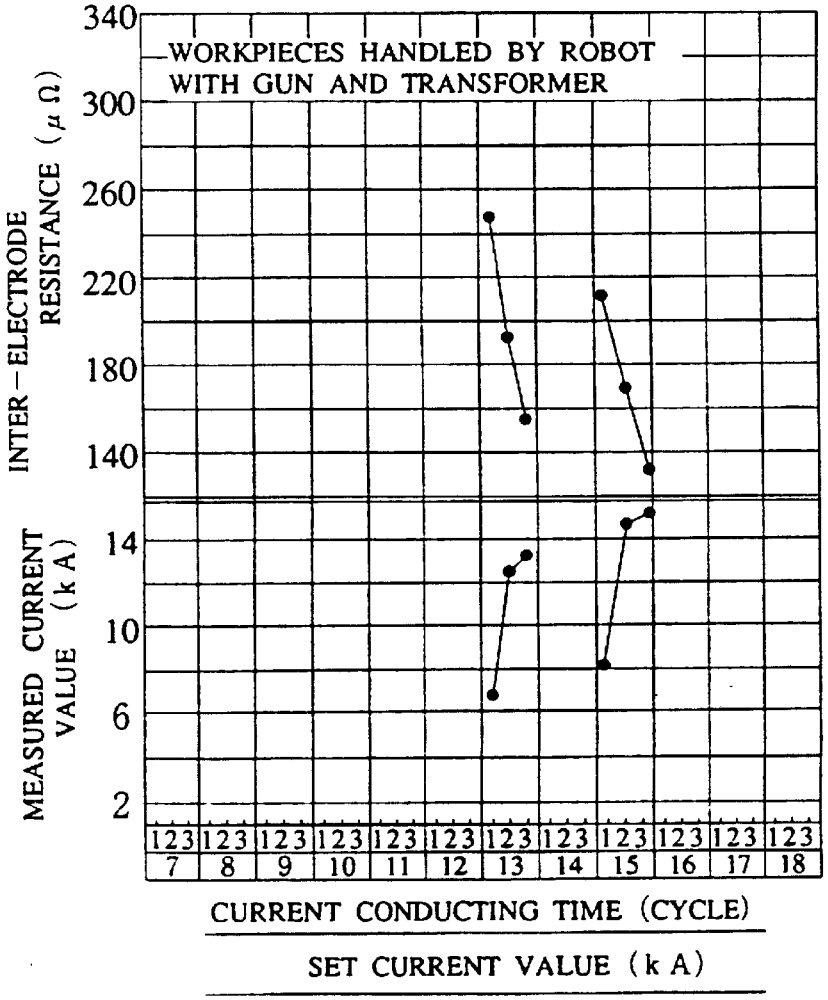
Figure 15:
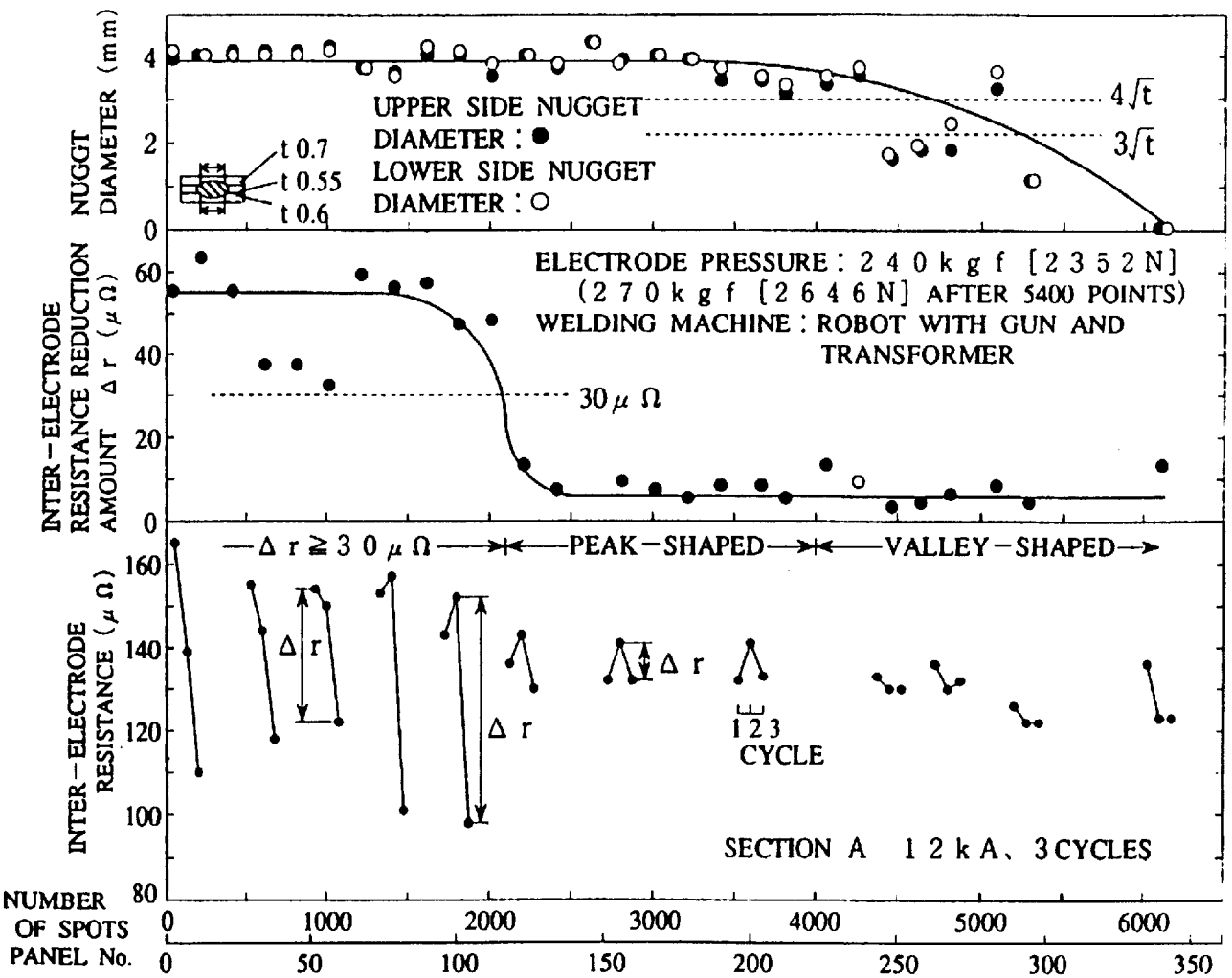
Figure 16:
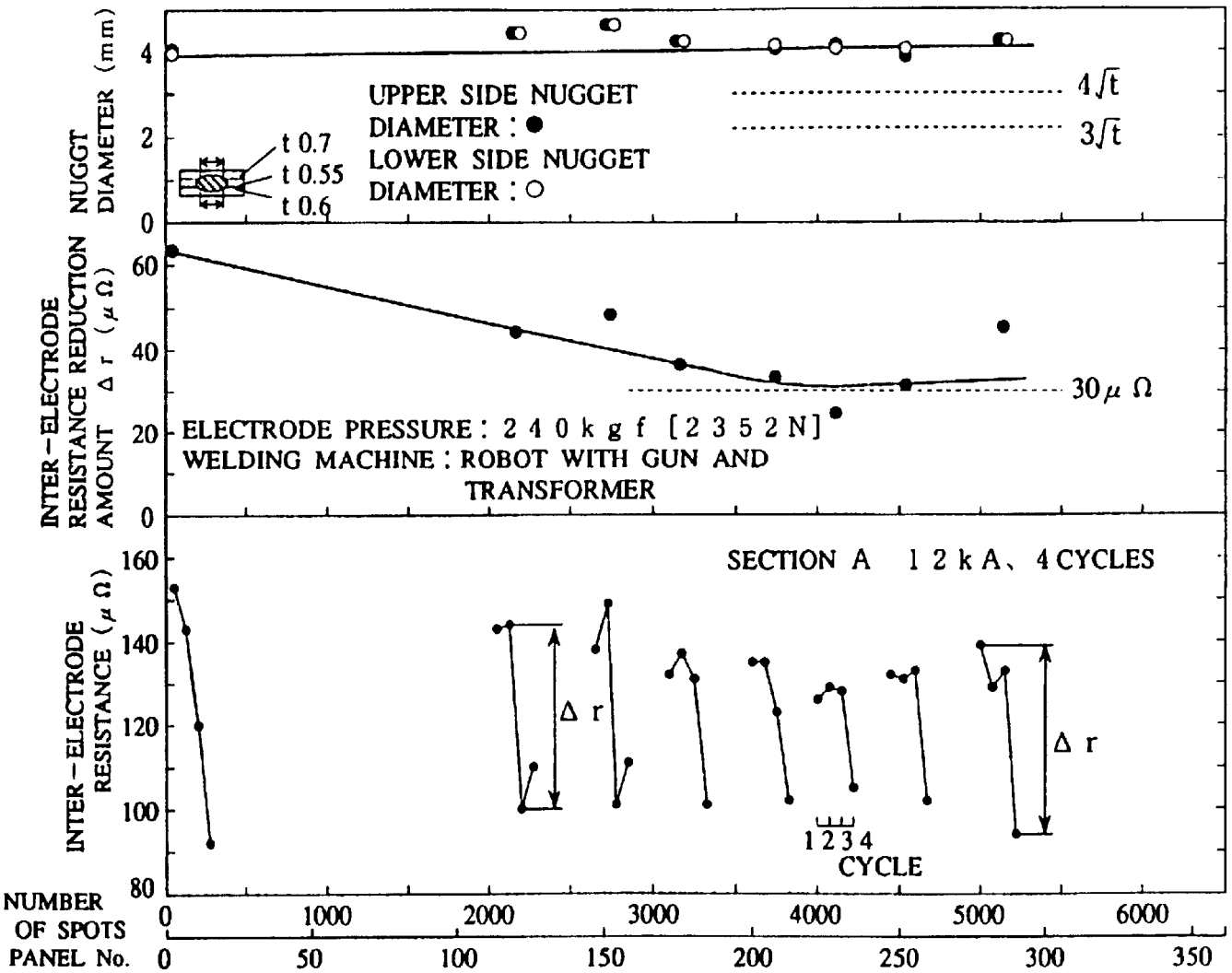
Figure 17:
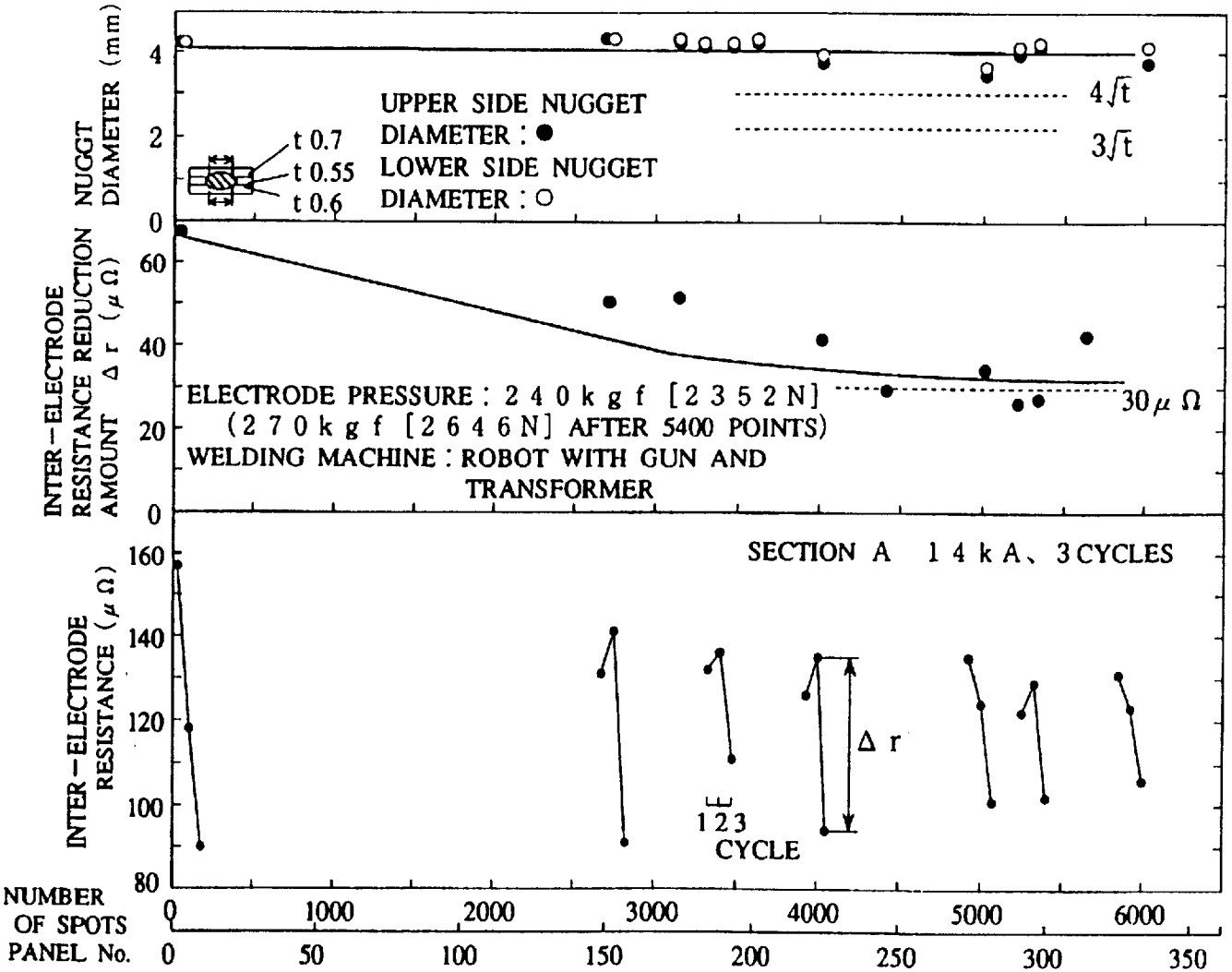
Figure 18:
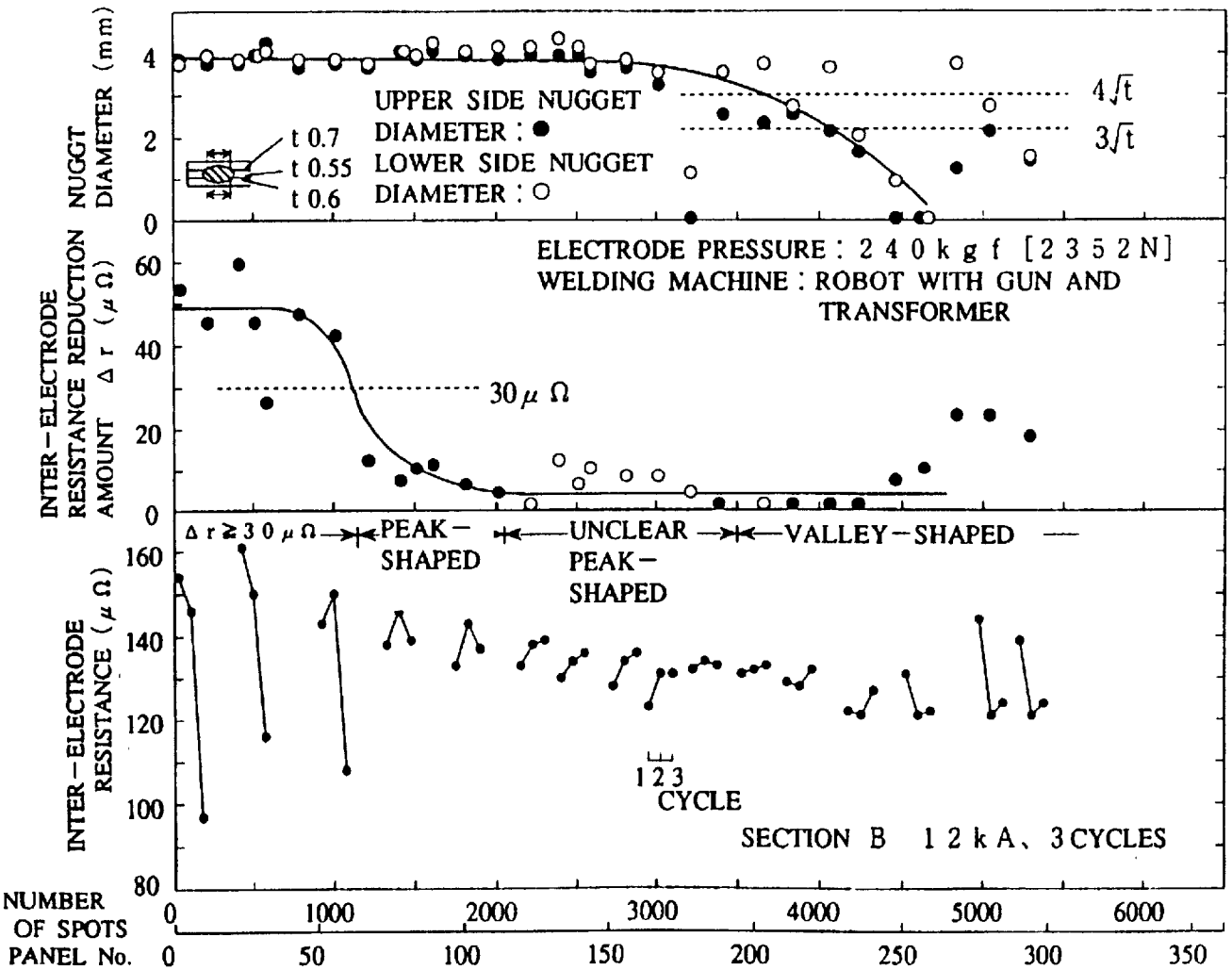
Figure 19:
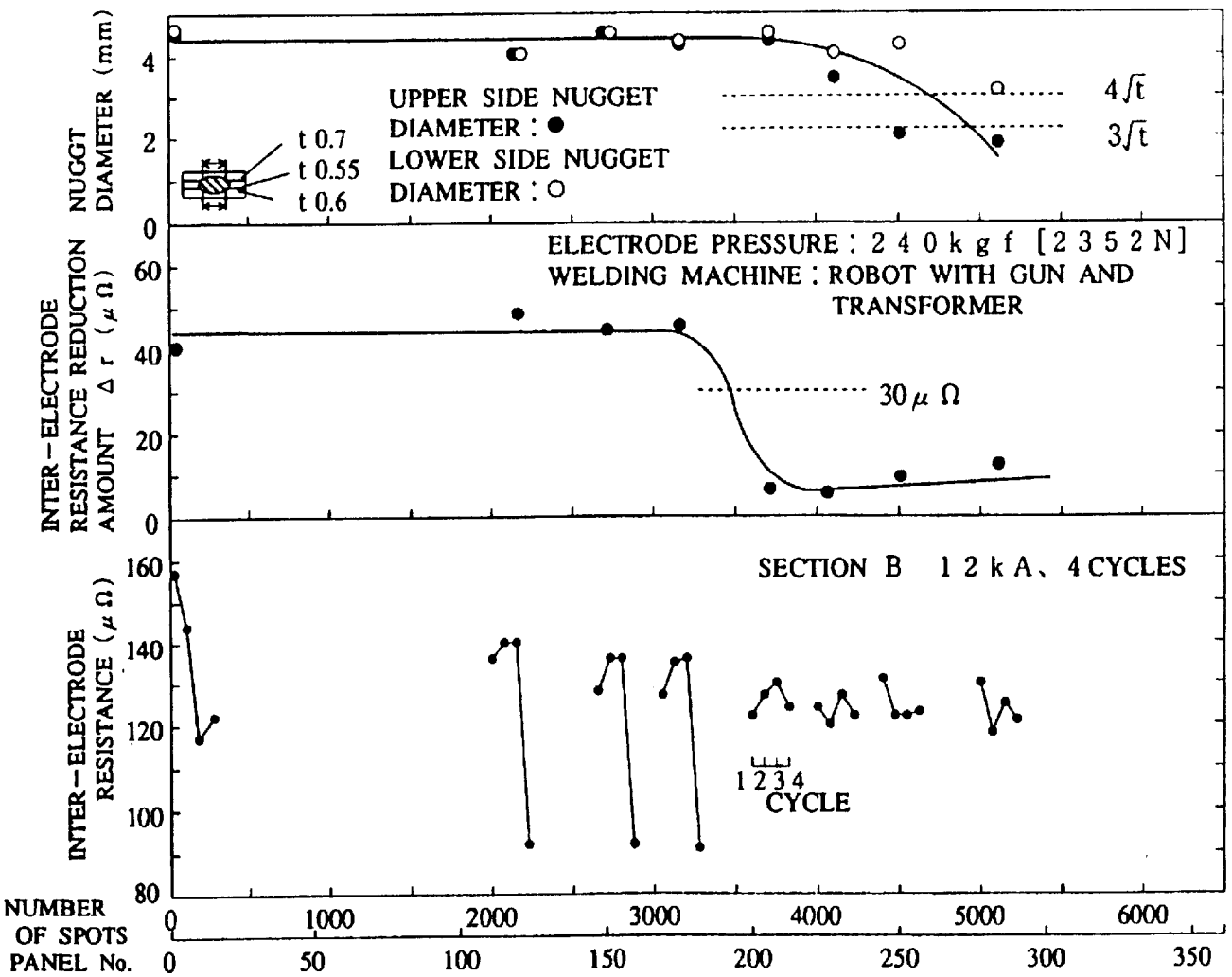
Figure 20:
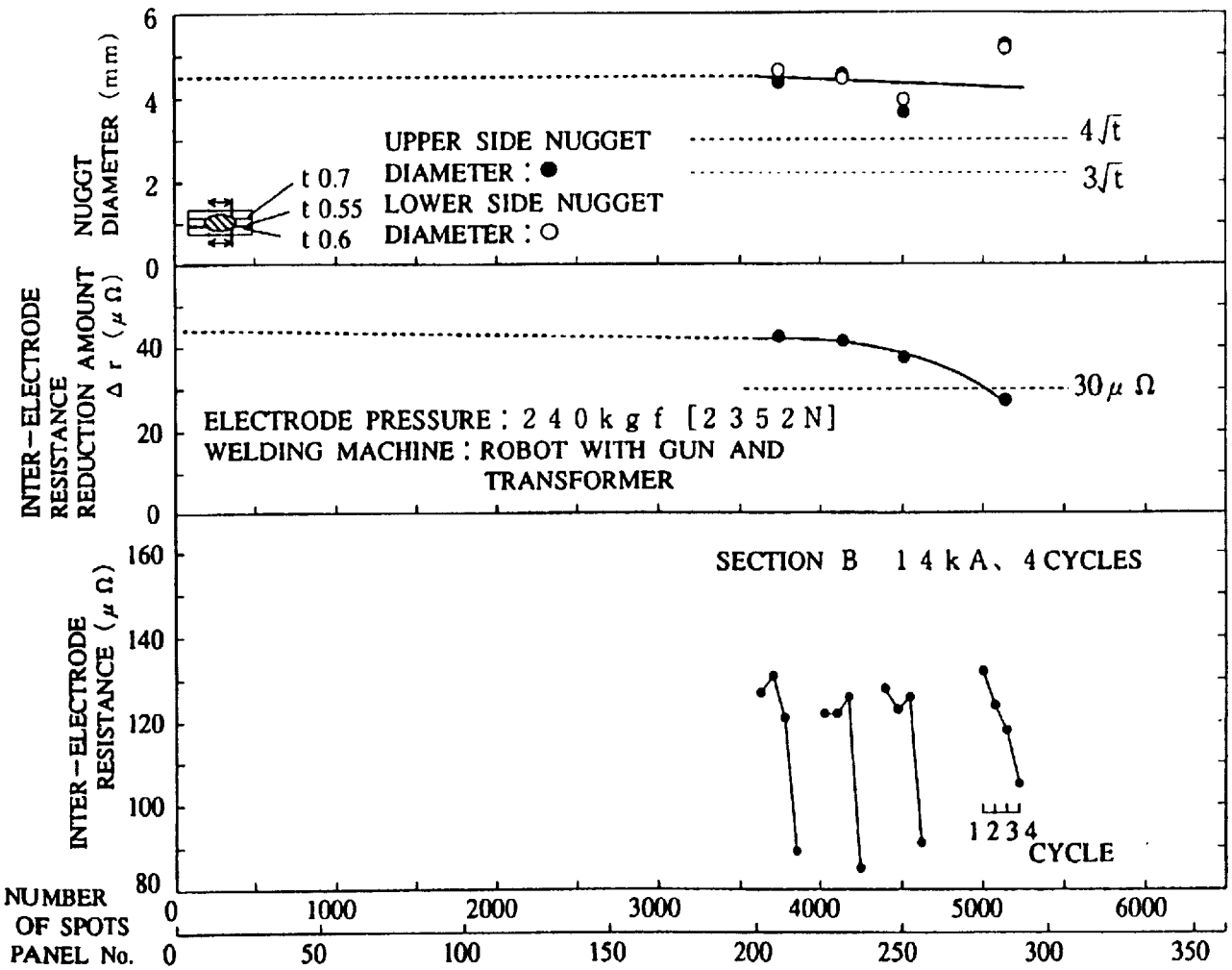
Figure 21:
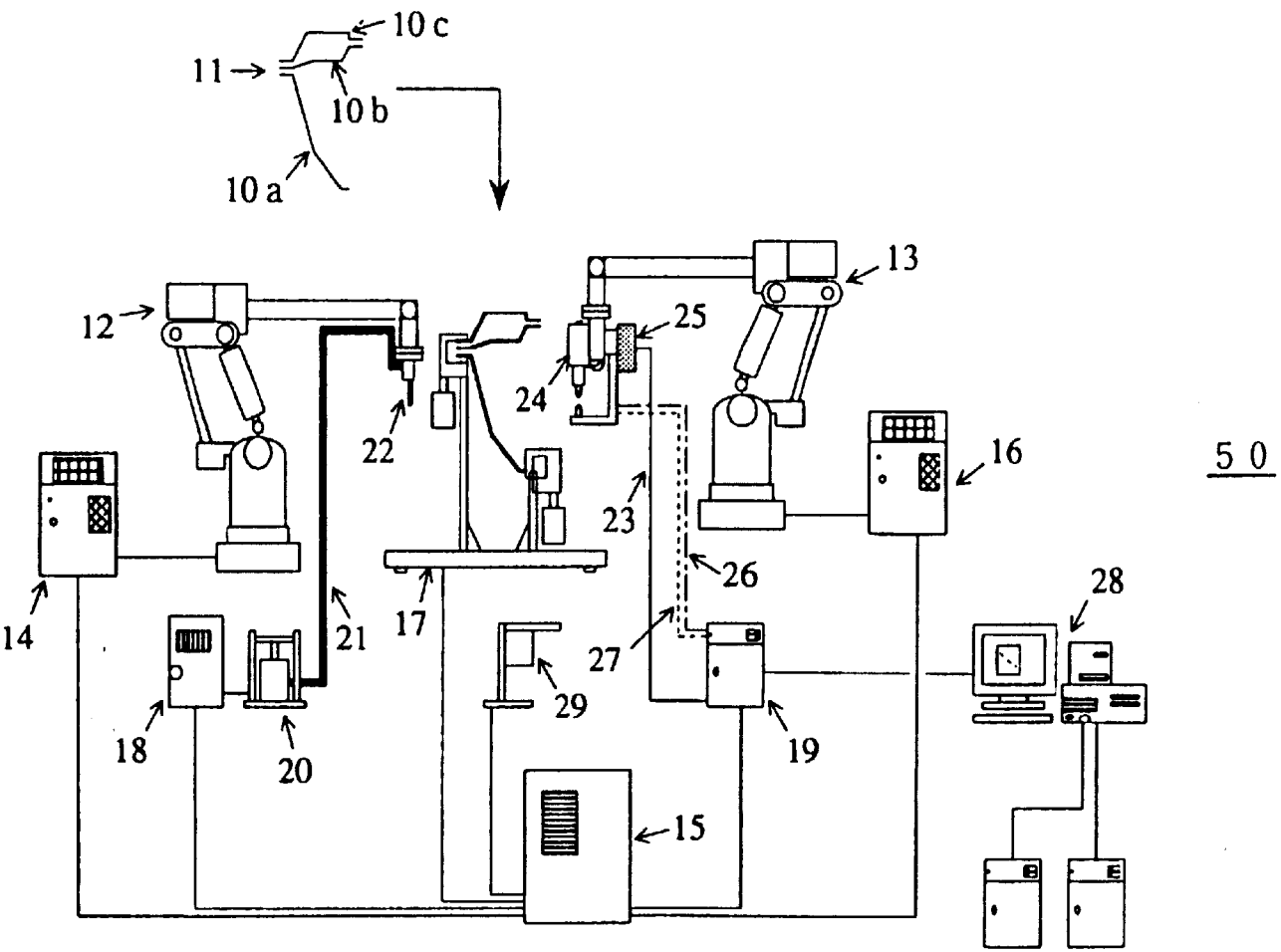
Figure 22:
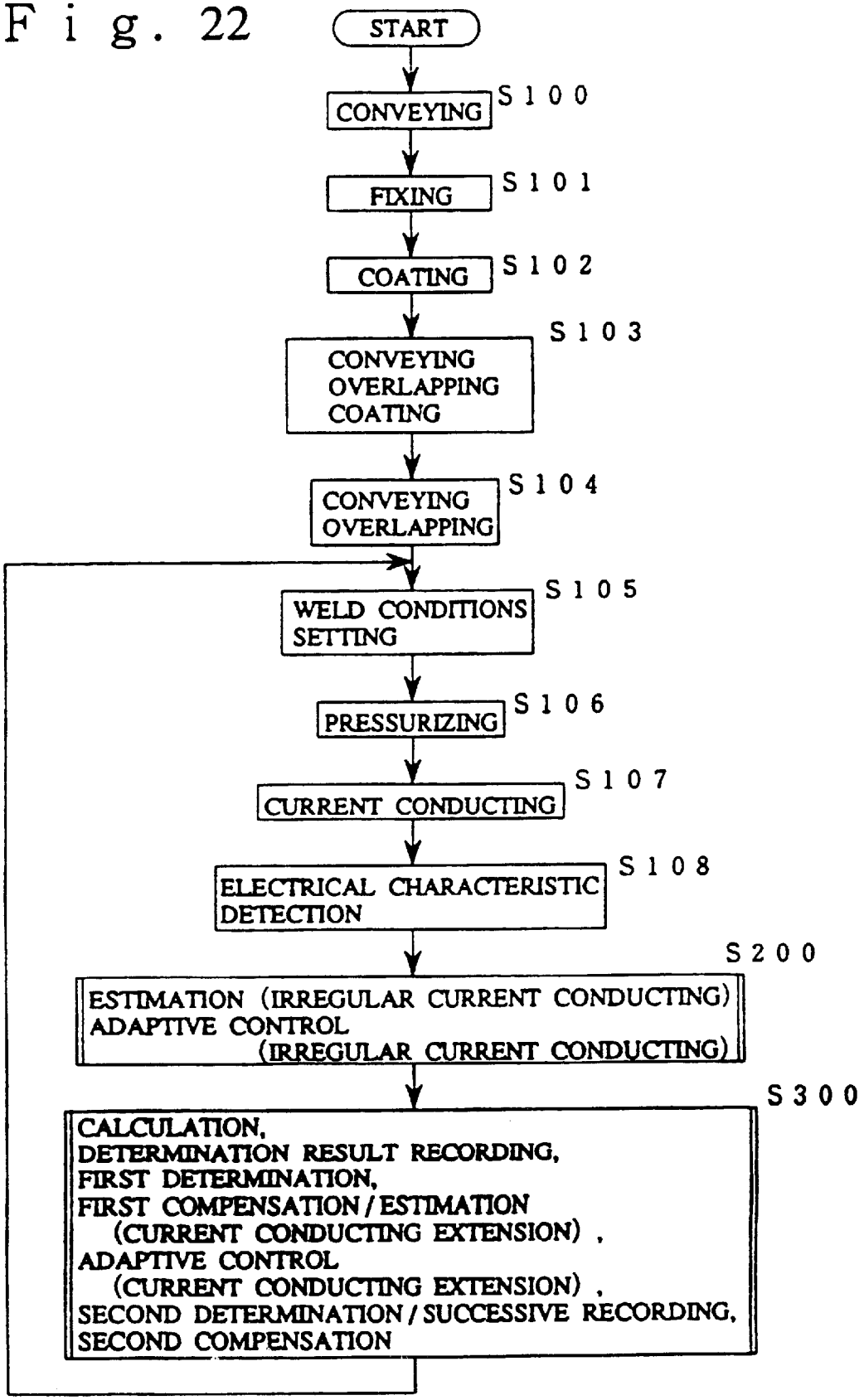
Figure 23:
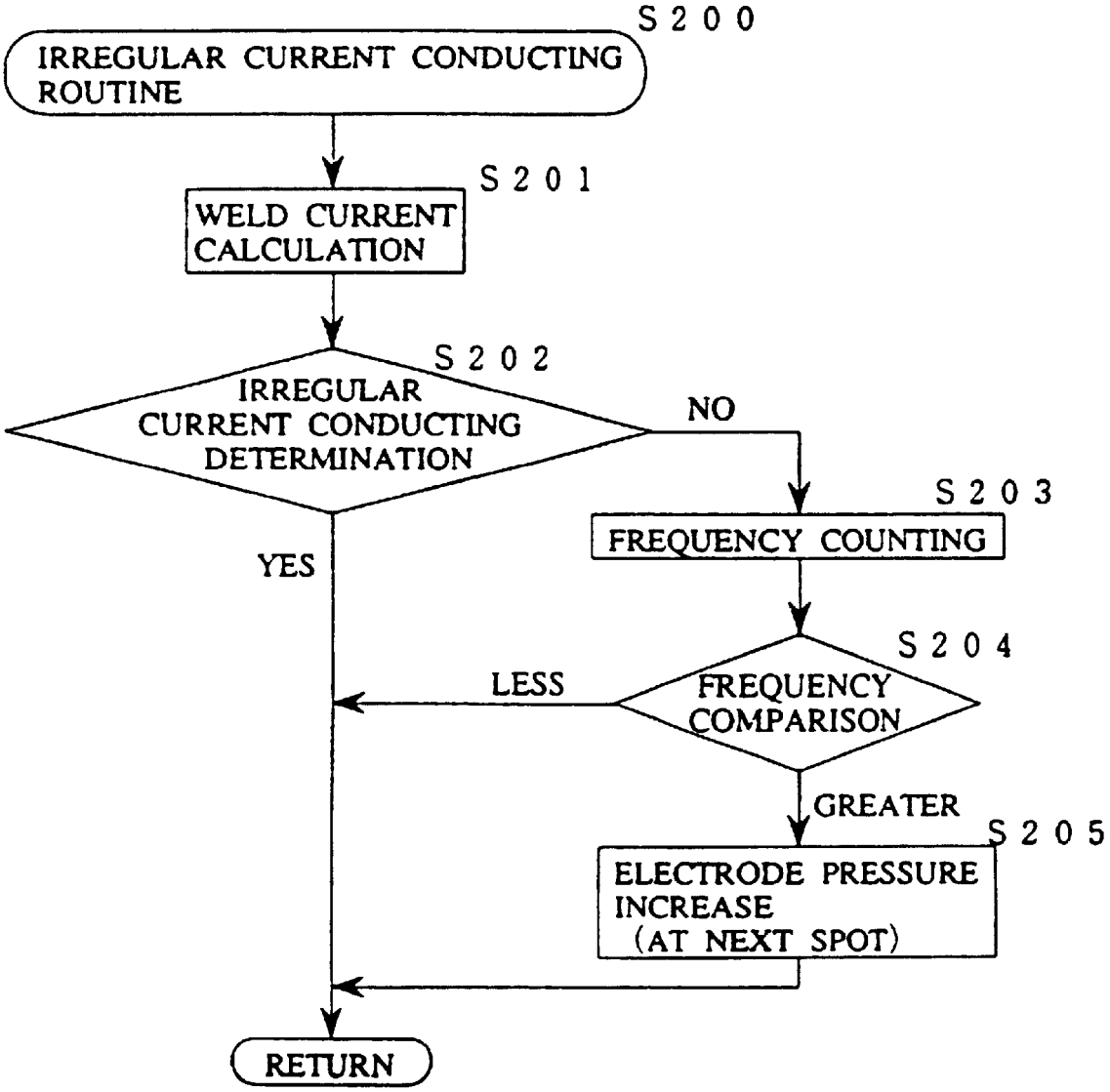
Figure 24:
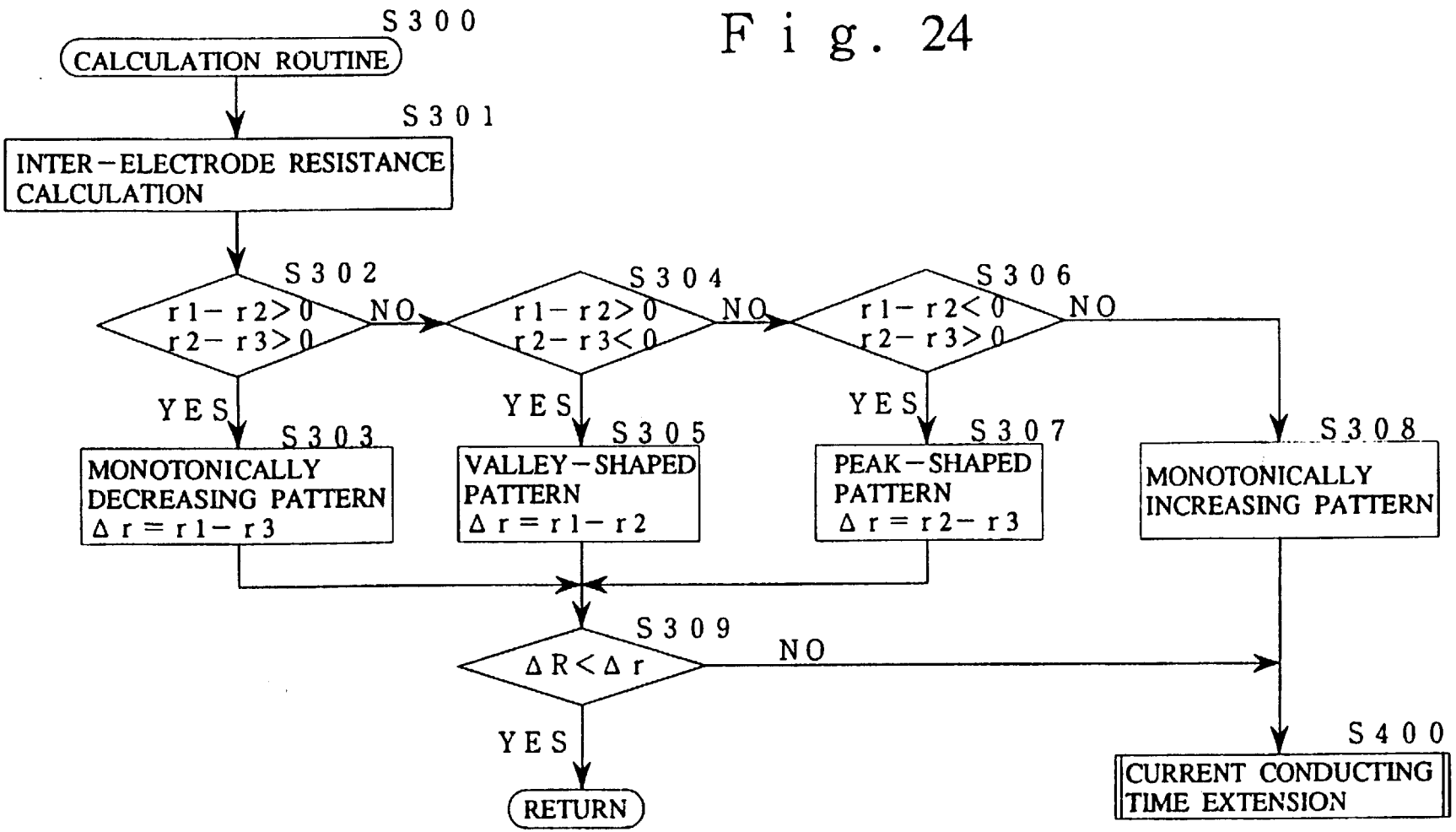
Figure 25:
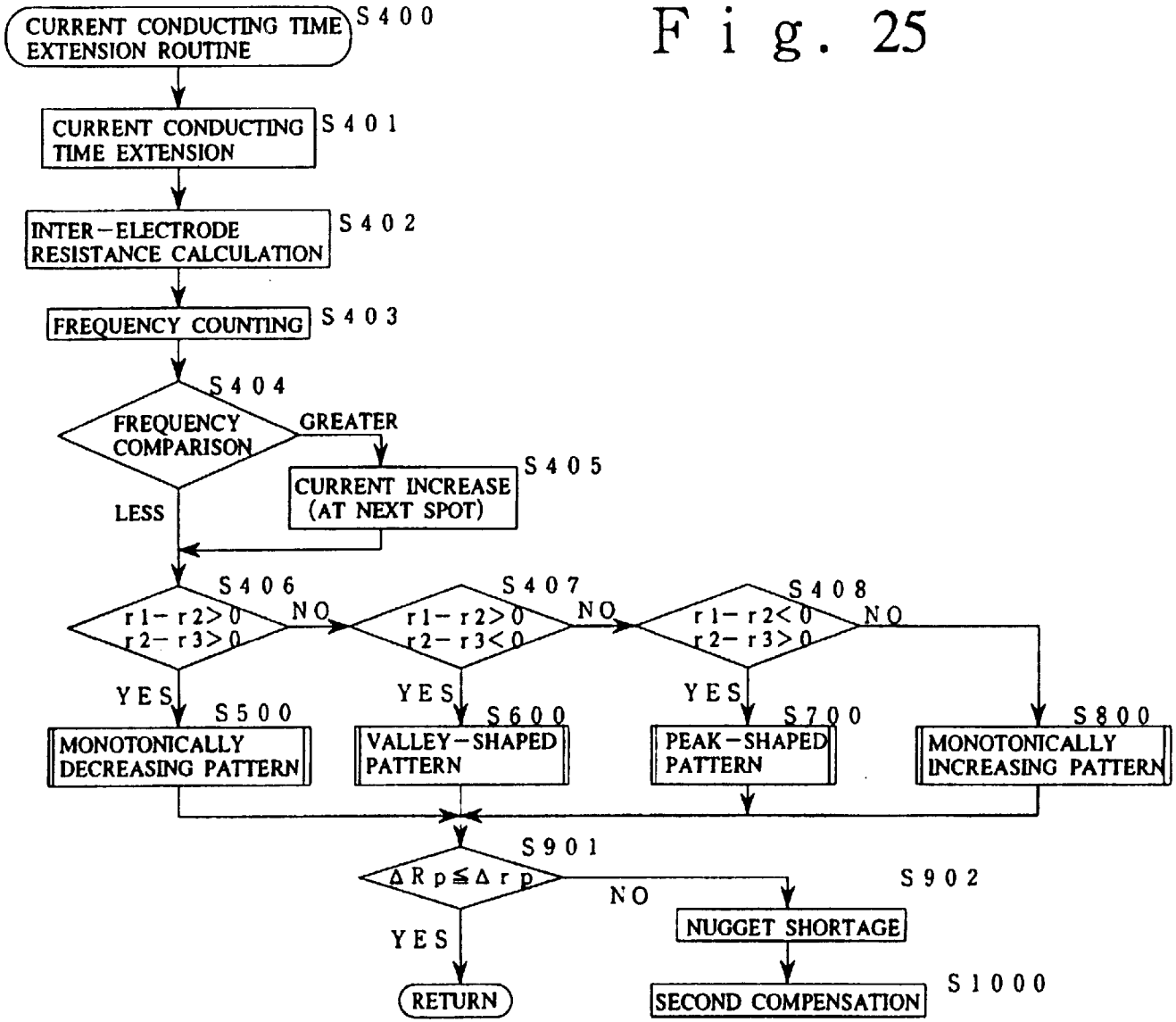
Figure 26:
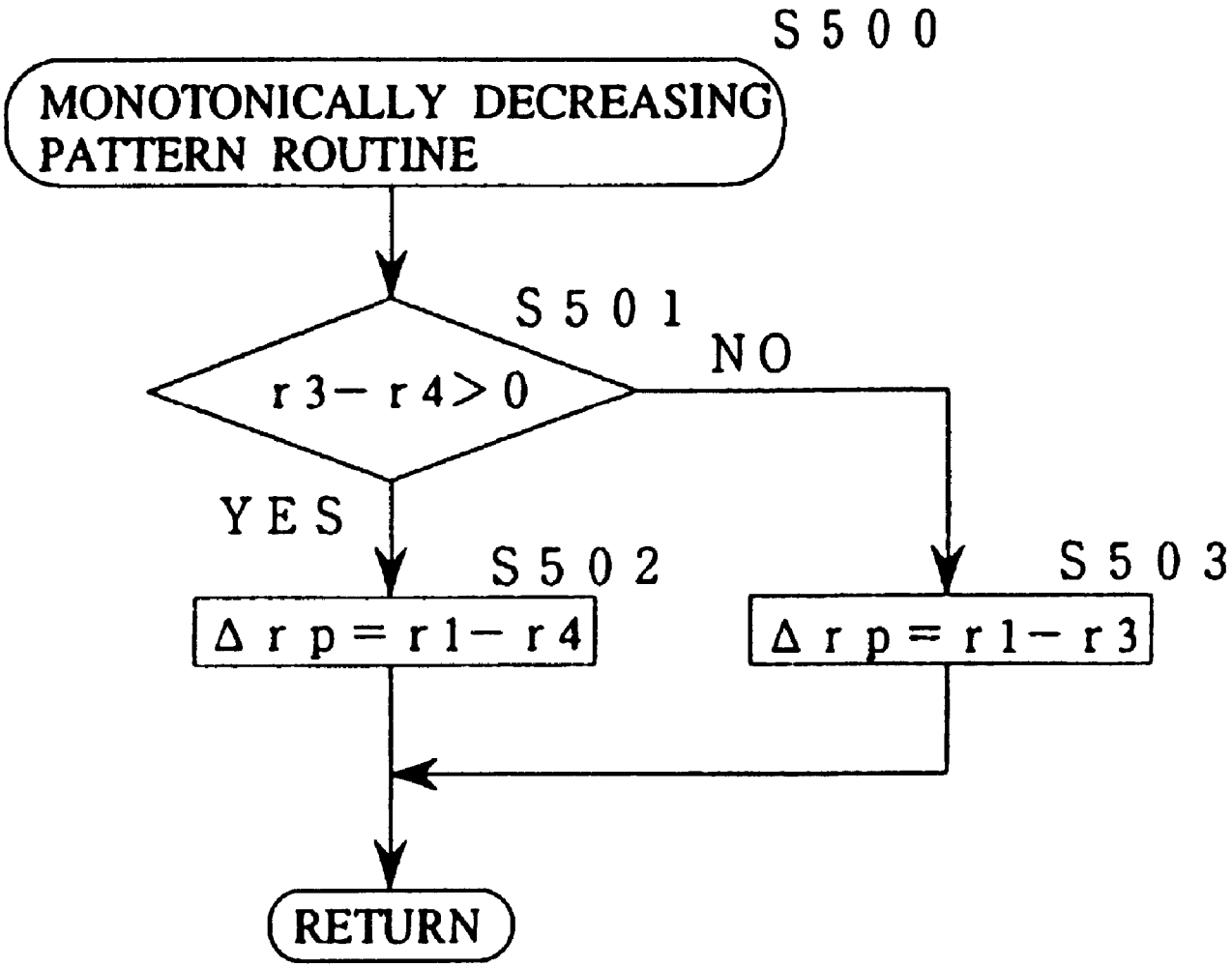
Figure 27:
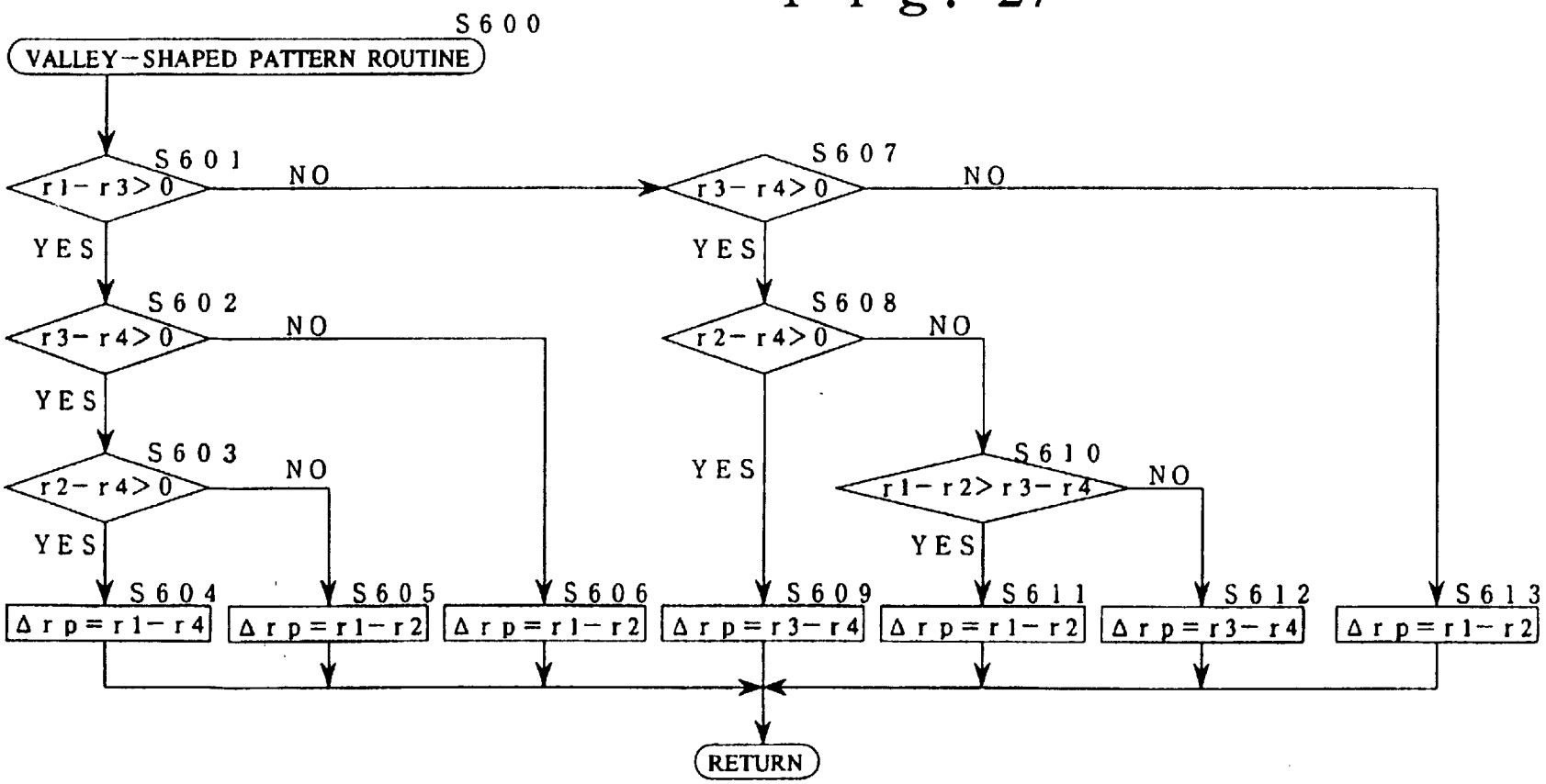
Figure 28:
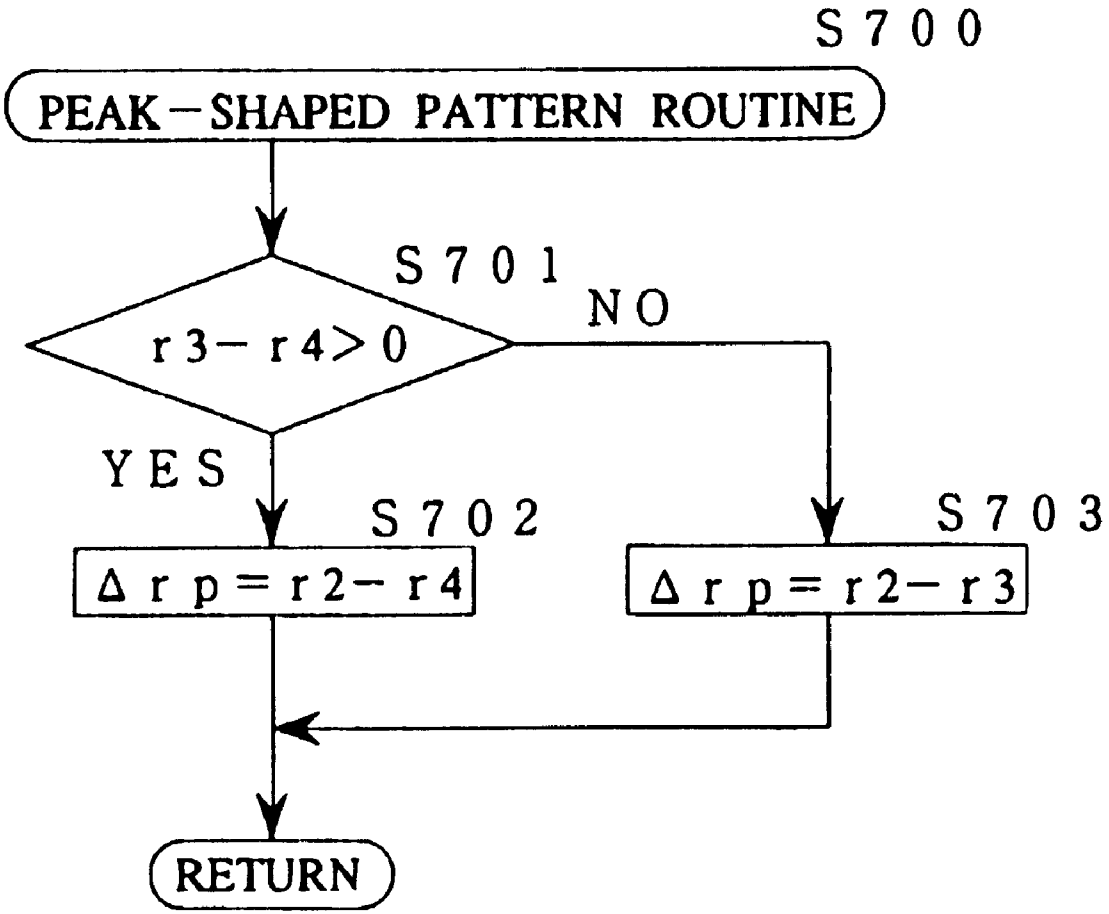
Figure 29:
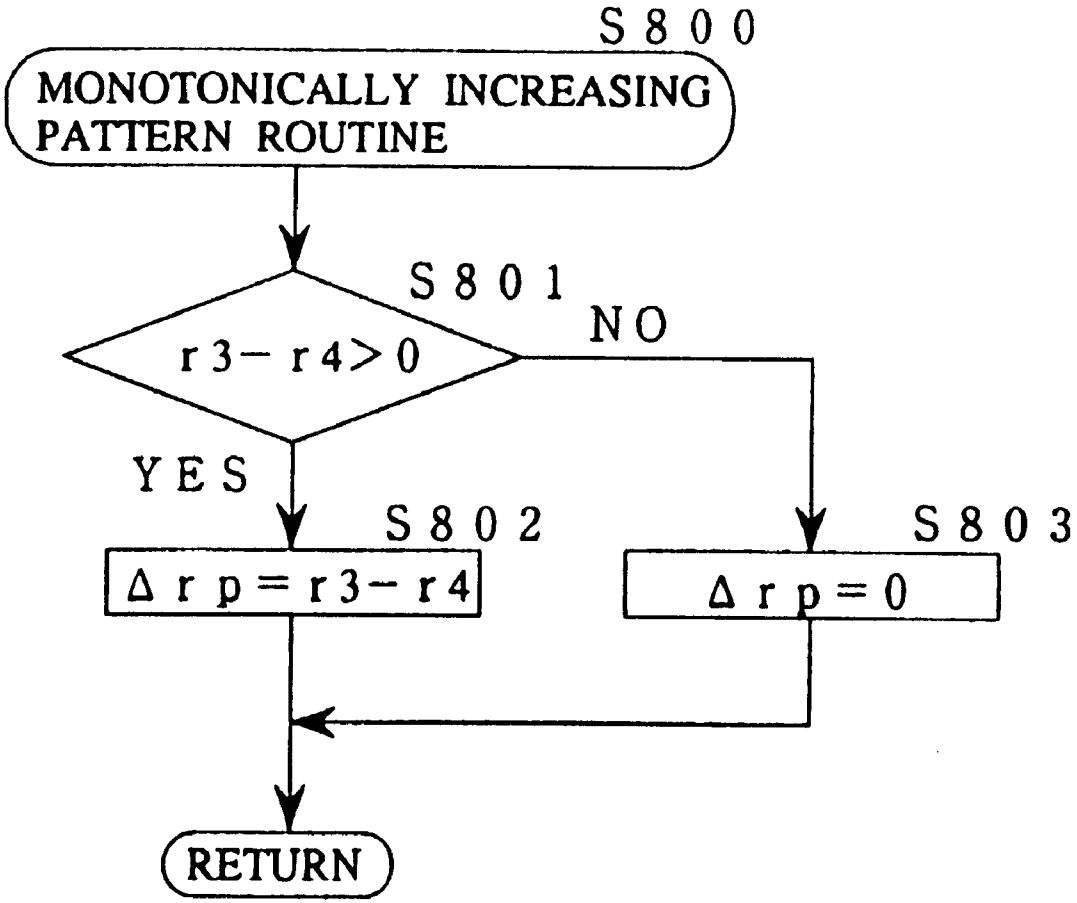
Figure 30A:
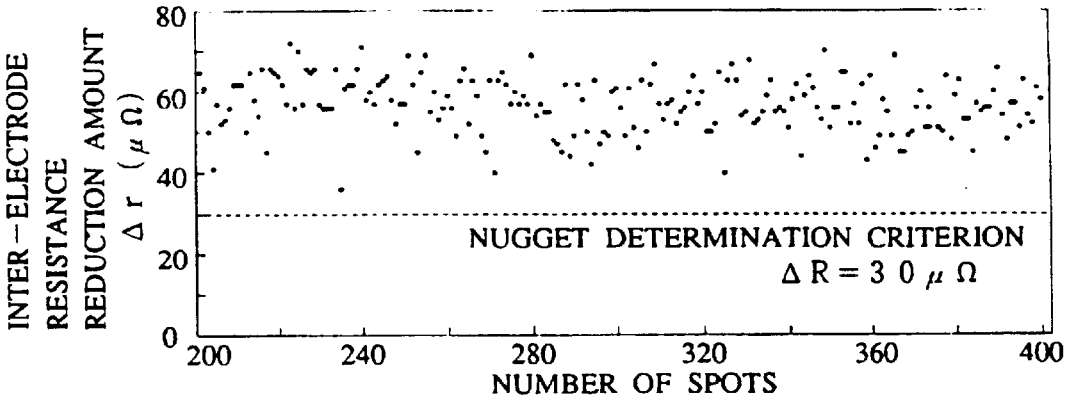
Figure 30B:
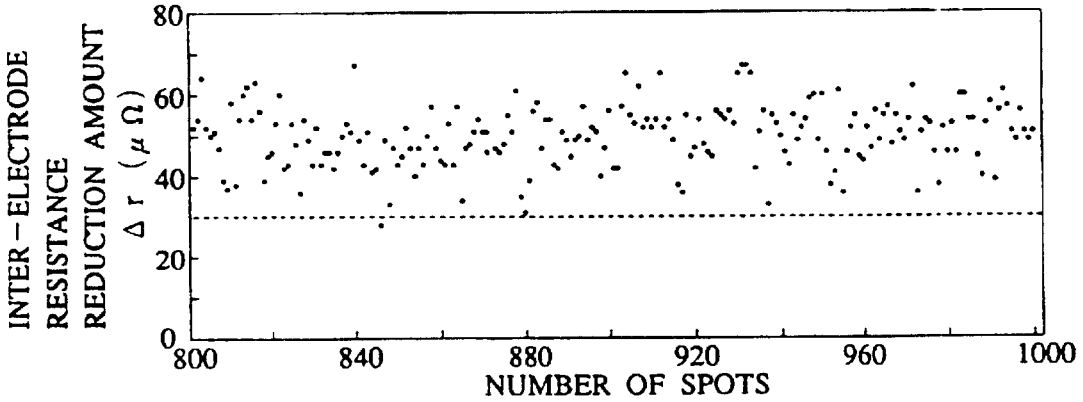
Figure 30C:
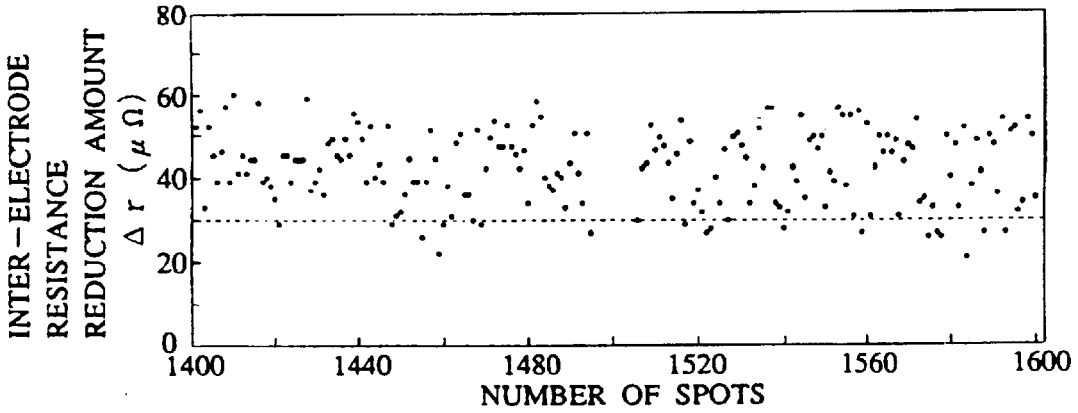
Figure 31A:
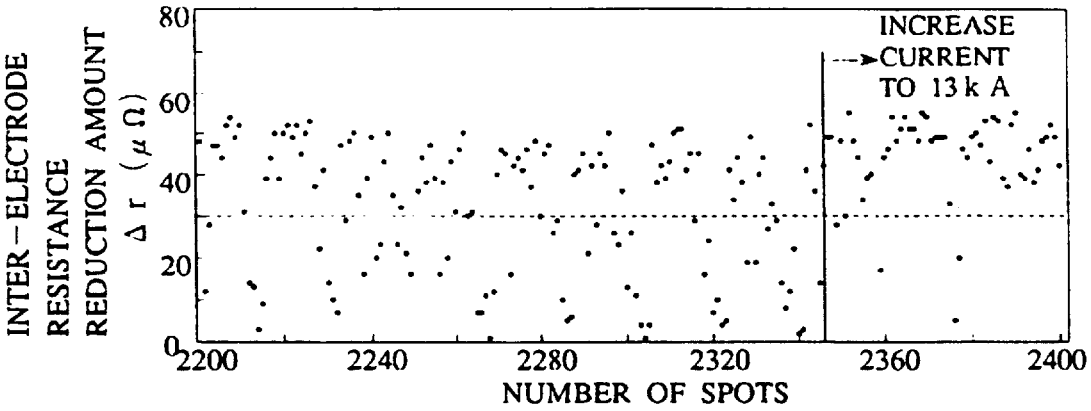
Figure 31B:
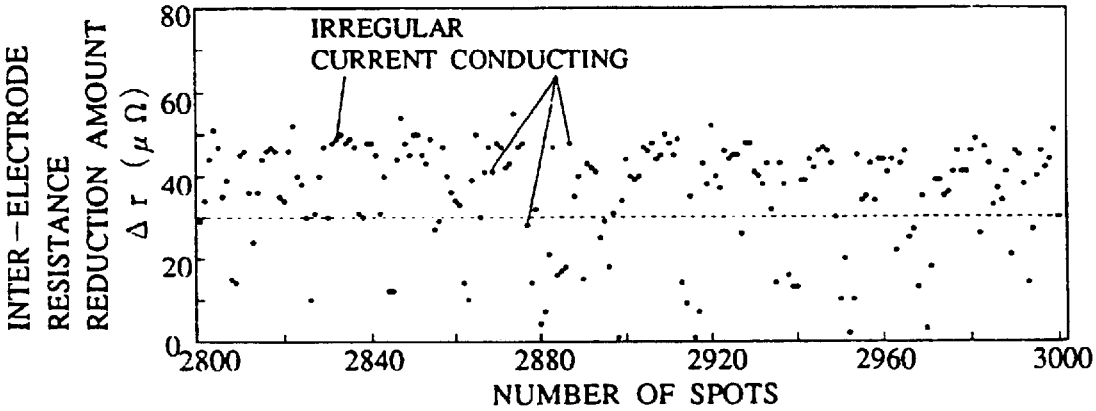
Figure 31C:
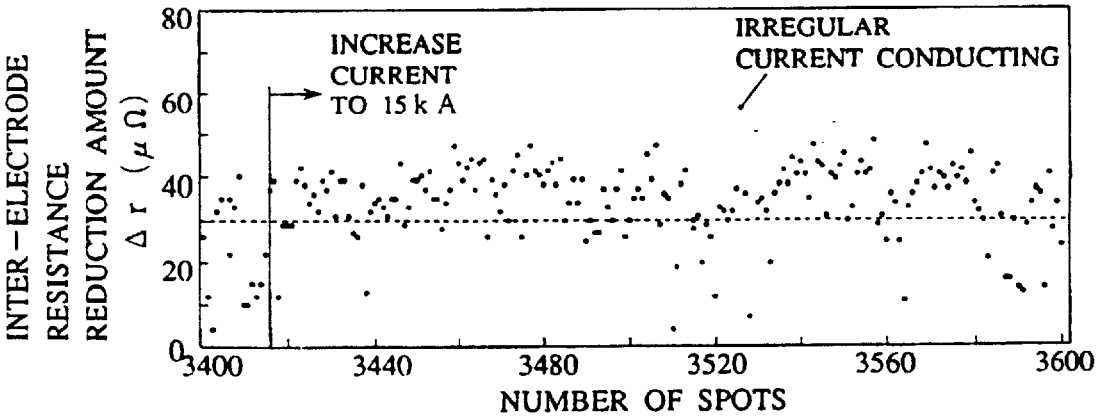
Figure 32A:
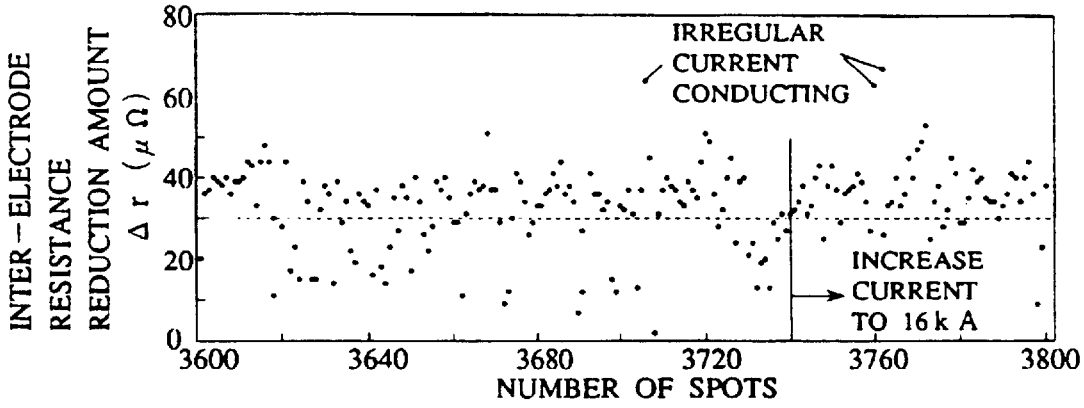
Figure 32B:
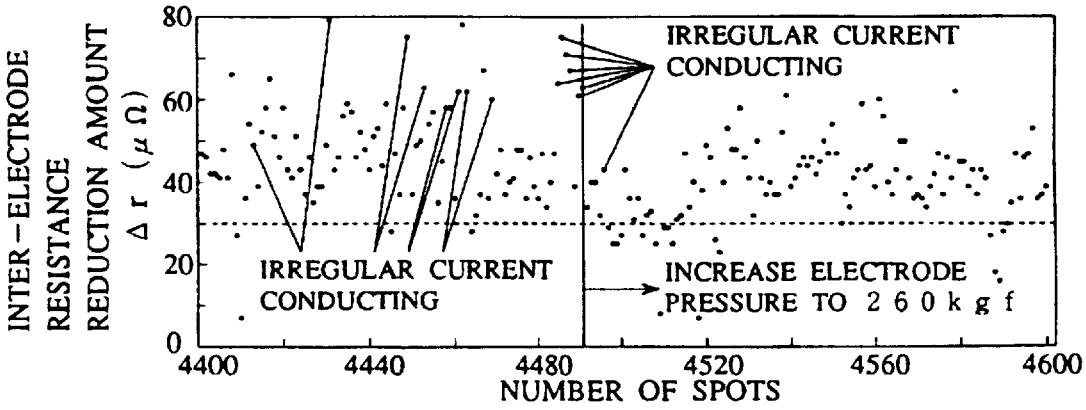
Figure 32C:
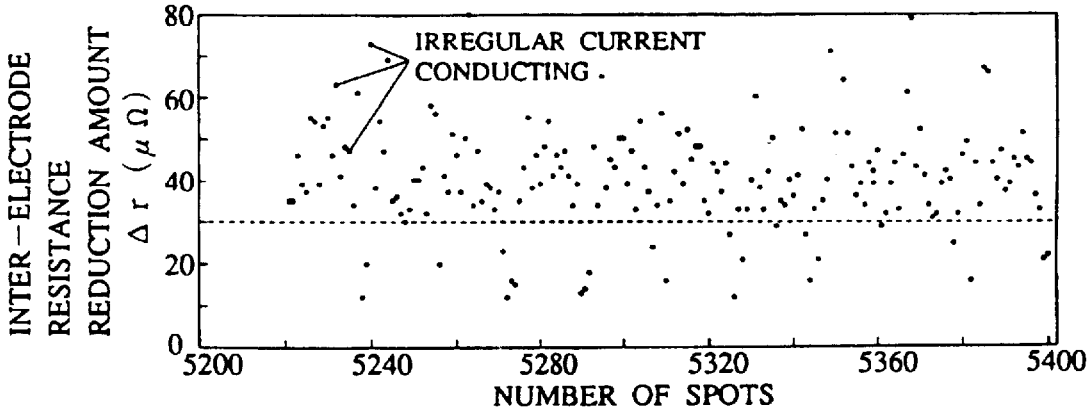
Figure 33:
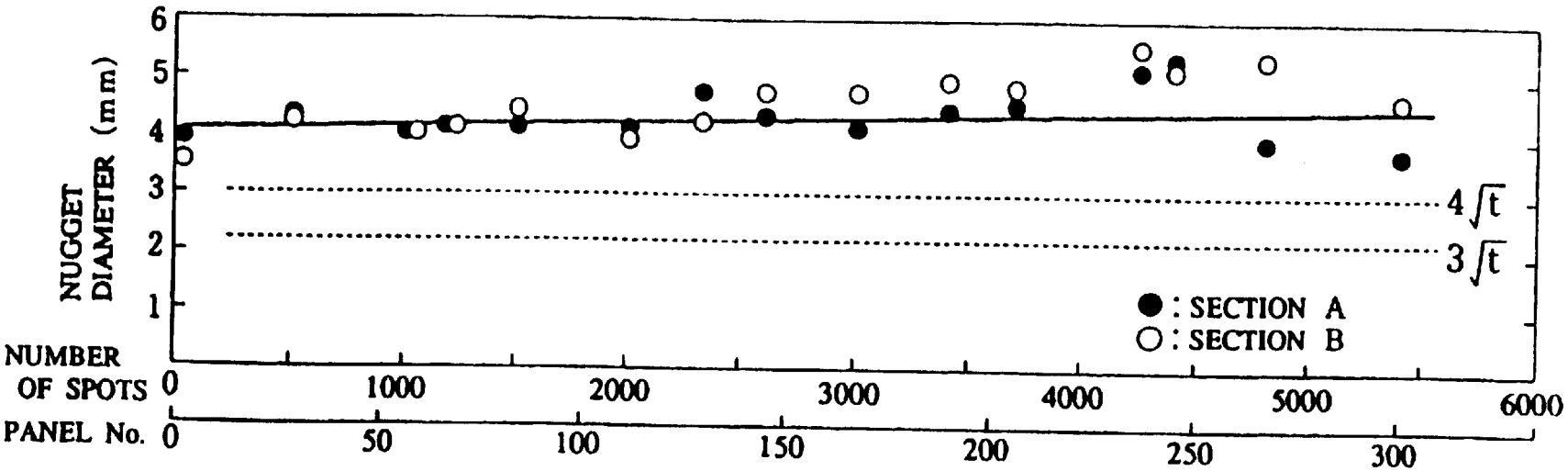
Figure 34:
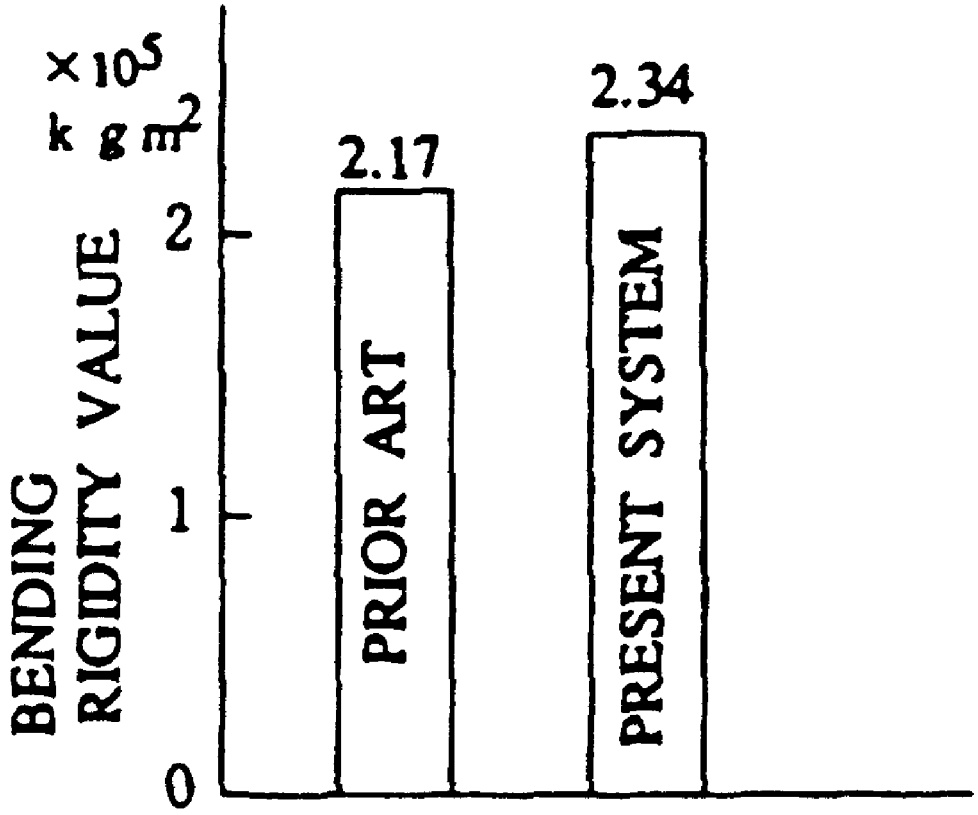
Figure 35A:
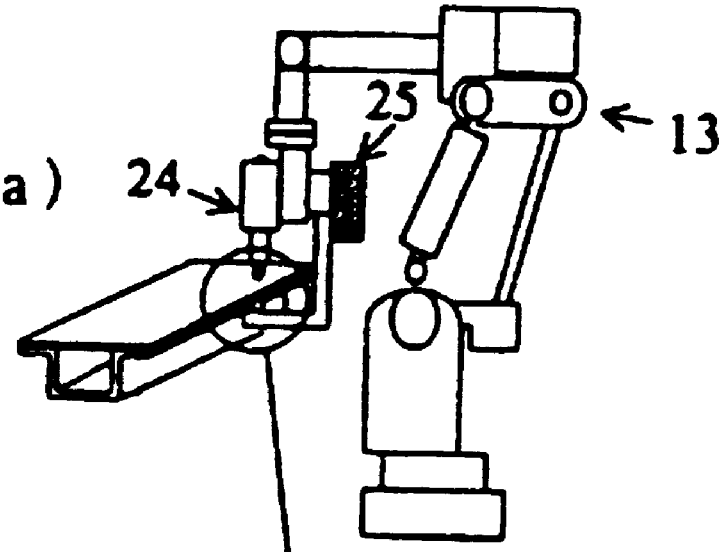
Figure 35B:
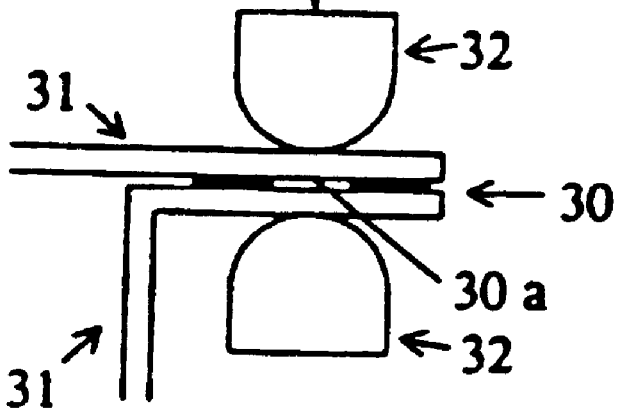

FIGS, 11A and 11B are graphs showing the relationship between an electric current value and a nugget diameter and between an electric current value and an inter electrode resistance value in a case where a galvannealed steel sheet, a bare high-tensile steel sheet, and a galvannealed steel sheet were overlapped, and strip type test pieces being welded by a stationary welding machine;

FIGS. 12(a) and 12(b) are graphs showing the same relationship as shown in FIGS. 11A and 11B, respectively, workpieces being welded by a robot;

FIGS. 13A and 13B are graphs showing the relationship between an electric current value and a nugget diameter and between an electric current value and an inter-electrode resistance value, respectively, in a case where a galvannealed steel sheet, a bare high-tensile steel sheet, a bare common steel sheet and a bare common steel sheet were overlapped, and strip type test pieces being welded by a stationary welding machine;

FIGS. 14A and 14B are graphs showing the same relationship as shown in FIGS. 13A and 13B, respectively workpieces being welded by a robot;

FIG. 15 is a graph showing the relationship between a variation in an inter-electrode resistance value and a nugget diameter during successive strike points or spots by the same electrode in a case where three molded galvannealed steel sheets (workpieces) are overlapped and the weld current being 12 kA and the current conducting time being 3 cycles;

FIG. 16 is graph showing the same relationship as shown in FIG. 15, the weld current being 12 kA and the current conducting time being 4 cycles;

FIG. 17 is a graph showing the same relationship as shown in FIG. 15, the weld current being 14 kA and the current conducting time being 3 cycles;

FIG. 18 is a graph showing the relationship between a variation in an inter-electrode resistance value and a nugget diameter during successive strike points by the same electrode in a case where tree galvannealed steel sheets (workpieces) are overlapped, and the weld current being 12 kA and the current conducting time being 3 cycles;

FIG. 19 is a graph showing the same relationship as shown in FIG. 18, the weld current being 12 kA and the current conducting time being 4 cycles;

FIG. 20 is a graph showing the same relationship as shown in FIG. 18, the weld current being 14 kA and the current conducting time being 3 cycles;

FIG. 21 shows schematically in block diagram form a pilot line of a first embodiment of the present invention;

FIG. 22 is a main flow chart illustrating in the pilot line of the first embodiment;

FIG. 23 is a flow chart of the irregular current conducting routine in the pilot line of the first embodiment;

FIG. 24 is a flow chart of the calculation routine in the pilot line of the first embodiment;

FIG. 25 is a flow chart of the current conducting extension routine in the pilot line of the first embodiment;

FIG. 26 is a flow chart of the monotonous decreasing pattern routine in the pilot line of the first embodiment;

FIG. 27 is a low chart of the peak-shaped pattern routine in the pilot line of the first embodiment;

FIG. 28 is a flow chart of the valley-shaped pattern routine in the pilot line of the first embodiment;

FIG. 29 is a flow chart of the monotonous increasing pattern routine in the pilot line of the first embodiment;

FIGS. 30(a)–30(c) are graphs showing the relationship between a number of strike points and an amount of reduction of an inter-electrode resistance value, obtained by the first embodiment;

FIGS. 31(a)–31(c) are graphs showing the relationship between a number of strike points and an amount of reduction of an inter-electrode resistance value, obtained by the first embodiment;

FIGS. 32(a)–32(c) are graphs showing the relationship between a number of strike points and an amount of reduction of an inter-electrode resistance value, obtained by the first embodiment;

FIG. 33 is a graph showing the relationship between a number of strike points and a nugget diameter, obtained by the first embodiment;

FIG. 34 is a graph showing the flexural rigidity value of an automobile body obtained by the first embodiment and the flexural rigidity value of an automobile body obtained by prior art;

FIG. 35(a) is a perspective view showing part of a pilot line of a second embodiment of the present invention; and FIG. 35(b) is a schematic sectional view showing the essential part of the pilot line of FIG. 35(a).

DETAILED DESCRIPTION OF THE PREFERRED EMBODIMENT

Experimental example

In the research of the present system, a resistance increasing material suitable for the system was first developed. Then, the present system was applied to an assembly line for automobile bodies as an example, and welding tests were performed by a stationary welding machine with respect to strip type test pieces of the same combination as panels which are being fed on the production line and going to be assembled. Then, welding tests for workpieces were performed by means of a robot having a welding gun and a transformer, and the relationship between the variation in the inter-electrode resistance value and the success or failure of the nugget has been elucidated for respective cases where different combinations of test pieces were employed.

Selection of weld conditions

The weld conditions in the spot welding include a current conducting time (weld time), a weld current value, and an electrode pressure. It is desirable that the current conducting time be as short as possible in order to make the best use of a welding method using a resistance increasing material. In this experiment, a 3-cycle (60 Hz) current conducting time is a general rule unless otherwise indicated.

Weld current values where sufficient nuggets are obtained with the 3-cycle current conducting time were obtained for each combination of members, and the thus obtained values were used as the reference values. The welding of this system is performed under the condition where a resistance increasing material is interposed between bonding surfaces, then an electrode pressure is applied, and a partial contact of a base member is assumed. However, there is a possibility that sufficient contact of the base member is not obtained due to the existence of the resistance increasing material, and therefore, irregular current conducting and furthermore, current misconducting may result. This creates difficulty, especially with curved bonding surfaces.

If the electrode pressure is increased, the aforementioned problem will be overcame. However, if the electrode pressure becomes larger, the inter-electrode resistance value will become smaller and a large electric current will be required in order to form a sufficient nugget. This accelerates the deterioration of the welding electrode.

Figure 1:
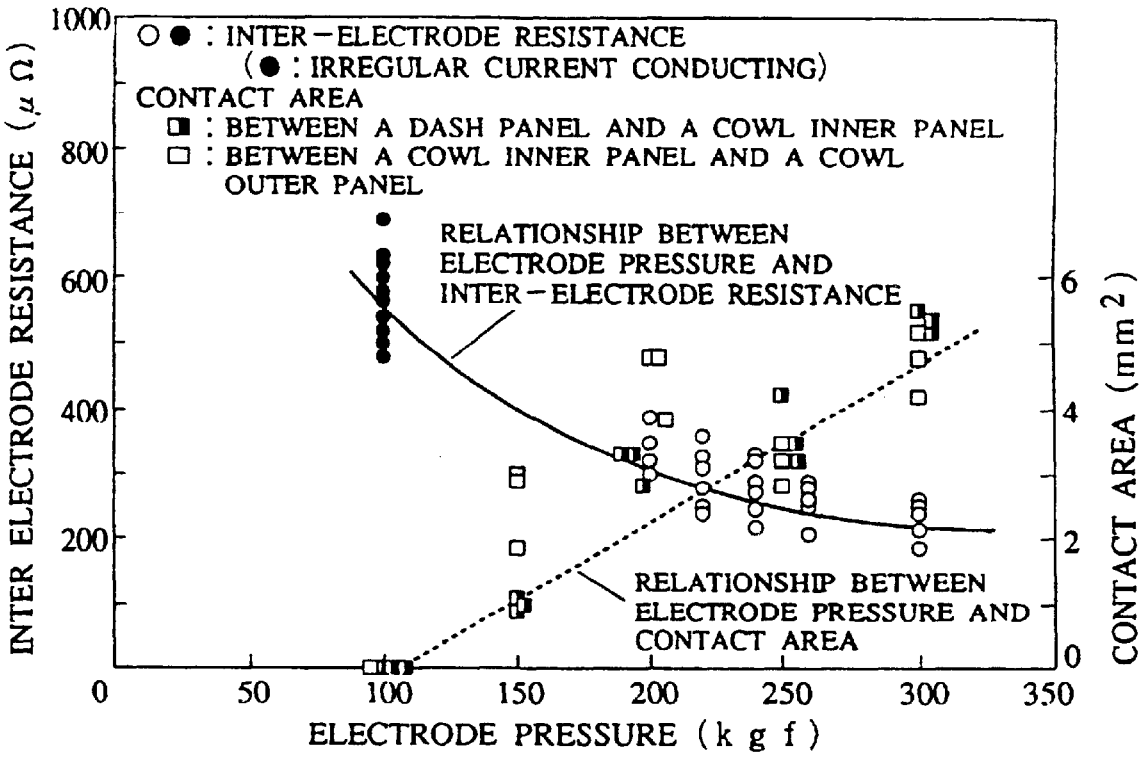
FIG. 1 is a graph showing the relationship between an electrode pressure and an inter-electrode resistance value, using a work piece, and also the relationship between a welding pressure and a contact area between panels.

Among panels constituting an automobile body, for example, with respect to a combination of three panels, (1) a dash panel (galvannealed steel sheet), t: 0.65 mm, coating weight: 45/45 (coating weight of 45 g per $m^2$ for both surfaces, the same shall apply to the following), (2) a cowl inner panel (galvannealed steel sheet, t: 0.55 mm, coating weight: 45/45), and (3) a cowl outer panel (galvannealed steel sheet, t: 0.6 mm, coating weight: 45/45. FIG. 1 shows the relationship between the electrode pressure and the contact area between panels, using a workpiece, and also the relationship between the electrode pressure and the inter-electrode resistance value. The electrode having 16 mm in diameter and a 40 mm radius dorm is used. The resistance increasing material that was used is a paste which was prepared by incorporating 15% by weight (hereinafter abbreviated as wt %) of alumina powder having an average particle diameter of 100 $\mu$m to an adhesive, and this material was also developed by this research.

A robot with a welding gun and a transformer is used as a spot welding machine. A current of 1 kA (alternating current) is conducted for 1 cycle and inter-electrode resistance values are measured. As can be seen in FIG. 1, when the electrode pressure becomes lower, the contact area will become smaller and irregular current conducting will occur. In the case of this combination, the contact area between base members of a certain level is assured. Therefore, while stable current conducting is guaranteed, the electrode pressure of 240 kgf (2353N) is used such that the electrode pressure may not become too large.

The irregular current conducting used herein is a case where the inter-electrode resistance value of the first cycle appears abnormally high. For detecting irregular current or normal current, a case where the inter-electrode resistance value of the first cycle exceeds a fixed level can be determined as irregular current conducting. Also, to detect irregular current conducting, a welding current control apparatus, which has a function that a measured current value immediately after the start of current conducting is lower than that of a normal case, and thereafter, consequently a remarkably high current flow occurs as this reaction, is generally used. When this kind of control apparatus is used, the irregular current conducting can also be discriminated by the maximum value or the minimum value of a measured current of each cycle during current conducting.

Resistance increasing material

The resistance increasing material developed by this research is a paste where 15 wt % of alumina powder having an average particle diameter of 100 $\mu$m is incorporated into a commercially available adhesive. If the alumina powder to be mixed with the adhesive has too small particle diameter, the effect of enhancement in welding performance is small; whereas if it is too large, irregular current conducting or current misconducting is liable to occur. Also, if the amount of the alumina powder to be incorporated is too small, the effect is small; whereas if it is too large, current misconducting or sputter also tends to occur. In addition, in view of the adhesive strength, it is conceivable to have an adverse influence such as reduction in adhesive force.

Figure 2:
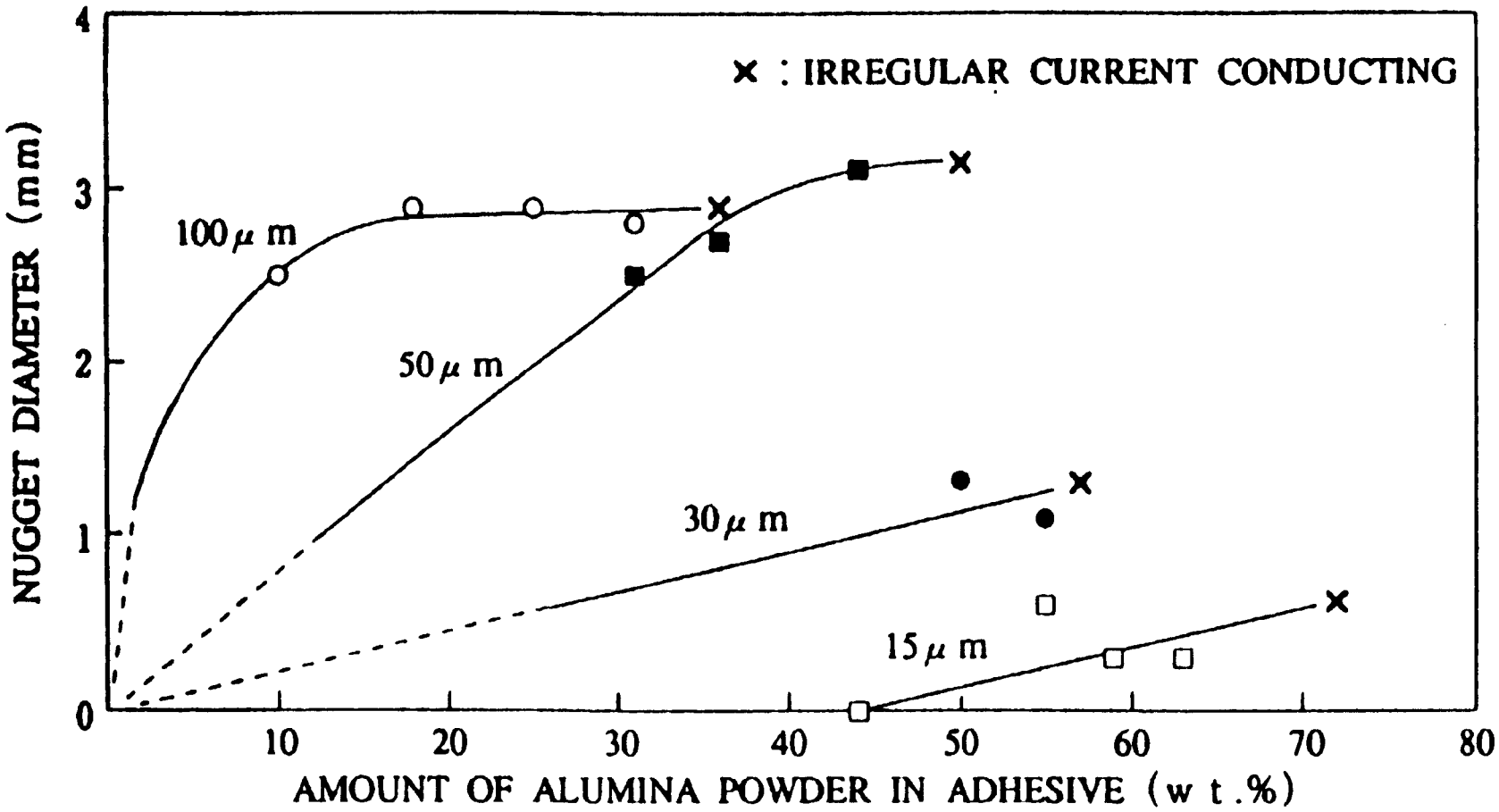
FIG. 2 is a graph showing the relationship between an amount of alumina powder in a glue and the diameter of a nugget.

FIG. 2 shows how the particle diameter and the amount of the mixed alumina powder has an influence on welding performance by use of resistance increasing materials obtained by incorporating powders different in particle diameter into a commercially available ordinary glue at various mixing rates. The test pieces are two hot dipped galvanized steel sheets (t: 0.8 mm) overlapped, and the resistance increasing material is coated between the bonding surfaces of the test pieces. The welding test was performed with a set current value of 9 kA, current conducting time of 2 cycles, and an electrode pressure of 200 Kgf (1960N). The measured value is an average value of three test pieces.

In the case where an average particle diameter of the alumina powder is 15 $\mu$m, an effect of formation of a nugget was hardly obtained even when a relatively large amount of alumina powder is employed. On the one hand, when the amount of the alumina powder reaches 72 wt %, irregular current conducting occurred. Also, when the average particle diameter of the alumina powder is 30 $\mu$m, a slight effect was observed. When the average particle diameter reaches 50 $\mu$m and the amount was large, a nugget having a diameter of about 3 mm was formed. When the average particle diameter reaches 100 $\mu$m a nugget having a diameter of about 3 mm was formed with an alumina powder in a small amount of 18 wt %.

It appears that a remarkable enhancement in welding performance, found in alumina powder having an average particle diameter of 100 μm, is due to an abrupt increase in the inter electrode resistance value of the initial stage of current conducting. This phenomenon is intrinsic to the welding method of the present invention using the resistance increasing material and enables a quality guarantee of welded sections based on the resistance value variation characteristic, which is the feature of the present system, together with a short current conducting time.

Incidentally, current conducting became irregular when, in the case of an average particle diameter being 30 μm, the alumina powder was in an amount of 57 wt %; when, in the case of an average particle diameter being 50 μm, the alumina powder was in an amount of 50 wt %; and when, in the case of an average particle diameter being 100 μm, the alumina powder was in an amount of 36 wt %. Therefore, in the present system, the alumina powder having an average particle diameter of 100 μm where the resistance increasing effect is remarkable was used.

Figure 3:
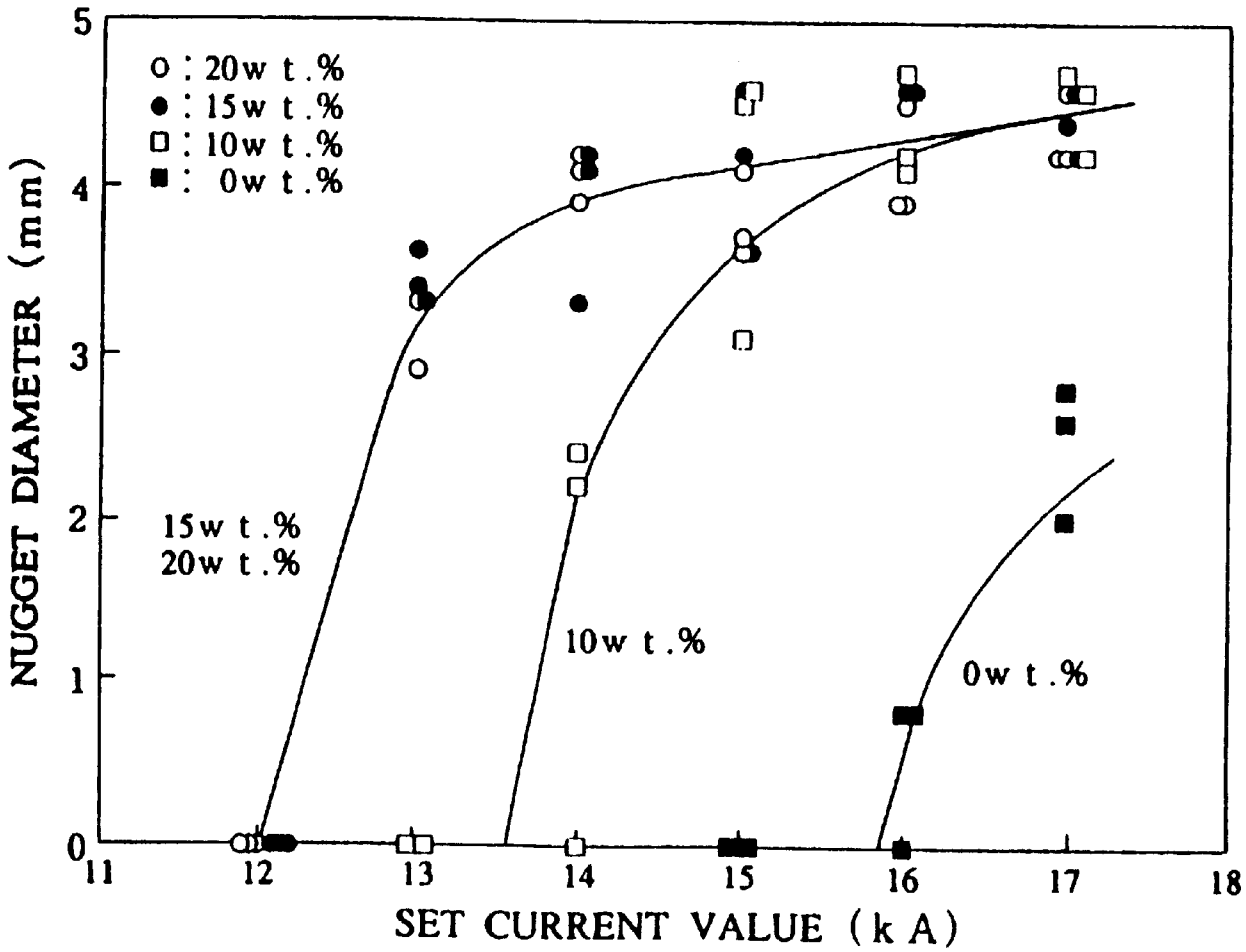
FIG. 3 is a graph showing the relationship between a set current value and the diameter of a nugget.

FIG. 3 shows the effect of the nugget formation in a case where, with the purpose of giving a sufficient adhesive function to the resistance increasing material, the alumina powder having an average particle diameter of 100 μm is incorporated into a commercially available structural adhesive at various mixing rates. The test pieces are two galvannealed steel sheets (t: 1.6 mm) overlapped, and the resistance increasing material is coated between the bonding surfaces of the test pieces. The welding test was performed with current conducting time of 3 cycles, and an electrode pressure of 325 Kgf (3185N).

While some of the resistance increasing materials exhibit a remarkable effect with respect to an enhancement in welding performance, the material incorporated with 10 wt % of alumina powder is far inferior in effect compared with the material with 15 wt % of alumina powder and the material mixed with 20 wt % of alumina powder. On the other hand, there is almost no difference in effect between the material with 15 wt % of alumina powder and the one mixed with 20 wt % of alumina powder.

Table 1 shows the result of the current conducting performance which was obtained with respect to a combination of four galvannealed steel sheets of a galvannealed steel sheet (t: 0.8 mm, coating weight: 60/60), a galvannealed steel sheet (t: 1.6 mm, coating weight: 60/60), a bare steel sheet (t: 0.8 mm), and a galvannealed steel sheet (t: 0.8 mm, coating weight: 60/60) by use of the resistance increasing materials shown in FIG. 3. With a new electrode and a used electrode, the current conducting performance (number of strike points as irregular current conducting occurs/number of tested strike points) was tested by varying the electrode pressure.

The weld conditions were a set current value of 12 kA and a current conducting time of 3 cycles. Note that the used electrode is an electrode after a galvannealed steel sheet (t: 0.8 mm×2) was struck 150 times with a set current value of 12 kA, an electrode pressure of 200 kgf (1960N) and a current conducting time of 12 cycles.

TABLE 1

| Electrode | New electrode | | Used electrode | |
|---|---|---|---|---|
| pressure (kgf) | 20 wt % | 15 wt % | 20 wt % | 15 wt % |
| 250 | 0/5 | 0/5 | 4/5 | 0/5 |
| 300 | 0/5 | 0/5 | 5/5 | 0/5 |

TABLE 1-continued

| Electrode | New electrode | | Used electrode | |
|---|---|---|---|---|
| pressure (kgf) | 20 wt % | 15 wt % | 20 wt % | 15 wt % |
| 350 | 0/5 | 0/5 | 0/5 | 0/5 |
| 400 | 0/5 | 0/5 | 0/5 | 0/5 |

When the welding electrode is new, both the resistance increasing material to which 15 wt % of alumina was incorporated (hereinafter referred to as "the 15 wt % resistance increasing material") and the 20 wt % resistance increasing material have no problem with respect to current conducting performance. When, on the other hand, the used electrode is employed, irregular current conducting occurred in the 20 wt % resistance increasing material when the electrode pressure became smaller.

In the system of the present invention, the 15 wt % resistance increasing material, where the irregular current conducting would hardly occur even if the welding electrode was deteriorated, is considered to be superior because successive strike points are performed by the same electrode. With respect to the amount of the alumina powder in the adhesive, it is conceivable that a smaller amount is better in view of the factors of sputter, adhesive force, and feeding of a resistance increasing material to a bonding surface. Therefore, the resistance increasing material used in this experiment comprises a resistance increasing material where alumina powder of average particle diameter 100 μm is mixed with a structural adhesive by 15 wt %.

Figure 4:
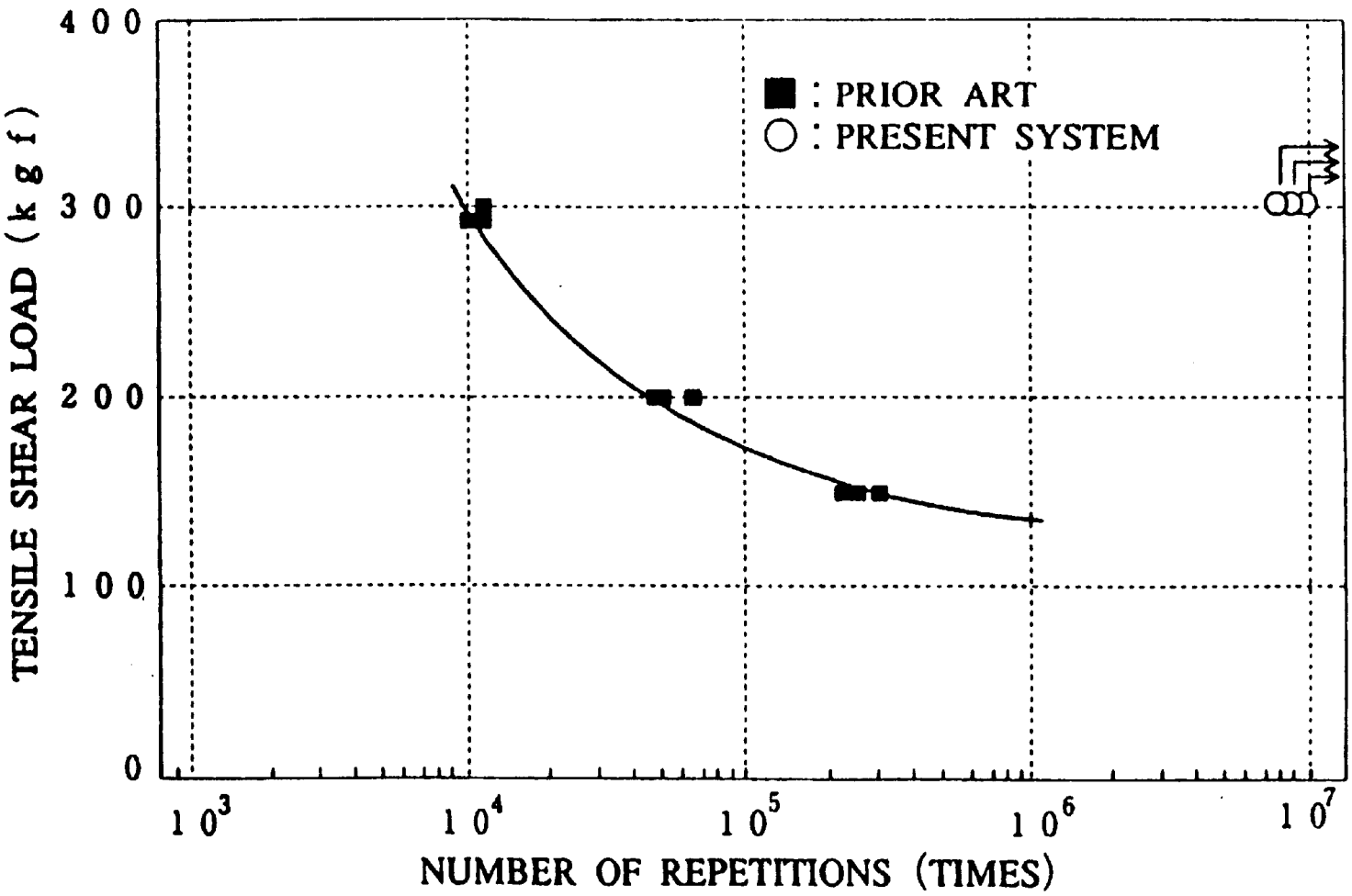
FIG. 4 is graph showing the relationship between the number of repetition of loading a tensile shear load.

FIG. 4 shows pulsating shear fatigue test results as to the welded sections manufactured by prior art and the system of the present invention. This test is prescribed in JIS Z 3138. In this system, alumina powder remains inside a nugget and around its periphery. In this test, investigation was made on the influence of the remaining alumina powder to fatigue strength and also the influence on adhesive strength caused by the mixing of alumina powder into an adhesive.

In the prior art, normal single-spot welding was performed to the central portion of an overlapped section for a current conducting time of 12 cycles without arranging a resistance increasing material. On the other hand, in the system of the present invention, the resistance increasing material was coated within an area of 40 mm×25 mm and, likewise, single-spot welding was performed for 3 cycles. In common with the prior art and the system of the present invention, the test pieces are galvannealed steel sheets (t: 0.8 mm) of 200 mm×40 mm, the electrode pressure is 200 kgf (1960N), and the set current value is 11 kA. Also, the test piece of the system of the present invention has been given hardening treatment by heating at 180° C., for 30 minutes after welding. In the production line, a white body is heated at 180° C., for 30 minutes in the drying process at the time of coating, and the resistance increasing material is hardened during this process.

As can be seen in FIG. 4, the welded section according to the present system showed a remarkably high fatigue strength as compared with the welded section obtained using the prior art technique. It appears that this difference is obtained mainly by the effect of the resistance increasing material. From this fact, although the strength of the welded section is reduced by the remaining alumina powder and the adhesive force was reduced by the mixed alumina powder, it was found that there was no problem for practical use. The adhesive used in this research exhibits flow characteristic at room temperature. The resistance increasing material having alumina powder of average particle diameter of 100 μm incorporated to the adhesive by 15 wt % has appropriate viscosity and could be readily coated on a bonding surface by means of an automatic coating machine. When a variation in room temperature has an influence on the viscosity of the resistance increasing material and therefore coating cannot be performed smoothly by the automatic coating machine, for example, when temperature is low, the operation can be performed without difficulty if the resistance increasing material is heated and maintained at a constant temperature.

Relationship between a variation in an inter-electrode resistance value and nugget formation FIGS. 5A, 5B, 6A and 6B show the result of the experiment performed for two overlapped galvannealed steel sheets using the developed resistance increasing material. The two galvannealed steel sheets are a panel side outer (galvannealed steel sheet, t: 0.7 mm, coating weight: 90/60) and a reinforced locker panel (galvannealed steel sheet, t: 0.8 mm, coating weight: 60/60).

Figure 5A:
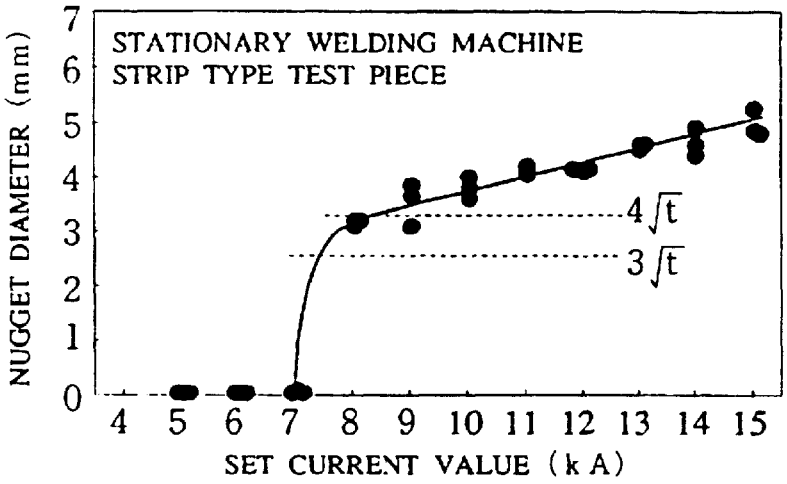
FIGS. 5A and 5B are graphs showing the relationship between an electric current value and a nugget diameter and between an electric current value and an inter electrode resistance value, respectively, in a case where two galvannealed steel sheets were overlapped, and strip type test pieces being welded by a stationary welding machine.

The experiment was made with an electrode pressure of 200 kgf (1960N) and a current conducting time of 3 cycles. FIGS. 5A and 6A show the relationship between a set current value and a nugget diameter. For each cycle during the current conducting of 3 cycles, the upper sections of FIGS. 5B and 6B show the variations in the inter electrode resistance value and the lower sections of FIGS. 5B and 6B show the variations in the measured current value.

Note that the inter electrode resistance value of each FIGS. 5A and 6A is a value obtained from the respective averages of the inter-electrode currents and the inter-electrode voltages of the second half of each cycle. In this research, this value was regarded as the inter-electrode resistance value of each cycle. The measured current value is a root-mean-square (RMS) value for each cycle of the measured current value.

Figure 5B:
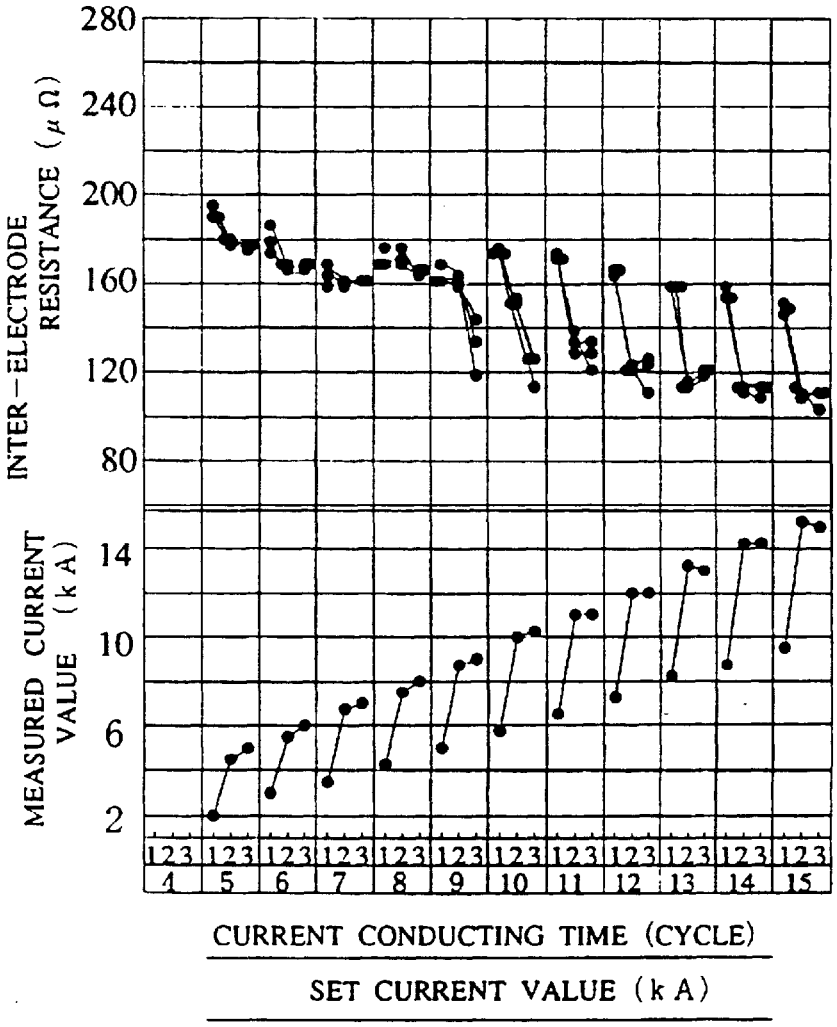
Figure 6A:
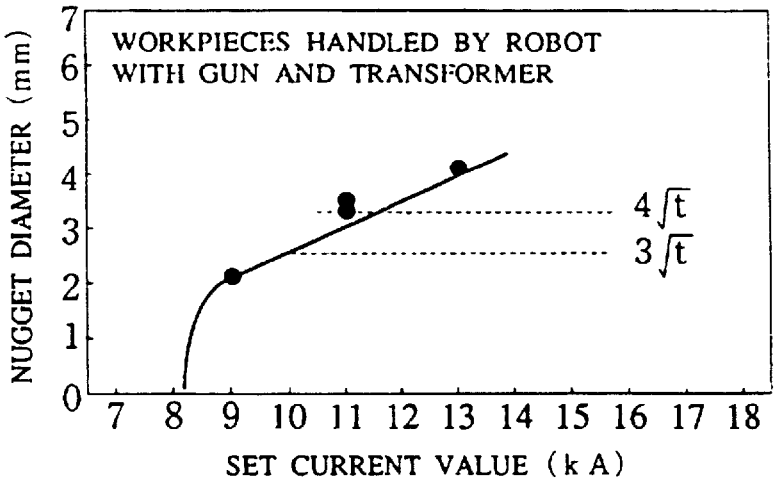
FIGS. 6A and 6B are graphs showing the same relationship as shown in FIGS. 5A and 5B respectively with workpieces being welded by a robot having a welding gun and a transformer (hereinafter referred to simply as "a robot")
Figure 6B:
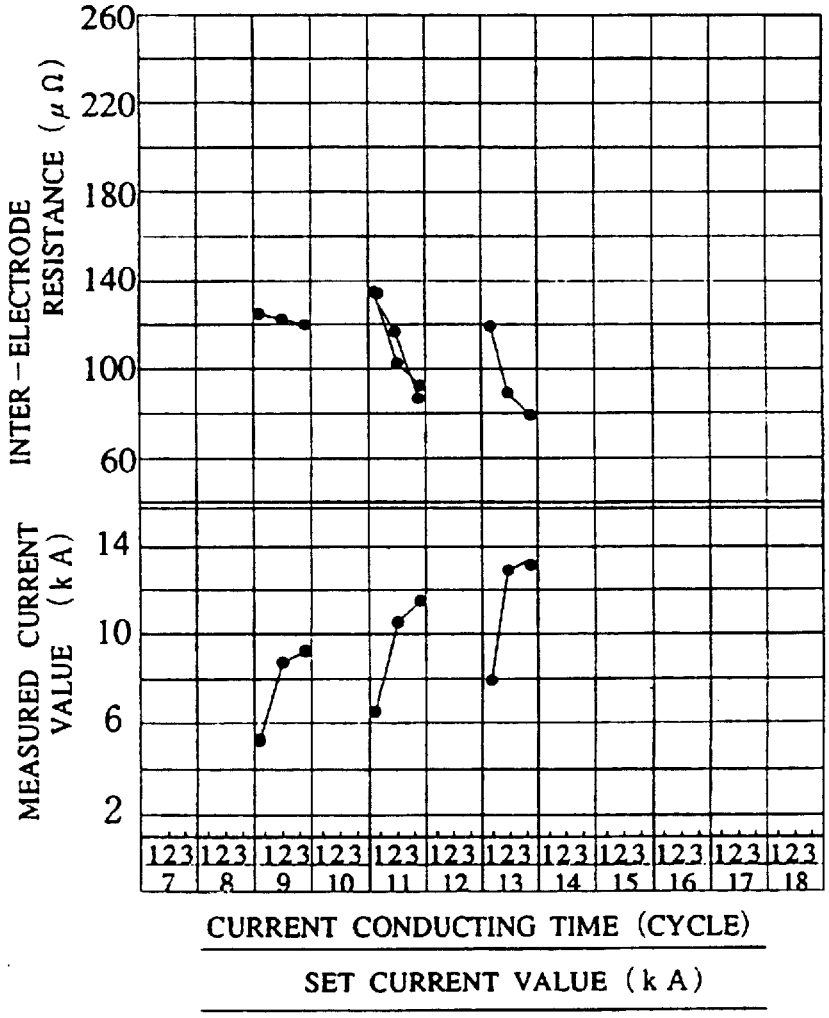
Figure 7A:
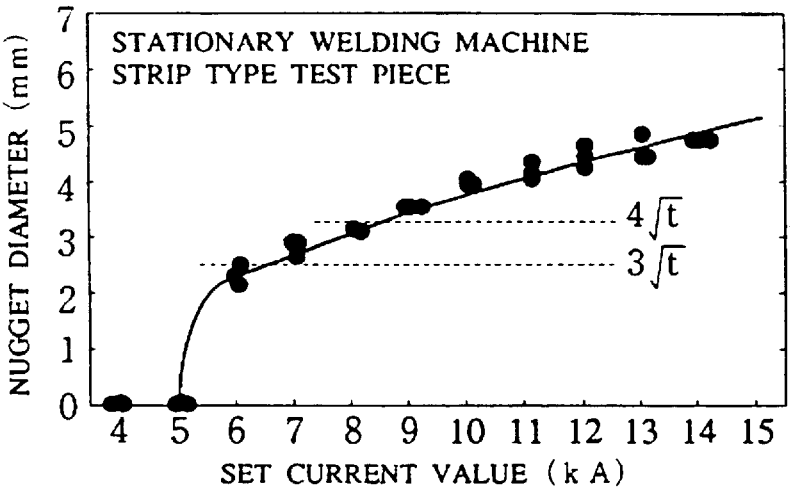
FIGS. 7A and 7B are graphs showing the relationship between an electric current value and a nugget diameter and between an electric current value and an inter-electrode resistance value, respectively, in a case where a galvannealed steel sheet and a bare common steel sheet were overlapped, an strip type test pieces being welded by a stationary welding machine.
Figure 7B:
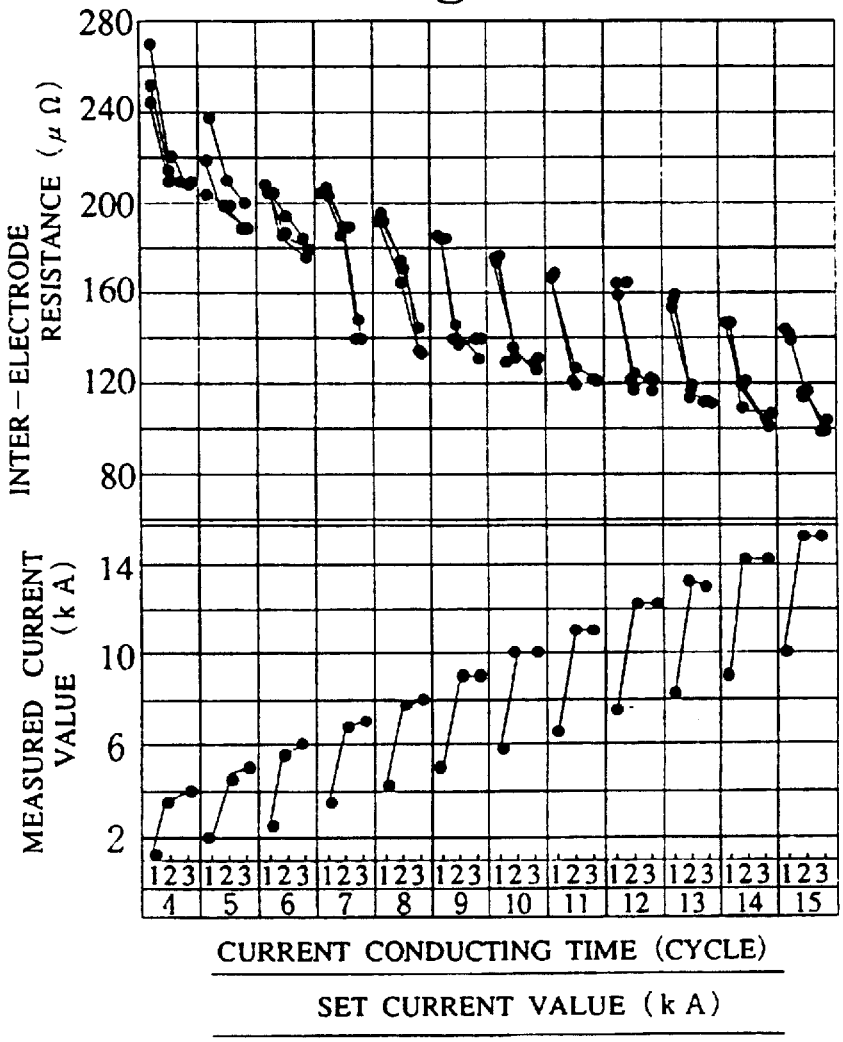
Figure 8A:
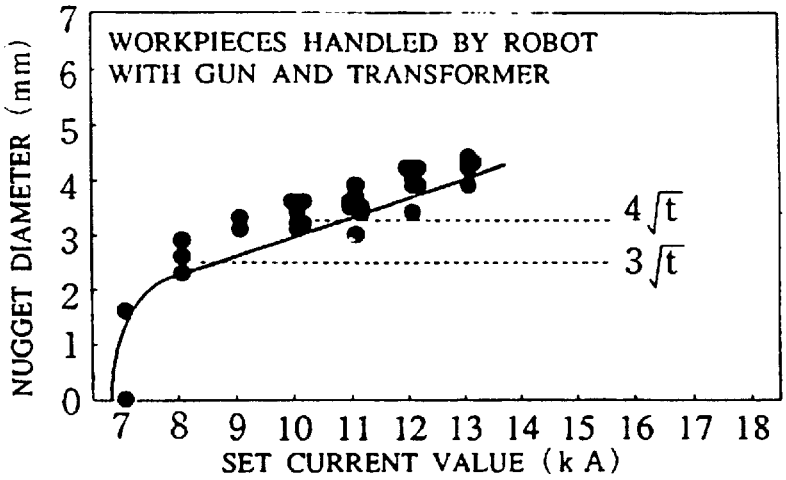
FIGS. 8A and 8B are graphs showing the same relationship as shown in FIGS. 7A and 7B, respectively workpieces being welded by a robot.
Figure 8B:
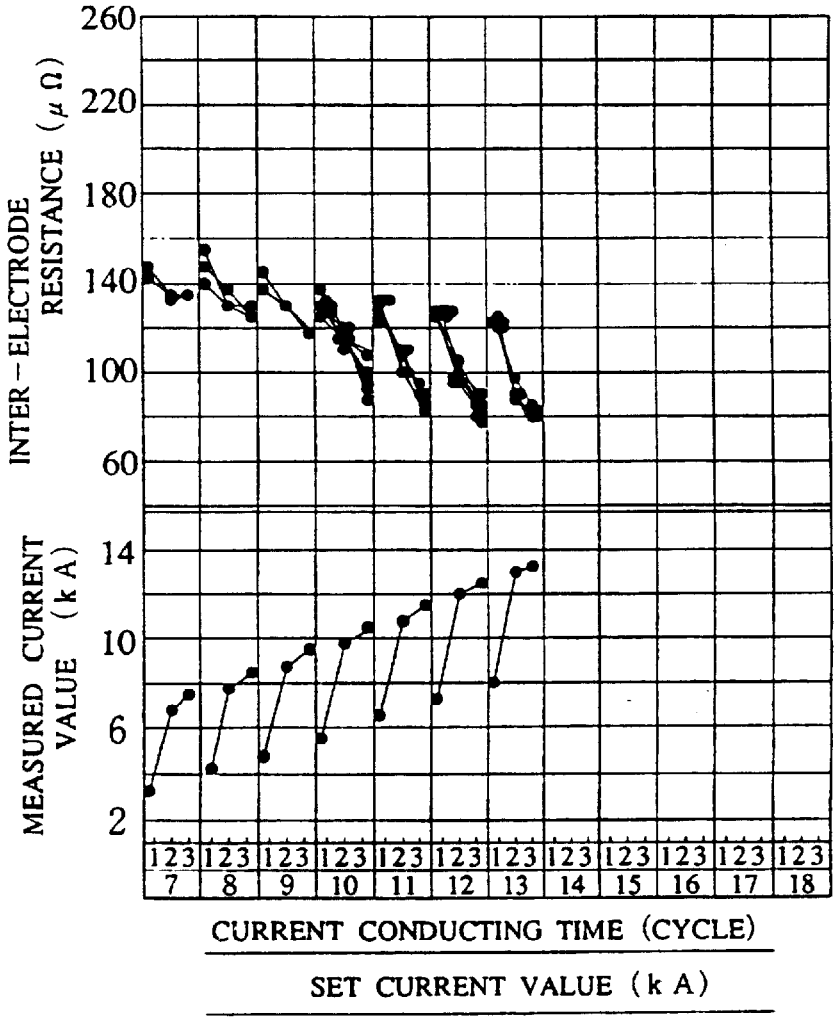

FIGS. 5A and 5B show the result of the test made by a stationary welding machine, using strip type test pieces. FIGS. 6A and 6B show the result of the test made with respect to the workpieces of the same combination as the test pieces by means of a robot. In both cases, new electrodes were employed.

As shown in FIGS. 5A and 5B, if a sufficient nugget is formed, the inter-electrode resistance value will be remarkably reduced. Also, for the points struck by the robot of FIGS. 6A and 6B, if the formation of a nugget starts, the measured current value will become high. The divided flows of the weld current are considered as this main cause. However, even in this case, there is a clear relationship between the formation of the nugget and the amount of reduction in the inter-electrode resistance value.

FIGS. 7A, 7B, 8A and 8B show the result of the experiment where a combination of two sheets, one being a galvannealed steel sheet and the other being a bare common steel sheet, was used. The galvannealed steel sheet is a panel side outer (galvannealed steel sheet, t: 0.7 mm, coating weight: 30/60), and the bare common steel sheet is a rail roof side inner (bare common steel sheet, t: 0.65 mm). The electrode pressure is 190 kgf (1862N). Even in the test (see FIGS. 7A and 7B) made with respect to strip type test pieces by a stationary welding machine, the formation and non-formation of the nugget are clearly distinguished. In this case, however, in order to judge the success or the failure of the nugget, an amount of reduction alone is insufficient. That is, when the set current value is as low as 4 kA, the reduction amount is 60 μΩ. This reduction amount is almost the same as the reduction amount of 7 kA where a sufficient nugget is formed. It is conceivable that the great reduction in the inter-electrode resistance value in the case of a low set current value is due to the fact that only the melting of zinc occurs. Even in the case where a workpiece is struck by a robot shown in FIGS. 8A and 8B, a similar result can be obtained.

FIGS. 9A, 9B, 10A and 10B show the result of the experiment where a combination of three galvannealed steel sheets was used. The three galvannealed steel sheets are a dash panel (galvannealed steel sheet, t: 0.65 mm, coating weight: 45/45), a cowl inner panel (galvannealed steel sheet, t: 0.55 mm, coating weight: 45/45), and a cowl outer panel (galvannealed steel sheet, t: 0.6 mm, coating weight: 45/45).

Figure 9A:
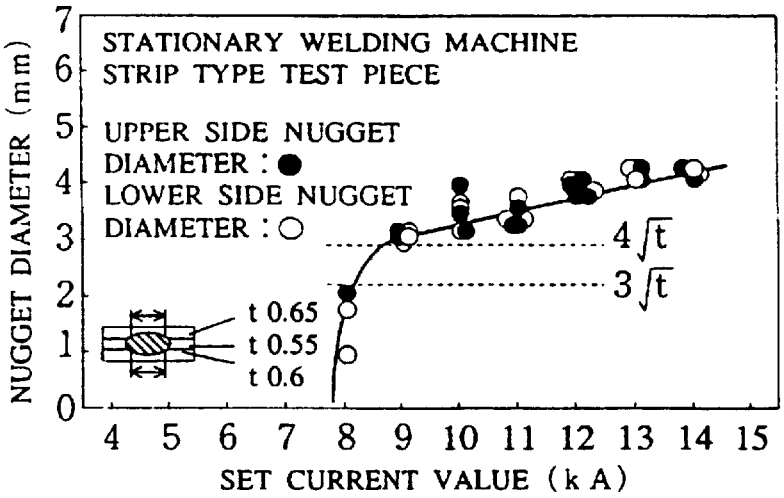
FIGS. 9A and 9B are graphs showing the relationship between an electric current value and a nugget diameter and between an electric current value and an inter-electrode resistance value, respectively, in a case where three galvannealed steel sheets were overlapped, and strip type test pieces being welded by a stationary welding machine.
Figure 9B:
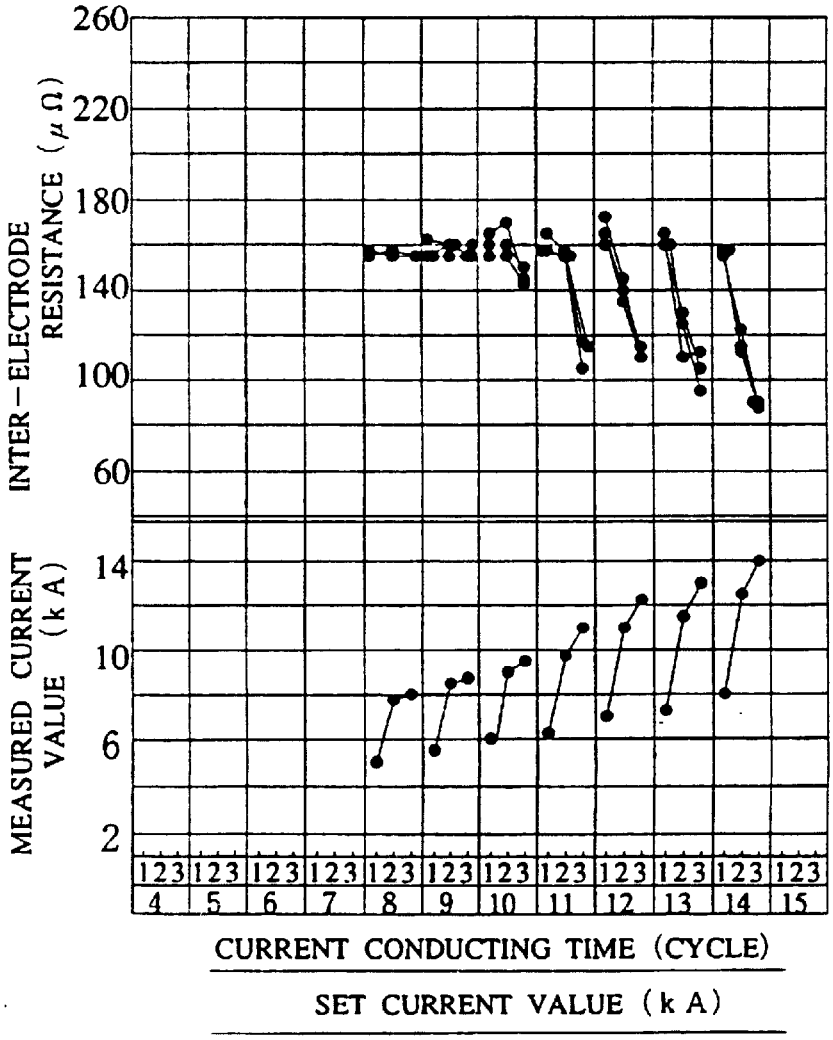
Figure 10A:
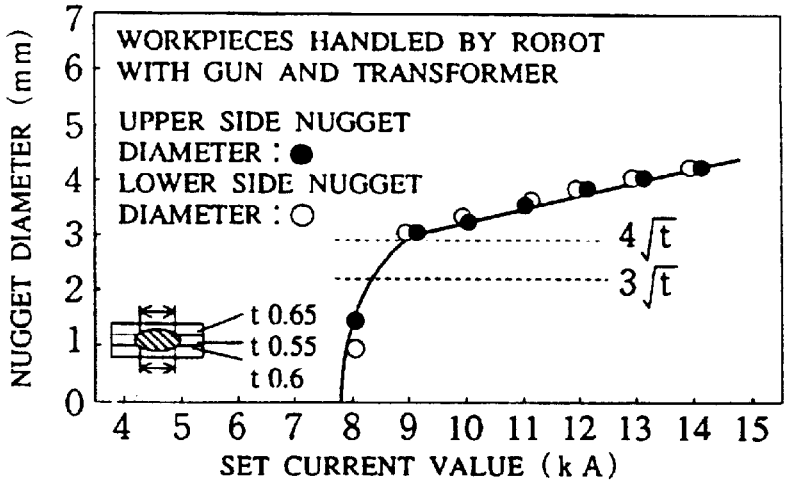
FIGS. 10A and 10B are graphs showing the same relationship as shown in FIGS. 9A and 9B, respectively, workpieces being welded by a robot.
Figure 10B:
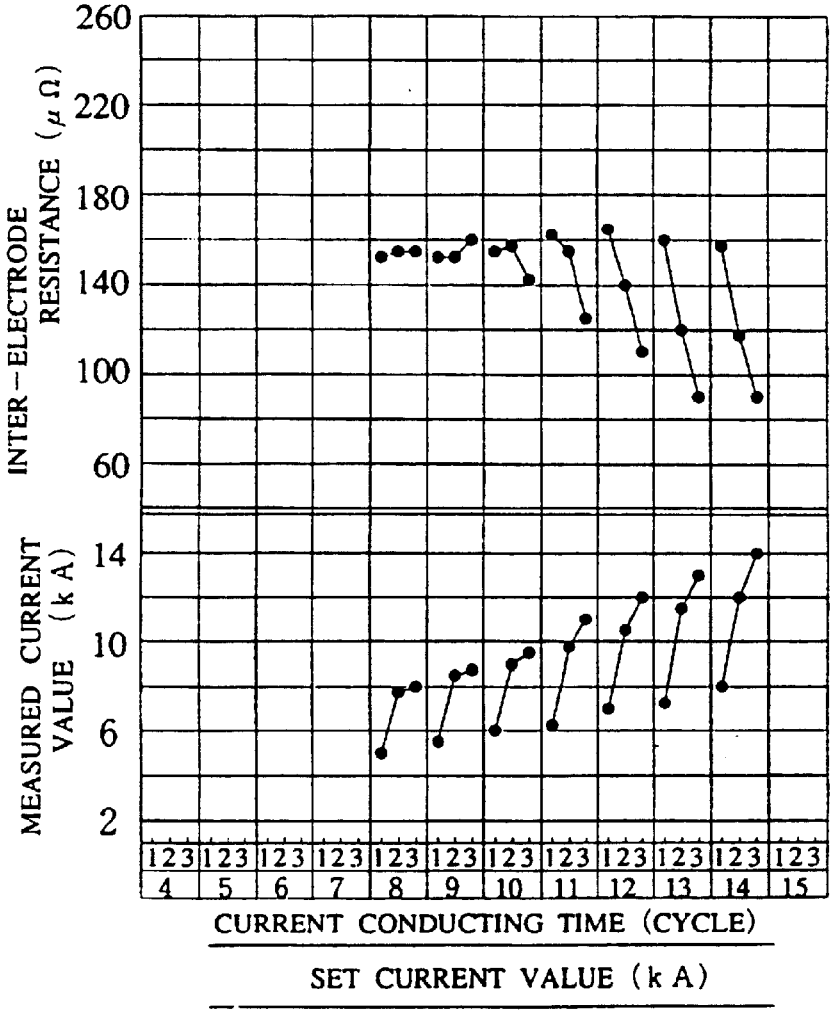

The electrode pressure is 240 kgf (2352N). In this case, there are two bonding surfaces, and there is a tendency that respective nugget diameters slightly differ. However, in both a case where a test piece is welded by a stationary welding machine, as shown in FIGS. 9A and 9B, and a case where a workpiece is welded by a robot, as shown in FIGS. 10A and 10B, a difference between nugget diameters will become smaller and also the variations in the inter-electrode resistance values can be clearly distinguished if a sufficient nugget comes to be formed.

FIGS. 11A, 11B, 12A and 12B show the result of the experiment where a combination of three steel sheets was used. The intermediate steel sheet is a bare high-tensile steel sheet which is relatively thick. The two galvannealed steel sheets are a panel side outer (galvannealed steel sheet, t: 0.7 mm, coating weight: 30/60) and a pillar center body inner lower (galvannealed steel sheet, t: 0.7 mm, coating weight: 30/60). The bare high-tensile steel sheet is a reinforced belt anchor-to-center pillar (bare high-tensile steel sheet, t: 1.6 mm).

The electrode pressure is 245 kgf (2401N). When the test piece is welded by a stationary welding machine, as shown in FIGS. 11A and 11B, it is conceivable that one method is to refer to the inter-electrode resistance value after 3-cycle current conducting rather than to discriminate the success or failure of a nugget caused by the reduction amount of the inter-electrode resistance value. When, on the other hand, the workpiece is welded by a robot, as shown in FIGS. 12A and 12B, a difference between nugget diameters is remarkable at the two bonding surfaces, but the reduction amount can be clearly distinguished at current levels greater than 14 kA where a sufficient nugget is formed, and even at levels less than 14 kA.

FIGS. 13A, 13B, 14A and 14B show the experimental result for a combination of four panel sheets. The panel combination comprises, from the top portion, a panel side outer (galvannealed steel sheet, t: 0.7 mm, coating weight: 30/60), a reinforced front body pillar inner (bare high-tensile steel sheet 45 kgf class, t: 1.2 mm), a pillar front body upper inner (bare common steel sheet, t: 0.8 mm), and a rail roof side inner (bare common steel sheet, t: 0.65 mm).

The electrode pressure is 230 kgf (2254N). In FIGS. 13A and 13B which show the result of the test pieces welded by a stationary welding machine, irregular current conducting occurred for the test pieces marked with *. In the test pieces marked with *, it is difficult for the reduction amount of the inter-electrode resistance value alone to become a criterion for judging the success or failure of a nugget.

However, with respect to the inter-electrode resistance values after the 3-cycle current conducting, there is a clear difference between the resistance value where a nugget is formed and the resistance value where a nugget is not formed. From this fact, when irregular current conducting occurs, the success or failure of a nugget can be judged by referring to the inter-electrode resistance value at the time of the end of the current conducting, in addition to the reduction amount.

FIGS. 15 to 20 show some of the results obtained for the relationship between a variation in the reduction amount of the inter-electrode resistance value and a nugget diameter during successive strike points by the same electrode, with respect to a combination of three molded galvannealed steel sheets or workpieces (dash panel, cowl inner panel and cowl outer panel), using a pilot line constructed after part of an actual production line. In this combination, the number of strike points is 18 and the number of panels used is 330 sets. The details of each process in the pilot line will be described in the following embodiments of the present invention, and the steps are as follows:

(1) Set the dash panel to a jig.

(2) Automatically coat a resistance increasing material onto the bonding surfaces of the dash panel.

(3) Set the cowl inner panel to the jig.

(4) Automatically coat the resistance increasing material onto the bonding surfaces of the cowl inner panel.

(5) Set the cowl outer panel to the jig.

(6) Perform spot welding by a robot.

(7) Take out the panels from the jig.

In this pilot line, the set current value is 12 to 16 kA, the current conducting time is 2 to 4 cycles, and the electrode force is 240 kgf (2352N) to 270 kgf (2646N). The panels were successively struck while varying each value as needed. The weld conditions and the experimental results shown in the diagrams are data obtained when the deterioration of the welding electrode is fixed to a certain level by the number of strike points.

FIGS. 15 to 17 each show the relationship between a number of strike points and a reduction amount in an inter-electrode resistance value, and the relationship between a number of strike points and a variation pattern of an inter-electrode resistance value, with respect to a specific section (section A) exhibiting an average result. The variation pattern is shown only for a representative case in the vicinity of each strike point. The reduction amount ($\Delta r$) of the inter-electrode resistance value in FIGS. 15 to 17 represents a value obtained by subtracting the minimum value of the inter-electrode resistance value of each cycle of 1 to 3 cycles from the maximum value. The reduction amount ($\Delta r$) of the inter-electrode resistance value can be obtained depending on the variation pattern. A monotonically decreasing pattern is seen immediately after the start of the test, and the inter-electrode resistance value monotonically reduces over 3 cycles (1-2-3 cycles). The reduction amount in the monotonically decreasing pattern is a value obtained by subtracting the value of the third cycle from the value of the first cycle. A peak-shaped pattern appears between 1500 points and 4000 points. The reduction amount in the peak-shaped pattern is a value obtained by subtracting the value of the third cycle from the value of the second cycle. A valley-shaped pattern appears after 4000 points. The reduction amount in the valley-shaped pattern is a value obtained by subtracting the value of the second cycle from the value of the first cycle.

Note that a mark o shown in the diagram represents a case where the reduction of the inter-electrode resistance value is not seen over 3 cycles and also the inter-electrode resistance value monotonically increases, and the value represents the increase amount. Since three steel sheets are layered, two nuggets exist with respect to the same strike point.

In the case of FIG. 15 where a set current value is 12 kA and a current conducting time is 3 cycles, the reduction amount $\Delta r$ of the inter-electrode resistance value is abruptly reduced in the vicinity of 2000 strike points. The peak-shaped variation pattern continues beyond the 2000 strike points and changes to a valley-shaped variation pattern in the vicinity of 4000 strike points. On the other hand, the nugget diameter reduces from the vicinity of 3000 strike points to less than $4t^{1/2}$ (t: minimum base member sheet thickness, 0.55 mm in this case). Thereafter, the nugget diameter continues to reduce, and a nugget was not formed in the vicinity of 6000 strike points. Therefore, in this case of a combination of galvannealed steel sheets, in order to sufficiently guarantee a sufficient nugget, the life of the electrode should be before the 2000 strike points where the abrupt variation in the inter-electrode resistance value takes place. Accordingly, when, for example, the reduction amount of the inter-electrode resistance value is 30 $\mu\Omega$ or more, the formation of the nugget is judged to be a success, and when the reduction amount of the inter-electrode resistance value is less than 30 $\mu\Omega$, the formation of the nugget is judged to be a failure. And, it is conceivable that this judgment result may be used as an object of adaptive control which will be described later.

In addition, in FIG. 15, with respect to the inter-electrode resistance value of the first cycle, the inter-electrode resistance value, which was about 160 $\mu\Omega$ at the start of the test, is gradually reduced thereafter and reaches about 130 $\mu\Omega$ in the vicinity of 3000 strike points where a nugget diameter starts to reduce. Thus, if the inter-electrode resistance value of the first cycle during successive strike points is monitored to inspect the reduction amount of that value, the remaining life of the electrode can be also estimated.

Furthermore, if attention is paid to the inter-electrode resistance value of the third cycle, the inter-electrode resistance value rises after the vicinity of 2000 strike points where the reduction amount $\Delta r$ of the resistance value abruptly reduces. Thus, with the inter-electrode resistance value of the third cycle (the end of the current conducting) during successive strike points, the remaining life of the electrode can be also estimated.

On the other hand, when the life of an electrode can be determined by whether a reduction amount meets a certain standardized value, for example, $4t^{1/2}$, the life can be also estimated by pattern recognition, based on the number of strike points where a pattern changes from the peak-shaped to the valley-shaped, rather than the reduction amount of an inter-electrode resistance value. For example, in the case of this experiment, it is also possible to use the vicinity of 4000 strike points as an object of adaptive control.

In the aforementioned prior art, a guarantee of quality cannot be obtained with reliability and an exchange of a welding electrode is required when the number of strike points reaches about 1000. On the other hand, in the present system, a pair of weld electrodes can give stable strike points until about 4000 strike points, while reliably assuring an in-process quality guarantee.

FIG. 16 shows the test results in a case where spot welding was performed with a weld current of 12 kA and a current conducting time of 4 cycles. During the test of 12 kA and 3 cycles, shown in FIG. 15, the current conducting time was appropriately extended by one cycle, and the result was investigated. By the 1-cycle extension of the current conducting time, the nugget diameter and the reduction amount of the inter-electrode resistance value were both recovered.

FIG. 17 is a case where spot welding was performed with 14 kA and 3 cycles in the same way. Even with an increase in the set current value, the nugget diameter and the reduction amount of the inter-electrode resistance value were both recovered.

From the results of the experiments, it has been found that, when a deficiency in a nugget diameter is predicted, increasing a set current value and/or a current conducting time is an effective method of assuring a sufficient nugget.

When the current conducting time is extended or the set current value is raised, the reduction amount Δr of the inter-electrode resistance value is sometimes slightly less than 30 μΩ, as shown in FIGS. 16 and 17. On the other hand, the nugget diameter has been sufficiently assured for these cases. For the strike points formed after the weld conditions are varied by some change, for example, an increase in the electrode pressure, an extension of the current duration, or an increase in the set current value, it is conceivable that, for example, ΔRp>15 μΩ or a peak-shaped pattern may be used as a criterion for judging a nugget.

FIGS. 18 to 20 show the result as to a specific section (section B) where formation of a nugget was insufficient. For the reduction amount Δr of the inter-electrode resistance value, this section has already had less than a criterion of 30 μΩ reduction at about 1100 strike points. The nugget diameter also tends to reduce at about 2700 strike points. On the other hand, with respect to patterns, an area showing a slightly unclear peak-shaped type, which appeared between a peak-shaped and a valley-shaped, is characteristic.

FIG. 19 shows the results of 12 kA and 4 cycles, i.e., a case where a current conducting time was extended by 1 cycle. By the extension of the current conducting time, the nugget diameter and the reduction amount Δr were both recovered considerably. In a strike point area where the pattern becomes a peak-shaped type or an unclear peak-shaped type in FIG. 18, the nugget diameter and the reduction amount Δr were completely recovered. In a strike point area where the pattern becomes a valley-shaped type in FIG. 18, however, the nugget diameter remains insufficient and the reduction amount Δr also remains low.

On the other hand, as shown in FIG. 20, when the set current value is increased to 14 kA and the current conducting time is extended by 1 cycle to 4 cycles, the nugget diameter and the reduction amount Δr were both recovered completely. The results shown in FIGS. 18 to 20 indicate that, even when the welding result is insufficient, control is possible through the reduction amount Δr the pattern recognition.

With respect to the fact that panels are the same but, as shown in FIGS. 15 to 17 and FIGS. 18 to 20, the welding results differ depending on the position of the strike point, the divided flows of the weld current are considered as one of the main causes. As shown in FIGS. 15 to 20, even in the state where the deterioration of the electrode has advanced due to successive strike points, or even under the condition near to an actual production line accompanied by disturbance main causes such as divided flows, a clear relationship is recognized between a variation in an inter-electrode resistance value and formation of a nugget.

Note that the experimental results shown in FIGS. 1 to 20 were obtained by means of an alternating current welding machine. In addition to this type of spot welding machine, there is an inverter type and a direct current type. For these types, a current conducting time is finely divided, then, inter-electrode resistance values for each of the divided current conducting times are obtained, and the thus obtained values are recorded during the current conducting times. In this way, the resistance variations of all of the current conducting times can be obtained. Therefore, the same effects stated for the experimental results shown in FIGS. 1 to 20, i.e., that the formation of a nugget can be also judged from the variation characteristic of the inter-electrode resistance value, apply to the inverter and direct current types as well.

Also, in this experimental result the 3-cycle current conducting time is described as a standard. However, even in the cases other than the case of the 3-cycle current conducting time, the reduction amount of an inter-electrode resistance value and the variation pattern of an inter-electrode resistance value can be recognized from an inter-electrode resistance value during a predetermined period, and as in the case of 3 cycles, the remaining life of an electrode can be estimated. In this way, adaptive control can be performed.

Through the experiments, it has been found that the problems to be solved by the present system are all solved and the present system can be put to practical use without any difficulty. More specifically, the resistance increasing material developed by this experiment is readily fed and arranged to a bonding surface. Also, it is confirmed that the resistance increasing material remarkably enhances welding performance and maintains a high adhesive force. On the other hand, by means of the welding method of the present system using this resistance increasing material, disappearance of an inter-sheet resistance during welding, i.e., formation of a nugget, can be clearly detected and an in-process quality guarantee is assured. Furthermore, the variation of an inter-electrode resistance value resulting from the deterioration of a welding electrode during successive strike points can be also recorded accurately. From this record, the number of strike points or the time where a nugget is not formed can be effectively estimated. It has also been found that an automatic operation by adaptive control is possible.

The system of the first aspect of the present invention is applicable as such to an actual large-scale manufacturing line. The system of the second aspect of the present invention is applicable as such to an actual small-scale manufacturing line. The system of the third aspect of the present invention is applicable as such to an actual intermediate-scale manufacturing line. In the system of another form, when a nugget judgment result is NO, a current conducting time is automatically extended and formation of a nugget is achieved.

In a preferred embodiment, a second compensation step is performed to form a nugget. Also, when the estimation value (remaining life) that is estimated from a resistance value variation characteristic reaches a fixed value, the electrode may be automatically ground and the shape of the electrode chip may be repaired to its previous state.

In another preferred embodiment, when the remaining life that is estimated from the frequency of irregular current conducting reaches a fixed value, the electrode pressure is automatically increased so that a stable strike point is obtained. In another preferred system, when the remaining life reaches a fixed value, the current conducting time is automatically extended and formation of a nugget is maintained. Further, in another system, when the remaining life reaches a fixed value, the set current value is automatically increased and formation of a nugget is maintained.

In further preferred embodiment, a resistance increasing material having high welding performance and an adhesive function is efficiently coated on a bonding surface. Therefore, productivity is enhanced, and also a welded section is imparted with a better sealing function, thereby the welded section with high added-value is realized.

Also, if a perforated tape coated on both sides is used, in a washing process prior to a coating process of a structure, there is no possibility that the resistance increasing material flows out, and thus overflowing of the resistance increasing material from a welded section is effectively avoided.

Enhancement in productivity, an in-process quality guarantee, and adaptive control in the successive spot welding of a galvanized steel sheet are goals which have been strongly demanded but have not yet been achieved. Even in welding using a resistance increasing material, there is room for improvement in enhancement of productivity. Also, even for a conventional monitor for the success or failure of a nugget which monitors a very limited welding condition, for example, a weld current, if the current is outside a set range, the monitor generates an abnormality signal simply informing that the current is outside the range, and finally stops a production line.

On the other hand, in the system of the present invention, excellent operational performance and welding performance are obtained under a mass production system. Also, an occurrence of welding quality trouble is sensed in advance and weld conditions are instantly and automatically modified. Consequently, an in-process adaptive control preventing an occurrence of trouble in advance is possible. In addition, even if trouble with welding occurs, a modification can be made without stopping the production line. With this, high productivity and automation of a production line can be achieved under a mass production system. Furthermore, in the system of the present invention, the in-process quality guarantee can be assured for all strike points. Moreover, by providing a seal or adhesive function to the resistance increasing material, the added value to the weld, such as enhancement in strength and rigidity, is high.

Embodiments

Embodiments 1 to 3 will be described below referring to the drawings.

Embodiment 1

Embodiment 1 of the present invention is applied to an assembly line for automobile bodies of the present system and relates to an automatic assembly system of spot welding by adaptive control of molded galvannealed steel sheets. That is, Embodiment 1 embodies the system of the present invention, with respect to the bonding assembly for a dash panel 10a, a cowl inner panel 10b, and a cowl outer panel 10c which were press molded, by means of a pilot line constructed as part of an assembly line for automobiles.

Generally, in the assembly of an automobile, body panels are designed and then a large number of panels are formed from galvanized steel sheets in the press working process. Thereafter, in the welding assembly process, the panels are welded into a body mainly by means of spot welding. Then, in the painting process, the body is subjected to washing, electrodeposition painting, drying, second painting, final coating, drying, and finishing. Thereafter, in the fittings assembly process, parts such as an engine and seats are attached to complete an automobile.

In the pilot line 50 shown in FIG. 21, between bonding surfaces through zinc coating layers on three panels 10a to 10c formed by press working, a resistance increasing material is coated by means of a coating robot 12. Then, the bonding surfaces are spot welded to form a body (subassembly) 11 by means of a welding robot 13. The coating robot 12 is connected to a control board 14, which in turn is connected to a process control board 15. Also, the welding robot 13 is connected to a control board 16, which is also connected to the process control board 15. The welding robot 13 is provided with valves and regulators (for adjusting a welding force) corresponding to the number of electrode pressure choices so that a desired welding pressure can be selected. The process control board 15 is connected to a panel set jig 17, a coating unit control board 18, and a welding current control unit 19.

The coating unit control board 18 is connected to a tank (not shown) storing resistance increasing material and also to a pressure feed pump 20 connected to this tank. A hose 21, connected to the pressure feed pump 20, is connected to a nozzle 22. The nozzle 22 is held by the coating robot 12. The resistance increasing material within the tank comprises an adhesive incorporated with 15 wt % of an alumina powder having an average particle diameter of 100 $\mu$m. Also, the hose 21 is maintained at a constant temperature so that the resistance increasing material whose viscosity varies with temperature can be predictably supplied.

The welding current control unit 19 is connected through a cable 23 to a welding gun 24, which is held by the welding robot 13. The welding gun 24 has a terminal for inter-electrode voltage measurement and is connected through a voltage monitor line 27 to the welding current control unit 19. A welding transformer 25 has a toroidal coil at the secondary side thereof and is connected through a current monitor line 26 to the welding current control unit 19. Therefore, the welding current control unit 19 can measure an inter-electrode voltage value and an inter-electrode current value when the weld electrodes are electrically conducted. In other words, the waveforms of the inter-electrode voltage value and the inter-electrode current value are input to the welding current control unit 19 through the voltage and current monitor lines 27 and 26, and are converted to a root-mean-square value and an average value by means of a computer incorporated in the welding current control unit 19. Also, an inter-electrode resistance value r is calculated by the welding current control unit 19. At this time, since an alternating current welding power supply is employed, the inter-electrode resistance value r is obtained with the average values of the inter-electrode voltages and the inter-electrode currents of the second half portion of each current conducting cycle. And, the welding current control unit 19 is connected to a monitor (host computer) 28 for managing welding quality.

The panels 10a to 10c are designed by the computer 28. Therefore, since the shapes of the panels, the strike positions of the spot welding, and the like have been accumulated in the computer 28 as data, it is also possible to use these data to control the operation of the welding robot 13.

In the pilot line 50 constructed as described above, processing is performed according to a main flow chart of FIG. 22 by means of the process control board 15.

Conveying Process

First, in step S100 the dash panel 10a, the cowl inner panel 10b, and the cowl outer panel 10c are conveyed onto the jig 17 by means of a conveying unit (not shown). Note that part or all of the conveyance can be also performed manually by an operator.

Fixing Process

Then, in step S101, the dash panel 10a is fixed to the jig 17. At this time, since the dash panel 10a has been provided with reference holes (not shown) and the jig 17 has also been provided with reference holes (not shown), the position of the dash panel 10a is determined by inserting reference pins into the reference holes. If the dash panel 10a is fixed at a predetermined position on the jig 17, a sensor on the jig 17 will sense the panel 10a and a fixation end signal will be sent to the process control board 15 from the jig 17.

Coating Process

Then, in step S102, an instruction for coating a resistance increasing material is output from the process control board 15 to the control board 14 of the coating robot and to the coating unit control board 18. The coating robot 12 with the nozzle 22 is controlled by the coating robot control board 14 so that the nozzle 22 is moved to a predetermined position.

A signal by which the coating robot 12 moves the nozzle 22 to a predetermined position is output from the control board 14 to the process control board 15. The process control board 15 sends a signal for starting the discharge of the resistance increasing material to the coating unit control board 18. The coating unit control board 18 operates the pressure feed pump 20 and at the same time opens the nozzle 22. With this operation, the resistance increasing material is sent to the nozzle 22 from the tank through the hose 21 and is coated on the dash panel 10a by means of the nozzle 22.

On the other hand, the coating robot 12 will operate along a locus previously determined if the discharging of the resistance increasing material is started, and the resistance increasing material will be coated on a predetermined bonding surface. When the coating robot 12 reaches the coating end position of the resistance increasing material, the supplying of the resistance increasing material by the pressure feed pump 20 will be stopped and the nozzle 22 will be closed. The coating robot 12 returns to the origin position.

In order to confirm that the resistance increasing material is being coated stably without being stopped during the aforementioned the coating robot 12 is provided with a monitoring camera (not shown). This confirmation is performed by image recognition or the operator viewing the monitor screen.

Conveying Process, Overlapping Process, Coating Process

After the resistance increasing material is coated on the dash panel 10a, the cowl inner panel 10b is overlapped on the dash panel 10a by means of a conveyer unit in step S103. The cowl inner panel 10b, likewise in the dash panel 10a, is provided with reference holes (not shown) and is aligned and fixed to the reference pins (not shown) of the jig 17. With this structure, the resistance increasing material is interposed between the dash panel 10a and the cowl inner panel 10b.

Then, the coating operation of the resistance increasing material is repeated on the bonding surface of the cowl inner panel 10b as in the case of the dash panel 10a.

Conveying Process, Overlapping Process

Furthermore, in step S104, the cowl outer panel 10c is overlapped on the cowl inner panel 10b by means of the conveyer unit. Thus, the resistance increasing material is interposed between the cowl inner panel 10b and the cowl outer panel 10c.

Welding Condition Setting Process

If the overlapping of the panels 10a to 10c is completed, a clamp end signal will be sent to the process control board 15 from the panel set jig 17.

When receiving the clamp end signal, the process control board 15 senses the end of the panel setting and the resistance increasing material coating. And, in step S105, the weld conditions of the spot welding are selected.

In other words, since actual workpieces constituting the body of an automobile are constituted by a plurality of panels, sheet alignment varies depending on the welded section. Also, as the type of panel, there are bare soft steel sheets, bare high-tensile steel sheets, galvannealed soft steel sheets, and galvannealed high-tensile steel sheets. Furthermore, their thickness ranges between about 0.5 and 3 mm. Therefore, it is necessary to vary the weld conditions such as the set current value, the current conducting time, and the electrode pressure, depending on a section to be welded. The welding current control unit 19 is constructed so that it can store the weld conditions and appropriately select the weld conditions in correspondence with individual welded sections.

Pressurizing Process

Then, in step S106 a spot welding start signal is sent to the welding robot control board 16 from the process control board 15.

When receiving the signal, the welding robot 13 first moves the welding gun 24 to the first section. At this time, the line connecting the centers of both weld electrodes of the welding gun 24 is positioned nearly at the center of the resistance increasing material between the bonding surfaces. If the welding gun 24 reaches the first section, a signal will be sent to the process control board 15 from the welding robot control board 16. Then, the process control board 15 sends a welding start signal to the welding current control unit 19.

When the welding current control unit 19 is activated, the valve and regulator of the welding gun 24 held by the welding robot 13 will be operated and a pair of weld electrodes of the welding gun 24 will clamp the first welded section of the panels 10a to 10c.

With this operation, the panels 10a to 10c are pressurized with a set welding pressure by means of a pair of weld electrodes. At this time, the resistance increasing material leaves a space between the bonding surfaces so that bonding surfaces can partially contact each other.

Current Conducting Process

Thereafter, in step S107, the panels are electrically conducted with the set current value for 3 cycles and spot welding is performed.

Detection Process

Also, in step S108, the voltage and current between the electrodes for each cycle are detected via the weld electrodes.

Estimation Process (Irregular Current Conducting)

In step S200 signal processing of whether or not irregular current conducting exits is performed according to irregular current conducting routine S200 shown in FIG. 23.

First, in step S201, a welding current root-mean-square (RMS) value, i, is calculated for each cycle by the welding current control unit 19. Then, in step S202, whether the conducted welding current was normal or irregular is judged by whether the calculated welding current RMS value i is within a normal current range. In step S202, if "YES", the processing will return to the main routine because there is no irregular current conducting during successive strike points. In step S202, if "NO", there is irregular current conducting during successive strike points, and in step S203 the frequency of irregular current conducting is counted.

Control Process (Irregular Current Conducting)

The frequency counted in step S203 is compared in step S204 with a preset reference. In step S204, if the counted frequency is smaller than the reference, the processing will return to the main routine. If the counted frequency is greater than the reference, the processing will advance to step S205.

If the frequency is greater, it will be estimated that formation of a sufficient nugget will become difficult under the same welding condition (in this case, electrode pressure). The number of strike points or period at this point will become an estimated value of the limitation of the same welding condition. Therefore, in step S205, the valve and the regulator are selected in order to increase the electrode pressure at the next strike point, and the processing returns to the main routine. With this operation, a contact between the base members is sufficiently assured, and consequently, stable welding can be continued.

Calculation Process

The computer 28, incorporated in the welding current control unit 19, executes routine S300 shown in FIG. 24 in step S300 shown in FIG. 22.

A single resistance value variation characteristic is used in Embodiment 1 for pattern recognition. Therefore, the computer 28, incorporated in the welding current control unit 19., calculates a variation pattern from each inter-electrode resistance value, r.

First, in step S301, the reduction amount ($\Delta r$) of the inter-electrode resistance value (resistance value variation characteristic) is calculated from the inter-electrode resistance value r of each cycle. Namely, the inter-electrode resistance value r of each cycle is calculated by the welding current control unit 19. The inter-electrode resistance value of the first cycle is designated $r_1$, the inter-electrode resistance value of the second cycle $r_2$, and the inter-electrode resistance value of the third cycle $r_3$.

In step S302, whether the difference between the inter electrode resistance value $r_1$ and the inter-electrode resistance value $r_2$, ($r_1$–$r_2$), is greater than 0 and also whether the difference between the inter-electrode resistance value $r_2$ and the inter-electrode resistance value $r_3$, ($r_2$–$r_3$), is greater than 0, are judged. If YES, the resistance variation characteristic will be a monotonically decreasing pattern and the processing will advance to step S303. In step S303, the difference between the inter-electrode resistance value $r_1$ and the inter-electrode resistance value $r_3$, ($r_1$–$r_3$), is set to a reduction amount $\Delta r$.

On the other hand, if NO in step S302, the processing will advance to step S304. In step S304, whether the difference between the inter-electrode resistance value $r_1$ and the inter-electrode resistance value $r_2$, ($r_1$–$r_2$), is positive and also whether the difference between the inter-electrode resistance value $r_2$ and the inter-electrode resistance value $r_3$, ($r_2$–$r_3$), is negative are judged. If YES in step S304, the resistance variation characteristic will be a valley-shaped pattern and the processing will advance to step S305. In step S305, the difference between the inter-electrode resistance value $r_1$ and the inter-electrode resistance value $r_2$, ($r_1$–$r_2$), is set to a reduction amount $\Delta r$.

On the other hand, if NO in step S304, the processing will advance to step S306. In step S306, whether the difference between the inter-electrode resistance value $r_1$ and the inter-electrode resistance value $r_2$, ($r_1$–$r_2$), is negative and also whether the difference between the inter-electrode resistance value $r_2$ and the inter-electrode resistance value $r_3$, ($r_2$–$r_3$), is positive are judged. If YES in step S306, the resistance variation characteristic will be a peak-shaped pattern and the processing will advance to step S307. In step S307, the difference between the inter-electrode resistance value $r_2$ and the inter-electrode resistance value $r_3$, ($r_2$–$r_3$), is set to a reduction amount $\Delta r$.

On the other hand, if NO in step S306, the resistance variation characteristic will be a monotonically increasing pattern and the processing will advance to step S308.

Second (Successive) Recording Step

Also, in step S303, the monotonically decreasing pattern and the reduction amount $\Delta r$ ($\Delta r = r_1 - r_3$) are recorded. In step S305, the valley-shaped pattern and the reduction amount $\Delta r$ ($\Delta r = r_1 - r_2$) are recorded. In step S307, the peak-shaped pattern and the reduction amount $\Delta r$ ($\Delta r = r_2 - r_3$) are recorded. In step S308, the monotonically increasing pattern is recorded.

First Judgment Process

The inter-electrode resistance value r is reduced as a nugget is formed. For this reason, in the calculation process the reduction amount $\Delta r$ of the inter-electrode resistance value is calculated according to the respective variation pattern. Thereafter, in step S309, the reduction amount $\Delta r$ of the inter-electrode resistance value is compared with a criterion $\Delta R$ (for example, 30 $\mu\Omega$) for judging a nugget previously stored in the computer. If YES, formation of a nugget will be judged to be good and the processing will return to the main routine.

In other words, if, in step S309, the reduction amount $\Delta r$ of the inter-electrode resistance value is greater than the criterion $\Delta R$ formation of a sufficient nugget will be guaranteed. On the other hand, in step S309, if NO, a nugget will be judged to be short in a nugget diameter. Also, for the monotonically increasing pattern of step S308, the reduction amount of the inter-electrode resistance value is not calculated and the monotonically increasing pattern is judged to indicate a short nugget diameter.

More specifically, when, in step S309, the reduction amount $\Delta r$ of the inter-electrode resistance value is less than the criterion $\Delta R$, or for the monotonically increasing pattern of step S308, a guarantee of formation of a sufficient nugget is uncertain. Therefore, when the judgment in step S309 is NO, or after step S308, the current conducting time extension routine shown in FIG. 25 is executed.

First Compensation Step

First in step S401 the current conducting time is extended by 1 cycle. With this extension, formation of a nugget is compensated. Note that if a current value of the extension is set high, more reliable compensation can be performed.

Estimation process (extension of current conducting)

Then, in step S402, the inter-electrode resistance value, $r_4$, of the fourth cycle is calculated by means of the welding current control unit 19. In step S403, the number of the extensions of current conducting is counted.

Adaptive Control Process (Extension of Current Conducting)

The frequency counted in step S403 is compared with a criterion previously set in step S404. If the counted frequency is greater than the preset criterion, the processing will advance to step S405.

The greater frequency means that formation of a sufficient nugget will become difficult under the same welding condition (in this case, current value). The number of strike points or period at this point will become an estimated value of the limitation of the same welding condition. Therefore, in step S405, the set current value is increased at the next strike point by a predetermined value. Thus, stable welding can be continued with a high set current value, and the processing returns to step S404.

Second judgment process

If the counted frequency is less than the criterion in step S404, or after step S405, the processing will advance to step S406. In step S406, whether the difference between the inter-electrode resistance value $r_1$ and the inter-electrode resistance value $r_2$, ($r_1$–$r_2$), is greater than 0 and also whether the difference between the inter-electrode resistance value $r_2$ and the inter-electrode resistance value $r_3$, ($r_2$–$r_3$), is greater than 0 are judged. If YES in step S406, the processing will advance to step S500 and signal processing will be performed according to monotonically decreasing pattern routine S500 shown in FIG. 26.

First, in step S501, whether the difference between the inter-electrode resistance value $r_3$ and the inter-electrode resistance value $r_4$, ($r_3$–$r_4$), is greater than 0 is judged. If YES, the processing will advance to S502. In step S502, the difference between the inter-electrode resistance value $r_1$ and the inter-electrode resistance value $r_4$, ($r_1$–$r_4$), is set to a reduction amount $\Delta rp$. If NO, the processing will advance to S503. In step S503, the difference between the inter-electrode resistance value $r_1$ and the inter-electrode resistance value $r_3$, ($r_1$–$r_3$), is set to a reduction amount $\Delta rp$.

After step S502 and step S503, the signal processing returns to step S901 of FIG. 25. In step S406, if NO, signal processing will advance to S407. In step S407, whether the difference between the inter-electrode resistance value $r_1$ and the inter-electrode resistance value $r_2$, $(r_1-r_2)$, is positive and also whether the difference between the inter-electrode resistance value $r_2$ and the inter-electrode resistance value $r_3$, $(r_2-r_3)$, is negative are judged. If YES, the processing will advance to step S600 and signal processing will be performed according to valley-shaped pattern routine S600 shown in FIG. 27.

In step S601, whether the difference between the inter-electrode resistance value $r_1$ and the inter-electrode resistance value $r_3$, $(r_1-r_3)$, is greater than 0 is judged. If YES, the processing will advance to S602. In step S602, whether the difference between the inter-electrode resistance value $r_3$ and the inter-electrode resistance value $r_4$, $(r_3-r_4)$, is greater than 0 is judged. If YES, the processing will advance to S603. In step S603, whether the difference between the inter-electrode resistance value $r_2$ and the inter-electrode resistance value $r_4$, $(r_2-r_4)$, is greater than 0 is judged. If YES, the processing will advance to S604. In step S604, the difference between the inter-electrode resistance value $r_1$ and the inter-electrode resistance value $r_4$, $(r_1-r_4)$ is set to a reduction amount $\Delta rp$.

In step S603, if NO, then signal processing will advance to S605. In step S605, the difference between the inter-electrode resistance value $r_1$ and the inter-electrode resistance value $r_2$, $(r_1-r_2)$, is set to a reduction amount $\Delta rp$.

In step S602, if NO, then signal processing will advance to S606. In step S606, the difference between the inter-electrode resistance value $r_1$ and the inter-electrode resistance value $r_2$, $(r_1-r_2)$, is set to a reduction amount $\Delta rp$.

In step S601, if NO, signal processing will advance to S607. In step S607, whether the difference between the inter-electrode resistance value $r_3$ and the inter-electrode resistance value $r_4$, $(r_3-r_4)$, is greater than 0 is judged. If YES, the processing will advance to S608. In step S608, whether the difference between the inter-electrode resistance value $r_2$ and the inter-electrode resistance value $r_4$, $(r_2-r_4)$, is greater than 0 is judged. If YES, the processing will advance to S609. In step S609, the difference between the inter-electrode resistance value $r_3$ and the inter-electrode resistance value $r_4$, $(r_3-r_4)$, is set to a reduction amount $\Delta rp$.

In step S608, if NO, signal processing will advance to S610. In step S610, whether the difference between the inter-electrode resistance value $r_1$ and the inter-electrode resistance value $r_2$, $(r_1-r_2)$, is greater than the difference between the inter-electrode resistance value $r_3$ and the inter-electrode resistance value $r_4$, $(r_3-r_4)$, is judged. If YES, the processing will advance to S611. In step S611, the difference between the inter-electrode resistance value $r_1$ and the inter-electrode resistance value $r_2$, $(r_1-r_2)$, is set to a reduction amount $\Delta rp$.

In step S610, if NO, signal processing will advance to S612. In step S612, the difference between the inter-electrode resistance value $r_3$ and the inter-electrode resistance value $r_4$, $(r_3-r_4)$, is set to a reduction amount $\Delta rp$.

In step S607, if NO, signal processing will advance to S613. In step S613, the difference between the inter-electrode resistance value $r_1$ and the inter-electrode resistance value $r_2$, $(r_1-r_2)$, is set to a reduction amount $\Delta rp$.

After steps S604, S605, S606, S609, S611, S612, and S613, signal processing returns to step S901 shown in FIG. 25. In step S407, if NO, signal processing will advance to S406. In step S408, whether the difference between the inter-electrode resistance value $r_1$ and the inter-electrode resistance value $r_2$, $(r_1-r_2)$, is negative and also the difference between the inter-electrode resistance value $r_2$ and the inter-electrode resistance value $r_3$, $(r_2-r_3)$, is positive are judged. If YES, the processing will advance to step S700 and signal processing will be performed according to peak-shaped pattern routine S700 shown in FIG. 28.

First, in step S701, whether the difference between the inter-electrode resistance value $r_3$ and the inter-electrode resistance value $r_4$, $(r_3-r_4)$, is greater than 0 is judged. If YES, the processing S701 will advance to S702. In step S702, the difference between the inter-electrode resistance value $r_2$ and the inter-electrode resistance value $r_4$, $(r_2-r_4)$, is set to a reduction amount $\Delta rp$. If NO, step S701 will advance to S703. In step S703, the difference between the inter-electrode resistance value $r_2$ and the inter-electrode resistance value $r_3$, $(r_2-r_3)$, is set to a reduction amount $\Delta rp$.

After step S702 and step S703, the signal processing returns to step S901 shown in FIG. 25. If NO, in step S408, the processing will advance to step S800 and signal processing will be performed according to monotonically increasing pattern routine S800 shown in FIG. 29. In step S801, whether the difference between the inter-electrode resistance value $r_3$ and the inter-electrode resistance value $r_4$, $(r_3-r_4)$, is greater than 0 is judged. If YES, the processing will advance to S802. In step S802, the difference between the inter-electrode resistance value $r_3$ and the inter-electrode resistance value $r_4$, $(r_3-r_4)$, is set to a reduction amount $\Delta rp$. If NO, the processing will advance to S803. In step S803, 0 is set to a reduction amount $\Delta rp$. After step S802 and step S803, the signal processing returns to step S901 of FIG. 25. As described above, the calculation method after the first compensation process depends upon patterns, and in each pattern routine the reduction amount $\Delta rp$ is calculated in accordance with each pattern. Thereafter, in step S901, nugget rejudgment is performed. In step S901 the reduction amount $\Delta rp$ is compared with a criterion (for example, 15 $\mu\Omega$) for nugget rejudgment, previously stored in the computer.

In step S901, if YES, a nugget diameter will be rejudged to be good and the processing will return to the main routine. On the other hand, if NO, a nugget diameter will be rejudged as short and the processing will advance to step S902.

Judgment Result Recording Process

In step S902, sections welded by spot welding are recorded. Then, the processing advances to step S1000.

Second Compensation Process

In step S1000, for the section which, in the second judgment process, was determined to have a short nugget, final compensation is performed by restriking and the like.

For the second compensation process, there is a method of restriking a welded section when the section is judged as having a short nugget. In this method, a backup robot in a postprocess automatically selects a gun suitable for a nugget-shortage recorded section and restrikes the section with the gun, or an operator compensates an insufficient section in a postprocess by restriking or are welding. Thereafter, successive striking is advanced while repeating adaptive control, such as an increase in pressure, an extension of the current conducting time, and an increase in the set current value.

In the present system, performing spot welding by monitoring an inter-electrode resistance value, even when a regular strike point is not spot-welded due to an erroneous operation of a robot, or even when an unforeseen accident such as a broken wire of an inter-electrode voltage monitor line occurs, it is possible to detect an abnormality from an inter-electrode resistance value and compensate the abnormality at the second compensation process. As described above, even if a nugget not meeting any of criteria of a sequence of processes occurred, formation of a nugget would be guaranteed with certainty.

Result

FIGS. 30 to 33 show some of the results obtained by Embodiment 1. The weld conditions, the nugget judging method, and the criteria of the adaptive control in Embodiment 1 are as follows. The panels used are the same as those shown in FIGS. 15 to 17 and FIGS. 18 to 20. The number of strike points is 18.

Weld Conditions

Electrode pressure: P=240 kgf (2352N) (in case of pressure increase, increase of 20 kgf)

Current conducting time: T=3 cycles (in case of time extension, increase of 1 cycle)

Set current value: I=12 kA (in case of current value increase, increase of 1 kA)

Nugget Judgment

Regular criterion of nugget judgment (1): $\Delta R \geqq 30 \mu\Omega$

Criterion of nugget judgment after the control of conducting time, set current value, and electrode force (2): $\Delta Rp \geqq 15\ \mu\Omega$, peak-shaped pattern Criterion of nugget judgment at the time of irregular current conducting (3):

$r_3$ (inter-electrode resistance value after 3-cycle current conducting) $\leqq 100 \mu\Omega$ Adaptive Control Judgment Criterion Criterion of current conducting extension (4):

in the case where nugget judgment after 3-cycle current conducting is NO

Criterion of current increase (5):

frequency of occurrences of current conducting extension, 10 points/successive 18 points Criterion of electrode pressure increase (6):

frequency of occurrences of irregular current conducting, 5 points/successive 18 points As can be seen in FIGS. 30 to 32, when the number of strike points is small, the reduction amount of the inter-electrode resistance value for all strike points was $\Delta r \geqq 30\ \mu\Omega$ and the nugget diameter was also sufficient. When the number of strike points was increased and it reached 846 points, the reduction amount $\Delta r < 30\ \mu\Omega$ appeared. For this case, the current conducting time extension of 1 cycle was automatically added. As a result, the nugget judgment criterion (2) after control (extension of current conducting) was met and the nugget diameter was also sufficient.

Note that the reduction amount $\Delta r$ of each inter-electrode resistance value shown in FIGS. 30 to 32 is shown for all strike points within the range of strike points, shown in FIGS. 30 to 32. Also, the reduction amount $\Delta r$ is a value after 3-cycle current conducting, and a value of the reduction amount Arp after the extension of a current conducting time has not been shown. When the number of strike points reached the vicinity of 1500 strike points, the reduction amount $\Delta r$ became smaller as a whole and the number of strike points of $\Delta r < 30\ \mu\Omega$ was considerably increased. For these cases, the current conducting time was automatically extended and the reduction amount $\Delta rp$ met the aforementioned criterion (2).

When the number of strike points reaches the vicinity of 2300 points, the frequency of the extensions of current conducting becomes high, and it is estimated that the number of strike points or period until a sufficient nugget does not come to be obtained, is to be reduced. Therefore, the set current value automatically rose to 13 kA by the criterion (5) of the current value increase. Accordingly, the frequency of the extensions of current conducting was reduced. When the number of strike points is 2832 points, irregular current conducting occurred. This irregular current conducting was judged by the criterion (3) for nugget judgment.

When the number of strike points is in the vicinity of 3400, the frequency of the current conducting extension is again increased and the set current value automatically rose to 15 kA (although not shown, in the vicinity of 3200 points the current value has risen to 14 kA).

In the vicinity of 3740 strike points, the current value further increased to 16 kA and in the vicinity of 4450 strike points the irregular current conducting came to frequently appear. Consequently, the electrode pressure was automatically increased to 260 kgf (2548N) by the criterion (6) of the electrode pressure increase.

In this way, spot welding could be performed up to 5400 strike points without having recourse to any human intervention by adaptive control, while assuring a sufficient nugget and achieving an in-process quality guarantee. Incidentally, the 5400 strike points is the amount of 300 panel sets of 300 automobiles and equivalent to an amount of work for one day of an average automobile production line. In FIG. 33, there are two nugget diameters for each strike point because three base members are bonded. The nugget diameters are almost the same and a smaller value of the two is shown.

For nuggets which meet a criterion but where the reduction amount $\Delta r$ is particularly small and irregular current conducting occurred, all nugget diameters were checked and were found sufficient. Furthermore, in this experiment, an increase in a current value by the adaptive control was performed at a time with a constant number of strike points. However, as shown on the sections A and B of the same panel, the degree of difficulty of nugget formation depends on the position of each strike point. Therefore, with respect to individual positions of strike points, or for groups classified according to the degree of difficulty, it is conceivable that a current value is increased individually or according to each group. In this way, the life of a welding electrode can be extended.

Also, in this example, the weld conditions at the time of the start of a test were rendered constant for all strike points of each panel. It is conceivable that the weld conditions at the time of the test start are also varied individually or according to each group, depending on the degree of difficulty of nugget formation. Thus, the life of a welding electrode can also be extended preventing unnecessary heating at the time of welding.

Strength test

For an automobile white body assembled by prior art and an automobile white body where the same members were used, only the door opening portion of a side member was assembled by the system of Embodiment 1, and other members were assembled by prior art, the bending rigidities of automobile bodies were compared. The results are shown in FIG. 34.

The number of strike points of the door opening portion was 164 strike points for the prior art and reduced to 71 strike points for the present system. The rate of reduction of the number of strike points is 57%. Note that the section welded by the present system has been subjected to hardening treatment at 180° C. for 30 minutes after striking.

As evident in FIG. 34, the bending rigidity of the body assembled by the present system showed a high value not inferior to the prior art in spite of a considerable reduction in the number of strike points. This is due mainly to the adhesive effect brought about by the present invention.

Value Analysis

The value analysis in the case where, instead of the prior art, the system of the present invention is introduced into the assembly process of automobile bodies by a mass production method is as follows.

A. Advantages

1. Matters resulting from the reduction of bonding energy by an increase in an inter-sheet resistance value a) Saving of consumption power (⅓ of prior art)

b) Miniaturization of a robot or cooling of a welding machine (reduction in a facility cost)

c) Reduction in sputters (reduction in a maintenance cost)

d) No occurrence of burrs (reduction in a number of finishing processes)

e) Reduction in welding strains (reduction in a number of reforming processes)

f) Small marking (enhancement in outer appearance)

g) Long-life of weld electrodes (stable striking, reduction in the cost of weld electrodes)

h) Reduction in sticking of electrodes (prevention of line stop)

i) Narrow heat affected zone (prevention of deterioration of base members)

2. Matters resulting from the fact that the relationship between a variation in an inter-electrode resistance value and a success or failure of a nugget has been made clear a) Achievement of in-process quality guarantee (reliable guarantee with respect to all strike points) Consequently, abolition of sampling check (chisel check)

b) Achievement of factory automation by adaptive control (saving of labor cost)

3. Matters resulting from the adhesive effect of a resistance increasing material a) Sealing performance (assurance of watertight performance)

b) Enhancement in rigidity of an automobile body (reduction in weight of an automobile body, enhancement in stability of steering)

c) Enhancement in bonding strength d) Enhancement in a vibration characteristic (enhancement in stability of steering and riding performance)

e) Reduction in noise (enhancement in comfort)

f) Enhancement in an impact characteristic

B. Disadvantages a) Need for introducing a suitable number of automatic coating machines into a production line (need of an additional facility cost)

b) Introduction of monitor equipment (need of an additional facility cost)

c) Increase in coating processes d) Cost of a resistance increasing material (adhesive)

C. Comparison

When the system of the present invention is introduced instead of the prior art, the factors for increased costs are reduced and the effects or benefits as to the aforementioned various advantages can be obtained, while including a possibility of decreased costs as a whole.

In a case where weld-bonding has already been adopted, a remarkable improvement in welding performance and an in-process quality guarantee are obtained in addition to an effect of further decreased costs by an introduction of the present system.

Embodiment 2

In Embodiment 2 of the present invention, an automatic electrode grinding machine 29 shown in FIG. 21 is used. In other words, in the aforementioned adaptive control process, automatic grinding of a welding electrode is performed instead of an increase in an electrode pressure in step S205 shown in FIG. 23. Other constructions and operations are the same as shown in the description for Embodiment 1.

In this system, if the frequency of irregular current conducting is greater than a criterion during successive strike points, reminding of a welding electrode will be automatically performed in the aforementioned estimation process. In this case, a set current value is reset to the initial set value at the next strike point and it is possible to continue welding.

Embodiment 3

In Embodiment 3 of the present invention, a perforated tape is used as a resistance increasing material. Other constructions and operations are the same as shown in the description for Embodiment 1.

In this system shown in FIGS. 35(a) and 35(b) a both sided adhesive and perforated tape 30 has an adhesive force at both sides and is stacked to one panel 31 by means of a sticking unit (not shown). Then, another panel is set and spot welding is performed. At this time, a welding robot 13 is controlled by a computer so that a center line connecting both weld electrodes 32 is aligned with the center of the hole 30a of the perforated tape 30.

As has been described in detail hereinbefore, in the system of the present invention, welding performance can be improved and high productivity can be maintained, under a mass production system. Also, under a mass production system, an in-process quality guarantee is performed by checking all welded sections at the same time they are welded and also the troubles associated with quality of welding are monitored in advance. With this operation, the troubles associated with quality of welding can be overcome in advance.

Accordingly, the system of the present invention meets the increasing demand to guarantee quality and is expected to meet the requirement in the present day. Also, enhancement in productivity, an in-process quality guarantee, and a long-period unmanned operation by adaptive control are rendered possible under a mass production system. At the same time, a welded section can be provided with a sealing or adhesive function, and the welded section where the added value, such as assurance of sealing performance and enhancement in rigidity, is high, can be formed.

What is claimed is:

1. A spot welding method for assembling at least two initial members formed from a [galvanized] steel sheet into a structural member by spot welding bonding surfaces of the initial members through *a* galvanized [layers on] *layer formed on at least one of* the bonding surfaces by way of a spot welding machine having a pair of weld electrodes, wherein said method comprises the steps of:

placing a resistance increasing material at a predetermined position on the bonding surface of one of the initial members;

overlapping the other of the initial members on the one of the initial members while clamping the resistance increasing material between the initial members;

positioning a center axis passing through the pair of weld electrodes over substantially the center of the resistance increasing material clamped between the bonding surfaces to apply a predetermined pressure by the weld electrodes to the resistance increasing material and the initial members;

flowing a weld current having a predetermined value between the weld electrodes in a predetermined time;

detecting electric characteristics with respect to the weld electrodes in the predetermined time;

calculating an inter-electrode resistance based on the detected electric characteristics and calculating characteristics of resistance change based on the inter-electrode resistance;

determining success or failure in forming a nugget between the bonding surfaces by comparing the characteristics of resistance change with a predetermined standard;

automatically changing weld conditions upon the determination of failure in the determining step and primarily compensating for the failure;

comparing another predetermined standard with characteristics of resistance change additionally calculated after the compensating step and secondarily determining success or failure in forming the nugget;

recording the determination of failure in forming the nugget in the secondarily determining step;

continuously recording at least one of the electric characteristics, the inter-electrode resistance and the characteristics of resistance change during continuous spot welding by using the identical weld electrodes;

estimating the number of spots or the duration of spot welding until the successful nugget will not be formed according to the record in the continuously recording step;

automatically controlling to change subsequent weld conditions when the estimated member or duration reaches a predetermined standard for estimating;

secondarily comprising the forming of nugget by activating an additional back-up system when it is determined that the nugget is not formed according to the record in the continuously recording step or due to an unexpected accident occurred in the series of the steps; and conveying the initial members between the steps, the steps being adapted to constitute a production line totally controlled by a host computer.

2. A method according to claim 1, wherein said resistance increasing material includes a spacer which ensures a gap between the bonding surfaces of the [galvanized] steel sheets in the overlapping step.

3. A method according to claim 2, wherein said resistance increasing material retains a part of the gap around the spacer between the bonding surfaces to permit the bonding surfaces to contact each other in the pressurizing step.

4. A method according to claim 2, wherein said resistance increasing material retains a part of the gap around the spacer between the bonding surfaces to permit the bonding surfaces to contact each other in the pressurizing step, the retained gap having a size in which zinc, melted or vapored in the current flowing step, can escape from a weld section of the [galvanized] steel sheets.

5. A method according to claim 2, wherein said resistance increasing material includes the mixture of bad electric conductive particles and adhesive material, said bad electric conductive particles functioning as the spacer and said adhesive material foaming or increasing the adhesion when heated or aged.

6. A method according to claim 2, wherein said resistance increasing material includes a perforated tape having an adhesive coated on its opposing faces.

7. A method according to claim 1, wherein said step of changing the weld conditions for the primarily compensating includes prolonging the duration of the weld current.

8. A method according to claim 1, wherein said estimating step includes estimating the number of spots or the duration of spot welding until the successful nugget will not be formed by comparing the characteristics of resistance change with the predetermined standard, and wherein said step of changing the weld conditions in the controlling step includes automatically grinding the weld electrodes.

9. A method according to claim 1, wherein said estimating step includes estimating the number of spots or the duration of spot welding until the successful nugget will not be formed by comparing the frequency of irregular current flow between the weld electrodes, and wherein said step of changing the weld conditions in the controlling step includes increasing the pressure applied to the [galvanized] steel sheets.

10. A method according to claim 1, wherein said step of changing the weld conditions in the controlling step includes prolonging the duration of the weld current.

11. A method according to claim 1, wherein said step of changing the weld conditions in the controlling step includes increasing the predetermined value of the weld current.

12. A spot welding method for assembling at least two initial members formed from a [galvanized] steel sheet into a structural member by spot welding bonding surfaces of the initial members through *a* galvanized [layers on] *layer formed on at least one of* the bonding surfaces by way of a spot welding machine having a pair of weld electrodes, wherein said method comprises the steps of:

placing a resistance increasing material at a predetermined position on the bonding surface of one of the initial members;

overlapping the other of the initial members on the one of the initial members while clamping the resistance increasing material between the initial members;

positioning a center axis passing through the pair of weld electrodes over substantially the center of the resistance increasing material clamped between the bonding surfaces to apply a predetermined pressure by the weld electrodes to the resistance increasing material and the initial members;

flowing a weld current having a predetermined value between the weld electrodes in a predetermined time;

detecting electric characteristics with respect to the weld electrodes in the predetermined time;

calculating an inter-electrode resistance based on the detected electric characteristics and calculating characteristics of resistance change based on the inter-electrode resistance;

determining success or failing in forming a nugget between the bonding surfaces by comparing the characteristics of resistance change with a predetermined standard;

automatically changing weld conditions upon the determination of failure in the determining step and compensating for the failure;

comparing the predetermined standard with characteristics of resistance change additionally calculated after the compensating step and secondarily determining success or failure in forming the nugget; and recording the determination of failure in forming the nugget in the secondarily determining step.

13. A method according to claim 12, wherein said changing the weld conditions includes prolonging the duration for flowing the weld current.

14. A method according to claim 12, wherein said resistance increasing material includes a spacer which ensures a gap between the bonding surfaces of the [galvanized] steel sheets in the overlapping step.

15. A method according to claim 14, wherein said resistance increasing material retains a part of the gap around the spacer between the bonding surfaces to permit the bonding surfaces to contact each other in the pressurizing step.

16. A method according to claim 14, wherein said resistance increasing material retains a part of the gap around the spacer between the bonding surfaces to permit the bonding surfaces to contact each other in the pressurizing step, the retained gap having a size in which zinc, melted or vapored in the current flowing step, can escape from a weld section of the [galvanized] steel sheets.

17. A method according to claim 14, wherein said resistance increasing material includes the mixture of bad electric conductive particles and adhesive material, said bad electric conductive particles functioning as the spacer and said adhesive material foaming or increasing the adhesion when heated or aged.

18. A method according to claim 14, wherein said resistance increasing material includes a perforated tape having an adhesive coated on its opposing faces.

19. A method according to claim 12 further comprising secondarily compensating the forming of nugget by activating an additional back-up system when it is determined that the nugget is not formed according to the record in the continuously recording step or due to an unexpected accident occurred in the series of the steps.

20. A spot welding method for assembling at least two initial members formed from a [galvanized] steel sheet into a structural member by spot welding bonding surfaces of the initial members through a galvanized [layers on] *layer formed on at least one of* the bonding surfaces by way of a spot welding machine having a pair of weld electrodes, wherein said method comprises the steps of:

placing a resistance increasing material at a predetermined position on the bonding surface of one of the initial members;

overlapping the other of the initial members on the one of the initial members while clamping the resistance increasing material between the initial members;

positioning a center axis passing through the pair of weld electrodes over substantially the center of the resistance increasing material clamped between the bonding surfaces to apply a predetermined pressure by the weld electrodes to the resistance increasing material and the initial members;

flowing a weld current having a predetermined value between the weld electrodes in a predetermined time;

detecting electric characteristics with respect to the weld electrodes in the predetermined view;

calculating an inter-electrode resistance based on the detected electric characteristics and calculating characteristics of resistance change based on the inter-electrode resistance;

determining success or failure in forming a nugget between the bonding surfaces by comparing the characteristics of resistance change with a predetermined standard;

automatically changing weld conditions upon the determination of failure in the determining step and primarily compensating the forming of the nugget;

continuously recording at least one of the electric characteristics, the inter-electrode resistance and the characteristics of resistance change during continuously spot welding;

estimating the number of spots or the duration of spot welding until the successful nugget will not be formed according to the record in the continuously recording step; and automatically controlling to change subsequent weld conditions when the estimated number or duration reaches a predetermined standard.

21. A method according to claim 20, wherein said step of changing the weld conditions for the primarily compensating includes prolonging the duration of the weld current.

22. A method according to claim 20, wherein said resistance increasing material includes a spacer which ensures a gap between the bonding surfaces of the [galvanized] steel sheets in the overlapping step.

23. A method according to claim 22, wherein said resistance increasing material retains a part of the gap around the spacer between the bonding surfaces to permit the bonding surfaces to contact each other in the pressurizing step.

24. A method according to claim 22, wherein said resistance increasing material retains a part of the gap around the spacer between the bonding surfaces to permit the bonding surfaces to contact each other in the pressurizing step, the retained gap having a size in which zinc, melted or vapored in the current flowing step, can escape from a weld section of the [galvanized] steel sheets.

25. A method according to claim 22, wherein said resistance increasing material includes the mixture of poorly electrically conductive particles and adhesive material, said poorly electrically conductive particles functioning as the spacer and said adhesive material foaming or increasing the adhesion when heated or aged.

26. A method according to claim 22, wherein said resistance increasing material includes a perforated tape having an adhesive coated on its opposing faces.

27. A method according to claim 20 further comprising secondarily compensating the forming of nugget by activating an additional back-up system when it is determined that the nugget is not formed according to the record in the continuously recording step or due to an unexpected accident occurred in the series of the steps.

28. A method according to claim 20, wherein said estimating step includes estimating the number of spots or the duration of spot welding until the successful nugget will not be formed by comparing the characteristics of resistance change with the predetermined standard and wherein said step of changing the weld conditions in the controlling step includes automatically grinding the weld electrodes.

29. A method according to claim 20, wherein said estimating step includes estimating the number of spots or the duration of spot welding until the successful nugget will not be formed by comparing the frequency of irregular current flow between the weld electrodes, and wherein said step of changing the weld conditions in the controlling step includes increasing the pressure applied to the [galvanized] steel sheets.

30. A method according to claim 20, wherein said step of changing the weld conditions in the controlling step includes prolonging the duration of the weld current.

31. A method according to claim 20, wherein said step of changing the weld conditions in the controlling step includes increasing the predetermined value of the weld current.

32. A spot welding apparatus for assembling at least two initial members formed from a [galvanized] steel sheet into a structural member by spot welding bonding surfaces of the initial members through *a* galvanized [layers on] *layer formed on at least one of* the bonding surfaces by way of a spot welding machine having a pair of weld electrodes, said apparatus comprising:

means for fixing one of the initial members;

means for placing a resistance increasing material at a predetermined position on the bonding surface of the one of the initial members;

means for overlapping the other of the initial members on the one of the initial members while clamping the resistance increasing material between the initial members;

means for positioning a center axis passing through the pair of weld electrodes over substantially centrally with respect to the resistance increasing material clamped between the bonding surfaces to apply a predetermined pressure by the weld electrodes to the resistance increasing material and the initial members;

means for flowing a weld current having a predetermined value between the weld electrodes in a predetermined time;

means for detecting electric characteristics with respect to the weld electrodes in the predetermined time;

means for calculating an inter-electrode resistance based on the detected electric characteristics and for calculating characteristics of resistance change based on the inter-electrode resistance;

means for determining success or failure in forming a nugget between the bonding surfaces by comparing the characteristics of resistance change with a predetermined standard;

means for automatically changing weld conditions upon the determination of failure and for primarily compensating the forming of the nugget;

means for comparing the predetermined standard with characteristics of resistance change additionally calculated after compensating the forming of the nugget and for secondarily determining success or failure in forming the nugget; and means for recording the determination of failure in forming the nugget.

33. An apparatus according to claim 32, wherein said resistance increasing material includes a spacer which ensures a gap between the bonding surfaces of the [galvanized] steel sheets when the [galvanized] steel sheets are overlapped.

34. An apparatus according to claim 33, wherein said resistance increasing material retains a part of the gap around the spacer between the bonding surfaces to permit the bonding surfaces to contact each other when the [galvanized] steel sheets are pressurized.

35. An apparatus according to claim 33, wherein said resistance increasing material retains a part of the gap around the spacer between the bonding surfaces to permit the bonding surfaces to contact each other when the [galvanized] steel sheets are pressurized, the retained gap having a size in which zinc, melted or vapored, can escape from a weld section of the [galvanized] steel sheets when the weld current flows the [galvanized] steel sheets.

36. An apparatus according to claim 33, wherein said resistance increasing material includes the mixture of poorly electrically conductive particles and adhesive material, said poorly electrically conductive particles functioning as the spacer and said adhesive material foaming or increasing the adhesion when heated or aged.

37. An apparatus according to claim 33, wherein said resistance increasing material includes a perforated tape having an adhesive coated on its opposing faces.

38. An apparatus according to claim 32 further comprising:

means for continuously recording at least one of the electric characteristics, the inter-electrode resistance and the characteristics of resistance change during continuously spot welding;

means for estimating the number of spots or the duration of spot welding while using the identical weld electrodes until the successful nugget will not be formed according to the record; and means for controlling to automatically change subsequent weld conditions when the estimated number or duration reaches a predetermined standard.

39. An apparatus according to claim 38, wherein said estimating means estimates the number of spots or the duration of spot welding until the successful nugget will not be formed by comparing the characteristics of resistance change with the predetermined standard, and wherein said controlling means changes the weld conditions by automatically grinding the weld electrodes.

40. An apparatus according to claim 38, wherein said estimating means estimates the number of spots or the duration of spot welding until the successful nugget will not be formed by comparing the frequency of irregular current flow between the weld electrodes, and wherein said controlling means changes the weld conditions by increasing the pressure applied to the [galvanized] steel sheets.

41. An apparatus according to claim 38, wherein said controlling means changes the weld conditions by increasing the predetermined value of the weld current.

42. An apparatus according to claim 38, wherein said controlling means changes the weld conditions by prolonging the duration of the weld current.

43. An apparatus according to claim 32 further comprising means for secondarily compensating the forming of nugget by activating an additional back-up system when it is determined that the nugget is not formed according to the record by the recording means or due to an unexpected accident.

44. An apparatus according to claim 32 further comprising means for conveying the initial members between each means, each means being adapted to constitute a production line totally controlled by a host computer.

45. An apparatus according to claim 32, wherein said changing means prolongs the duration of the weld current.

46. A method for continuously spot-welding [galvanized] steel sheets overlapped to be bonded by way of a spot welding machine having a pair of electrodes, *at least one of said steel sheets being galvanized,* said [galvanized] steel sheets clamping a resistance increasing material including a spacer to ensure a gap therebetween, bonding surfaces of said [galvanized] steel sheets partly contacting each other when the pair of electrodes pressurize the [galvanized] steel sheets such that a part of the gap is retained around the spacer between the bonding surfaces, the retained gap having a size in which zinc melted or vapored when a weld current flows between the electrodes can escape through a weld section of the [galvanized] steel sheets, said method comprising the steps of:

recording an inter-electrode resistance for each spot when the continuous spot welding is executed by the pair of electrodes;

estimating an electrode lifetime defined by one of the number of spots and a duration of the spot welding until a sufficient nugget will not be formed by way of the electrodes according to the record of the inter-electrode resistance; and automatically changing weld conditions to enable the continuous spot welding when the electrode lifetime reaches a predetermined electrode lifetime.

47. A method according to claim 46, wherein said electrode lifetime is defined by the number of spots when a frequency of irregular current flow occurred in a predetermined interval of the series of spots reaches a predetermined standard value, said irregular current flow being defined in a case when the inter-electrode resistance in a first cycle of an alternative current supplied to each spot exceeds a predetermined value.

48. A method according to claim 46, wherein said electrode lifetime is defined by the number of spots when a frequency of a compensation for finalizing an insufficient nugget formed in a predetermined interval of the series of spots reaches a predetermined standard value, said insufficient nugget being defined by a nugget formed when a difference between the maximum and the minimum of the inter-electrode resistances in the cycles of current supplied to each spot becomes lower than a predetermined standard value, and said compensation being performed for the insufficient nugget by extending a time of current supply.

49. A method according to claim 46, wherein said electrode lifetime is defined by the number of spots when a frequency of a compensation for finalizing an insufficient nugget formed in a predetermined interval of the series of spots reaches a predetermined standard value, said insufficient nugget being defined by a nugget formed when a pattern previously selected from a plurality of patterns each representing a change of the inter-electrode resistance during supplying the current to each spot, and said compensation being performed for the insufficient nugget by extending a time of current supply.

50. A method according to claim 46, wherein said electrode lifetime is defined by the number of spots when a frequency of a compensation for finalizing an insufficient nugget formed in a predetermined interval of the series of spots reaches a predetermined standard value, said insufficient nugget being defined by a nugget formed when a pattern previously selected from a plurality of patterns each representing a change of the inter-electrode resistance during supplying the current to each spot and when a difference between the maximum and the minimum of the inter-electrode resistances in the cycles of current supplied to each spot becomes lower than a predetermined standard value, and said compensation being performed for the insufficient nugget by extending a time of current supply.

51. A method according to claim 46, wherein said resistance increasing material includes the mixture of an adhesive material and powders, said powders having a function as a spacer.

52. A spot welding method for spot welding bonding at least two [galvanized] steel sheets by way of a pair of weld electrodes, *at least one of said steel sheets being galvanized,* said method being characterized by the steps of:

placing a resistance increasing material having a spacer between said [galvanized] steel sheets to ensure a gap between said [galvanized] steel sheets;

clamping said [galvanized] steel sheets by said weld electrodes;

flowing a welding current having a predetermined value between said weld electrodes in a predetermined time;

detecting electric characteristics with respect to said weld electrodes during flowing of the welding current; and comparing said electric characteristics with a predetermined standard to determine success or failure in forming a nugget between said [galvanized] steel sheets based on the flowing of the predetermined value welding current between said weld electrodes in the predetermined time.

53. A method according to claim 52, wherein said resistance increasing material retains a part of the gap around the spacer between the [galvanized] steel sheets in the clamping step, the retained gap having a size in which zinc, melted or vapored in the current flowing step, can escape from a weld section of the [galvanized] steel sheets.

54. A method according to claim 52, wherein the increase in the resistance between said electrodes caused by said resistance increasing material occurs substantially during said current flowing step.

55. A method according to claim 52, wherein said electric characteristics include characteristics of resistance change between said weld electrodes.

56. A method according to claim 52, wherein said electric characteristics include a difference between the maximum and the minimum of the resistances between said weld electrodes, said difference representing a reduced amount of said resistances between said weld electrodes.

57. A method according to claim 52, wherein said electric characteristics include a pattern representative of the change of the resistances between said weld electrodes in the current flowing step.

58. A method according to claim 52, wherein said electric characteristics comprise a difference between the maximum and the minimum of the resistances between said weld electrodes and a pattern representative of the change of the resistances between said electrodes in the current flowing step, said difference representing a reduced amount of said resistances between said weld electrodes.

59. A method according to claim 52, wherein said resistance increasing material includes the mixture of an adhesive material and powders, said powders having a function as a spacer.

60. A method according to claim 52, wherein said resistance increasing material includes the mixture of an adhesive material and powders, said powders having a function as a spacer, said adhesive material foaming or the adhesive force being increased when heated or aged.

61. A method according to claim 52, wherein said resistance increasing material includes a perforated tape having an adhesive coated on its opposing faces.

62. A method according to claim 52, wherein said [galvanized] steel sheets partly contact each other while said resistance increasing material retains a part of the gap around the spacer between the [galvanized] steel sheets in the clamping step, the retained gap having a size in which zinc, melted or vapored in the current flowing step, can escape from a weld section of the [galvanized] steel sheets.

63. A method according to claim 52 further comprising: automatically taking corrective action upon the determination of a failure.

* * * * *